United States Patent
Kim et al.

(10) Patent No.: US 11,418,236 B2
(45) Date of Patent: Aug. 16, 2022

(54) METHOD AND APPARATUS FOR BEAM SELECTION IN MOBILE COMMUNICATION SYSTEM

(71) Applicant: Samsung Electronics Co., Ltd., Suwon-si (KR)

(72) Inventors: Soenghun Kim, Suwon-si (KR); Donggun Kim, Seoul (KR); Seungri Jin, Suwon-si (KR); Jaehyuk Jang, Suwon-si (KR); Gert Jan Van Lieshout, Apeldoorn (NL)

(73) Assignee: Samsung Electronics Co., Ltd., Suwon-si (KR)

(*) Notice: Subject to any disclaimer, the term of this patent is extended or adjusted under 35 U.S.C. 154(b) by 25 days.

(21) Appl. No.: 17/102,041

(22) Filed: Nov. 23, 2020

(65) Prior Publication Data

US 2021/0075473 A1 Mar. 11, 2021

Related U.S. Application Data

(63) Continuation of application No. 16/323,447, filed as application No. PCT/KR2017/008411 on Aug. 3, 2017, now Pat. No. 10,848,205.

(30) Foreign Application Priority Data

Aug. 5, 2016 (KR) .......................... 10-2016-0100054
Aug. 11, 2016 (KR) .......................... 10-2016-0102609

(51) Int. Cl.
*H04B 7/0404* (2017.01)
*H04B 7/0408* (2017.01)
(Continued)

(52) U.S. Cl.
CPC ......... *H04B 7/0404* (2013.01); *H04B 7/0408* (2013.01); *H04B 7/08* (2013.01);
(Continued)

(58) Field of Classification Search
CPC ...... H04B 7/0408; H04B 7/0404; H04B 7/08; H04B 7/088; H04W 16/28; H04W 76/27;
(Continued)

(56) References Cited

U.S. PATENT DOCUMENTS 9,185,610 B2 * 11/2015 Gulati ................... H04W 48/18
9,531,450 B2 * 12/2016 Maltsev ............... H04B 7/0695
(Continued)

FOREIGN PATENT DOCUMENTS

| JP | 2015185955 A | 10/2015 |
|---|---|---|
| KR | 10-2014-0017331 A | 2/2014 |
| KR | 10-2014-0092165 A | 7/2014 |

OTHER PUBLICATIONS

ISA/KR, "International Search Report and Written Opinion of the International Searching Authority," International Application No. PCT/KR2017/008411, dated Nov. 20, 2017, 9 pages.
(Continued)

*Primary Examiner* — Man U Phan

(57) ABSTRACT

The present disclosure relates to a communication technique for converging an IoT technology with a 5G communication system for supporting a higher data transmission rate beyond a 4G system, and a system therefor. The present disclosure may be applied to an intelligent service (e.g., a smart home, a smart building, a smart city, a smart car or connected car, healthcare, digital education, retail business, a security and safety related service, or the like) on the basis of a 5G communication technology and an IoT related technology. A method and an apparatus for reselecting a beam and selecting a suitable beam to be camped on, by a terminal, in order to be provided with a service in a next generation mobile communication system operating on the basis of a beam.

16 Claims, 29 Drawing Sheets

(51) Int. Cl.
*H04B 7/08* (2006.01)
*H04W 76/27* (2018.01)
*H04W 16/28* (2009.01)
*H04W 72/04* (2009.01)
*H04W 88/02* (2009.01)

(52) U.S. Cl.
CPC ............ *H04B 7/088* (2013.01); *H04W 16/28* (2013.01); *H04W 72/0446* (2013.01); *H04W 72/0453* (2013.01); *H04W 76/27* (2018.02); *H04W 88/023* (2013.01)

(58) Field of Classification Search
CPC ......... H04W 72/0446; H04W 72/0453; H04W 88/023; H04W 72/04; H04W 88/02
USPC .......................................................... 370/329
See application file for complete search history.

(56) References Cited

U.S. PATENT DOCUMENTS

| | | | | |
|---|---|---|---|---|
| 9,743,348 | B2* | 8/2017 | Kakishima | H04B 7/0478 |
| 9,900,815 | B2* | 2/2018 | Jung | H04W 36/08 |
| 10,306,503 | B2* | 5/2019 | Jung | H04B 7/0617 |
| 2010/0216469 | A1* | 8/2010 | Yi | H04W 48/20 455/435.3 |
| 2012/0135732 | A1* | 5/2012 | Magadi Rangaiah | H04W 48/20 455/434 |
| 2013/0223235 | A1* | 8/2013 | Hu | H04W 36/30 370/242 |
| 2014/0126620 | A1 | 5/2014 | Maltsev et al. | |
| 2014/0198681 | A1 | 7/2014 | Jung et al. | |
| 2015/0195755 | A1 | 7/2015 | Gulati et al. | |
| 2015/0304919 | A1 | 10/2015 | Jung et al. | |
| 2016/0119975 | A1* | 4/2016 | Van Der Velde | H04W 48/20 370/338 |
| 2016/0262077 | A1* | 9/2016 | Zhang | H04W 36/0085 |
| 2017/0006539 | A1 | 1/2017 | Kakishima et al. | |
| 2017/0373731 | A1* | 12/2017 | Guo | H04L 5/0053 |
| 2019/0319686 | A1* | 10/2019 | Chen, IV | H04W 24/08 |
| 2019/0349960 | A1* | 11/2019 | Li | H04L 27/26136 |

OTHER PUBLICATIONS

Supplementary European Search Report dated Apr. 23, 2019 in connection with European Patent Application No. 17 83 7269, 10 pages.

"LTE; Evolved Universal Terrestrial Radio Access (E-UTRA); User Equipment (UE) procedures in idle mode (3GPP TS 36.304 version 12.6.0 Release 12)", ETSI TS 136 304 V12.6.0 (Nov. 2015), 40 pages.

* cited by examiner

METHOD AND APPARATUS FOR BEAM SELECTION IN MOBILE COMMUNICATION SYSTEM

CROSS-REFERENCE TO RELATED APPLICATIONS

This application is a continuation of application Ser. No. 16/323,447, which is the 371 National Stage of International Application No. PCT/KR2017/008411, filed on Aug. 3, 2017, which claims priority to Korean Patent Application No. 10-2016-0100054, filed on Aug. 5, 2016, and Korean Patent Application No. 10-2016-0102609, filed on Aug. 11, 2016, the disclosures of which are herein incorporated by reference in their entirety.

BACKGROUND

1. Field

The present disclosure relates to a method and apparatus used when a user equipment (UE) reselects a beam to receive service and selects a suitable beam to camp on in a next-generation mobile communication system that operates on the basis of a beam.

2. Description of Related Art

In order to meet wireless data traffic demands, which have increased since the commercialization of the 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in a mmWave band (e.g., 60 GHz band) is being considered. In the 5G communication system, technologies such as beamforming, massive MIMO, Full-Dimensional MIMO (FD-MIMO), array antenna, analog beamforming, and large-scale antenna technologies are being discussed so as to mitigate the path loss of a radio wave in the mmWave band and increase the travel distance of a radio wave. Further, the 5G communication system has developed technologies such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), received interference cancellation, and the like, so as to improve the system network. In addition, the 5G system has developed advanced coding modulation (ACM) schemes such as hybrid FSK and QAM modulation (FQAM) and sliding window superposition coding (SWSC), as well as advanced access technologies such as filter bank multi carrier (FBMC), non-orthogonal multiple access (NOMA), sparse code multiple access (SCMA), and the like.

Meanwhile, the Internet has evolved from a human-oriented connection network, in which humans generate and consume information, to the Internet of Things (IoT), in which distributed components such as objects exchange and process information. Internet-of-Everything (IoE), in which big-data processing technology is combined with IoT via a connection with a cloud server or the like, has emerged. In order to implement IoT, technical factors such as a sensing technique, wired/wireless communication and network infrastructure, service-interface technology, and security technology are required, and research on technologies such as a sensor network, machine-to-machine (M2M) communication, machine-type communication (MTC), and the like for connection between objects has recently been conducted. In an IoT environment, by collecting and analyzing data generated in connected objects, an intelligent internet technology (IT) service to create new value in people's lives may be provided. The IoT may be applied to fields such as a smart home, a smart building, a smart city, a smart car or connected car, a smart grid, health care, a smart home appliance, or a high-tech medical service via the convergence of conventional information technology (IT) and various industries.

Accordingly, various attempts to apply the 5G communication system to the IoT network have been made. For example, 5G communication technology such as a sensor network, machine-to-machine (M2M) communication, machine-type communication (MTC), and the like are implemented via schemes such as beamforming, MIMO, array antenna, and the like. The application of the cloud RAN as big-data processing technology may be an example of convergence of the 5G technology and the IoT technology.

In a next-generation mobile communication system, a plurality of beams may be used. Also, a user equipment (UE) is capable of forming a beam by using a plurality of beams or adjusting a beam width. In this instance, the UE may need to select a suitable beam to camp on from among a plurality of beams in order to receive a service.

SUMMARY

Therefore, the present disclosure has been made in view of the above-mentioned problems, and an aspect of the present disclosure is to provide a method of selecting a suitable beam to be camped on from among a plurality of beams by taking into consideration the beamforming capability of a user equipment (UE) in a next-generation mobile communication system.

Also, another aspect of the present disclosure is to provide a method of selecting a beam configuration differently depending on whether a UE is in an idle state or is in a connected state in a next-generation mobile communication system.

Also, another aspect of the present disclosure is to define a procedure of efficiently reselecting neighboring beams by taking into consideration the difference in complexity that occurs when a UE performs intra-transmission-reception-point (TRP) or inter-TRP beam reselection on the basis of the types of neighboring cells and measurement values in a next-generation mobile communication system.

In accordance with an aspect of the present disclosure, a method of selecting a beam by a user equipment (UE) includes: receiving system information including first beam reselection priority information; receiving a radio resource control (RRC) message including second beam reselection priority information; identifying whether the UE camps on a suitable beam; and applying one of the first beam reselection priority information and the second beam reselection priority information based on the result of the identification.

In accordance with an aspect of the present disclosure, a UE includes: a transceiver configured to transmit and receive a signal; and a controller configured to receive system information including first beam reselection priority information, receive a radio resource control (RRC) message including second beam reselection priority information, identify whether the UE camps on a suitable beam, and apply one of the first beam reselection priority information and the second beam reselection priority information based on the result of the identification.

According to an embodiment of the present disclosure, a suitable beam selection procedure is proposed in which a user equipment (UE) can take into consideration the beamforming capability of the UE in a next-generation mobile communication system that uses a plurality of beams, whereby the UE can efficiently select a suitable beam to camp on, and UE's idle operation may be implemented.

Also, according to another embodiment of the present disclosure, when a reception beam is measured in a next-generation mobile communication system, different configurations are applied to an idle-state UE and a connected-state UE, thereby overcoming the case in which the amount of time spent is different depending on the unique performance of a UE or the case in which consistent performance cannot be secured.

Also, according to another embodiment of the present disclosure, graded neighboring beam reselection criteria of the present disclosure are applied to a next-generation mobile communication system that operates on the basis of a beam, whereby the number of times that inter-TRP beam reselection, which entails great expense for beam selection, is performed is lower than the number of times that intra-TRP reselection is performed, and additional operations of the UE may be reduced.

DETAILED DESCRIPTION

Figure 1A:
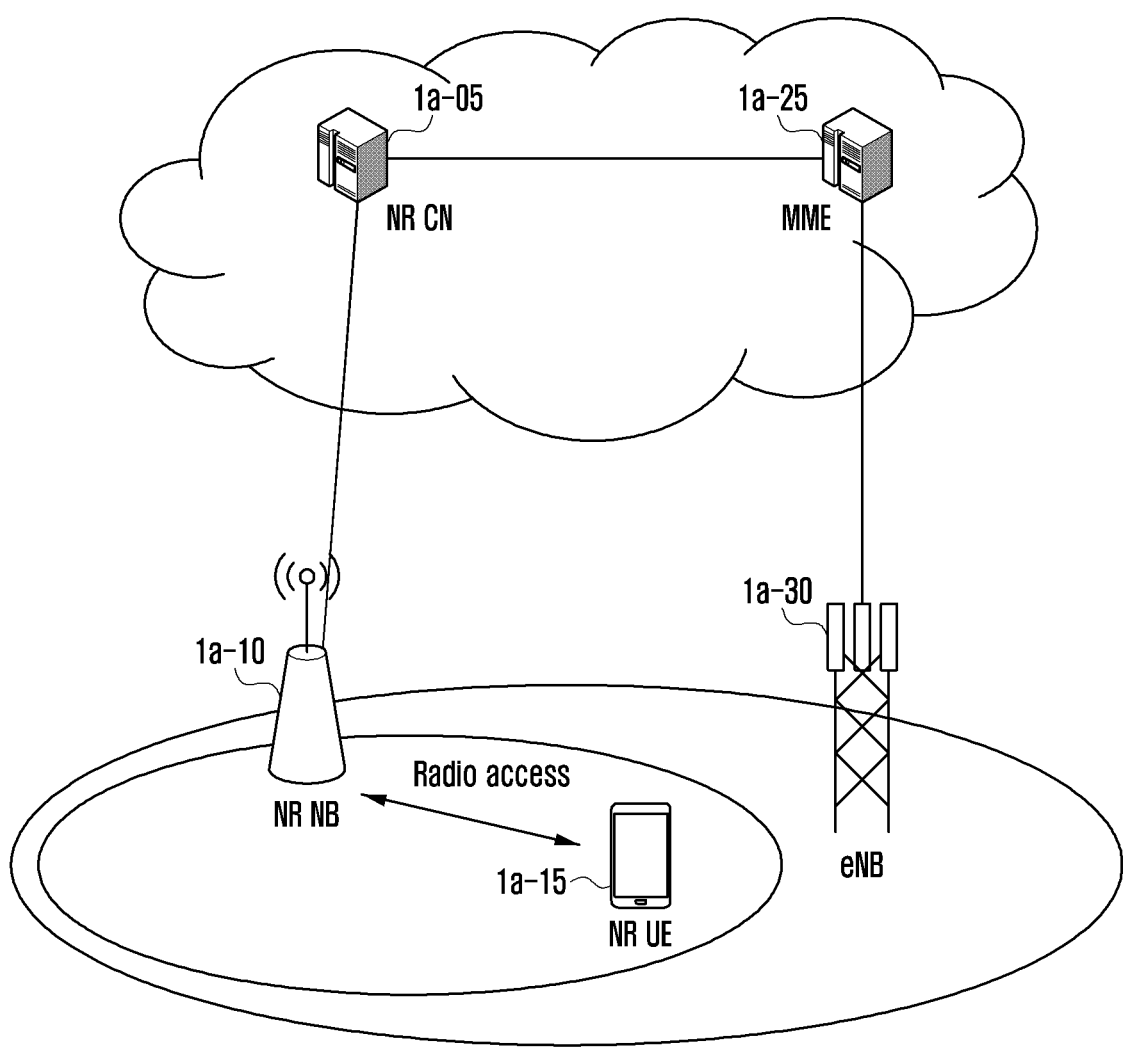
FIG. 1A is a diagram illustrating the structure of a next-generation mobile communication system according to an embodiment of the present disclosure.

Hereinafter, embodiments of the present disclosure will be described in detail in conjunction with the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be made based on the contents throughout the specification.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

In the descriptions below, terms used for identifying access nodes, the terms indicating network entities, terms indicating messages, terms indicating interfaces between network entities, terms indicating various identification information, and the like are used for ease of description. Therefore, the present disclosure is not limited by the terms provided below, and other terms that indicate subjects having equivalent technical meanings may be used.

For convenience of description, the present disclosure may use terms and names defined in the 3rd-generation partnership project long-term evolution (3GPP LTE) standard, or terms and names that are modifications thereof. However, the present disclosure is not limited to the terms and the names, and may be equally applied to systems that comply with other standards.

First Embodiment

The first embodiment of the present disclosure relates to a method and apparatus used when a user equipment (UE) equipped with a next-generation mobile communication system (new radio (NR) or 5G) and LTE selects a suitable beam for wireless mobile communication. The operations of the UE in the embodiment of the present disclosure may include the following steps.

A method and apparatus used when a UE selects a beam to camp on in the next-generation mobile communication system.

A step in which an idle-state UE receives a downlink reference signal by applying a first downlink reception beam configuration. The downlink reference signal is transmitted in an overhead subframe (osf), and at least one beam's downlink reference signal may be sequentially transmitted in a single osf.
  A step for determining whether the downlink reference signal satisfies a first condition
  A step for regarding the corresponding beam as a suitable beam when the downlink reference signal satisfies the first condition
  A step of camping on one of the suitable beams The first condition is satisfied when a first calculation value is greater than or equal to 0. The first calculation value is determined using an equation which takes a downlink reference signal strength and an uplink compensation factor as inputs. The uplink compensation factor is determined using an equation that takes the uplink transmission beam configuration capability of a UE and the power class of the UE as inputs. The uplink transmission beam configuration capability of the UE may be defined for each band of the next-generation mobile communication system supported by the UE. Also, in the first downlink reception beam configuration, the number of downlink reception beams (a reception beam width or a sweeping length) may be determined by a combination of a first parameter and a second parameter (or the lower of the two values). The first parameter is information related to the number of reception beams supported by a UE, and the second parameter is a preconfigured integer set in advance for each frequency band.

In the descriptions below, terms used for identifying access nodes, the terms indicating network entities, terms indicating messages, terms indicating interfaces between network entities, terms indicating various pieces of identification information, and the like are used for ease of description. Therefore, the present disclosure is not limited by the terms provided below, and other terms that indicate subjects having equivalent technical meanings may be used.

For convenience of description, the present disclosure uses terms and names defined in the 3GPP LTE (3rd-generation partnership project long-term evolution) standard. However, the present disclosure is not limited to the terms and names, and may be equally applied to systems that comply with other standards.

FIG. 1A is a diagram illustrating the structure of a next-generation mobile communication system according to an embodiment of the present disclosure.

Referring to FIG. 1A, a radio access network of the next-generation mobile communication system includes a next-generation node B (a new radio node B, hereinafter referred to as an NR NB or a base station) 1a-10 and a new radio core network (NR CN) 1a-05, as illustrated in the drawing. A user equipment (a new radio user equipment (NR UE) or UE) 1a-15 may access an external network via the NR NB 1a-10 and the NR CN 1a-05.

In FIG. 1A, the NR NB 1a-10 may correspond to an evolved node B (eNB) in a legacy LTE system. The NR NB is connected to the NR UE a1-15 via a radio channel, and may provide better service than a legacy node B. In the next-generation mobile communication system, all user traffic is serviced via a shared channel, and thus a device that collects state information of UEs, such as a buffer status, an available transmission power status, a channel status or the like, and performs scheduling is needed, and the NR NB a1-10 takes charge of the same. One NR NB generally controls a plurality of cells. In order to implement high-speed data transmission when compared to the legacy LTE, a bandwidth greater than or equal to the maximum legacy bandwidth may be needed, and orthogonal frequency division multiplexing (OFDM) is used as a radio access technology, and beamforming technology is additionally used. Further, an adaptive modulation and coding (hereinafter, referred to as AMC) scheme, which determines a channel coding rate and a modulation scheme on the basis of the channel status of the UE, is applied to the LTE system. The NR CN 1a-05 supports mobility, configures a bearer, or configures quality of service (QoS). The NR CN is a device that is in charge of various control functions in addition to a mobility management function associated with a UE, and may be connected to a plurality of node Bs. Also, the next-generation mobile communication system may interoperate with the legacy LTE system, and the NR CN may be connected to an MME a1-25 via a network interface. The MME is connected to an eNB a1-30, which is a legacy node B.

The NR is aimed at supporting a more improved data transmission speed than the legacy LTE. As a method of increasing a data transmission speed in the NR, a method is considered in which a signal is transmitted using a wide frequency band existing in a frequency band greater than or equal to 6 GHz. That is, it is considered to use a millimeter wave (hereinafter mmWave) band, such as a 28 GHz band, a 60 GHz band, or the like, in order to increase a transmission rate. In a frequency band, which is considered for mmWave, signal attenuation per distance is relatively large, and thus transmission on the basis of a directional beam generated using multiple antennas is required in order to secure coverage. In the case of the directional-beam-based transmission, transmission or reception of a signal may be difficult at a location where a beam is not formed. In order to overcome the above-described drawback, beam sweeping is used. Beam sweeping is a scheme in which a transmission apparatus sequentially sweeps or rotates and transmits a directional beam having a preconfigured beam width, such that a beam is received by a reception apparatus that exists within the beam range of the transmission apparatus.

Figure 1B:
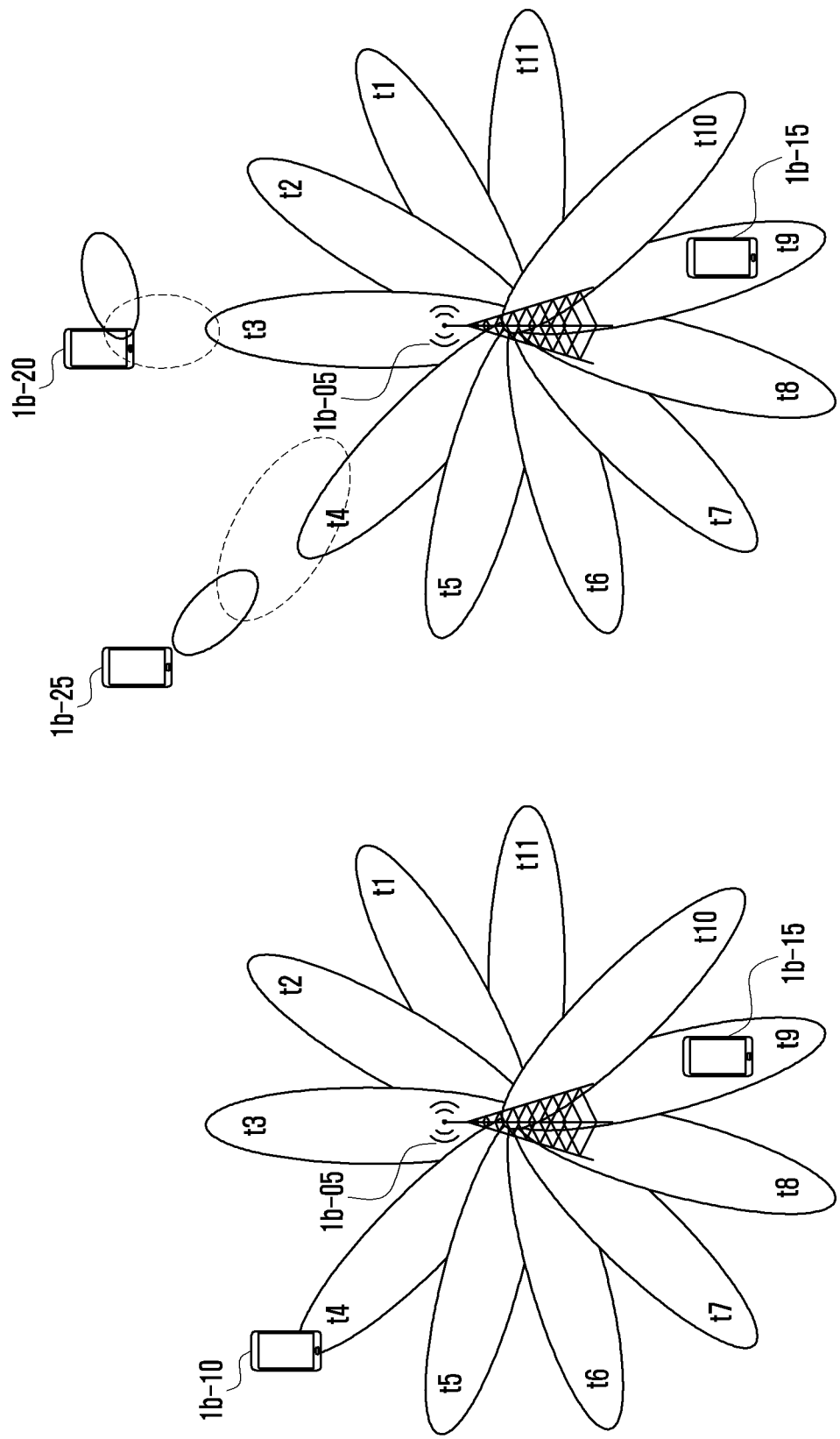
FIG. 1B is a diagram illustrating beam sweeping of a next-generation mobile communication system according to an embodiment of the present disclosure.

FIG. 1B is a diagram illustrating beam sweeping of a next-generation mobile communication system according to an embodiment of the present disclosure.

Referring to FIG. 1B, for example, a transmission reception point (TRP) 1b-05 (a device for transmitting and receiving a radio signal in a network, a 5G NB, or a device connected to a 5G NB) transmits a directional beam having a preconfigured width at a preconfigured point in time t1 in a preconfigured direction, and transmits a directional beam having the same width at t2 in another direction, or the like, whereby the beams are transmitted in all directions during a preconfigured period of time. Accordingly, a downlink signal transmitted by a base station arrives at a UE 1b-15 at t9, and arrives at a UE 1b-10 at t4.

Beam sweeping is mainly used when a base station does not know the orientation of a directional beam to be applied to a UE, and a common overhead signal to be transmitted to an idle-state UE may be transmitted via the beam sweeping.

A directional reception beam in addition to a directional transmission beam may be used in order to increase beam efficiency. When a directional reception beam is used, the directionality/orientation of a transmission beam and the directionality/orientation of the reception beam need to be aligned with each other. For example, even if a UE 1b-20 is located in the area of a transmission beam, if the directionality of a reception beam is not aligned with the directionality of the transmission beam, the UE may not receive the transmission beam. Conversely, if the directionality of a transmission beam and the directionality of a reception beam are aligned with each other, a UE 1b-25 may transmit and receive data with a higher efficiency than when the reception beam is not used.

In order to detect a reception beam that is aligned with a transmission beam, the reception apparatus may apply different reception beams to the same transmission beam so as to detect the reception beam providing the best quality of reception. This process is referred to as reception beam sweeping.

A mobile communication system that uses a directional beam, an analog beam, or a hybrid beam may transmit the common overhead signal in a preconfigured subframe via beam sweeping, and may perform user data transmission and reception with a preconfigured UE using a unidirectional beam in another subframe.

Figure 1C:
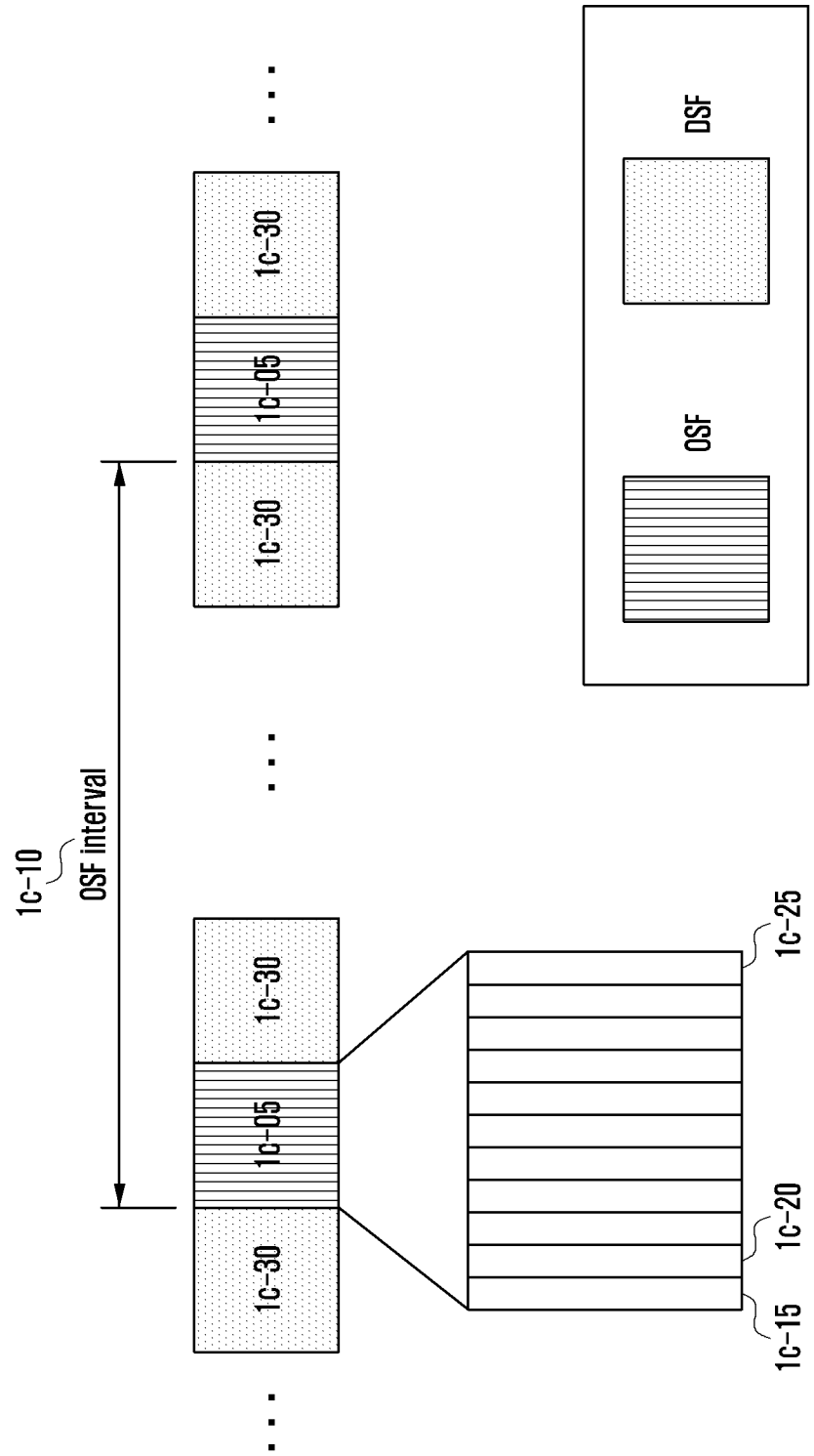
FIG. 1C is a diagram illustrating the structure of a subframe of a next-generation mobile communication system according to an embodiment of the present disclosure.

FIG. 1C is a diagram illustrating the structure of a subframe of a next-generation mobile communication system according to an embodiment of the present disclosure.

Referring to FIG. 1C, a subframe 1c-05 (overhead subframe (OSF)) that includes the overhead signal may be repeatedly transmitted at regular intervals 1c-10. A single subframe includes a plurality of symbols, and a single directional beam is transmitted per symbol in an OSF. For example, a first symbol 1c-15 of the OSF corresponds to t1, a second symbol 1c-20 corresponds to t2, and an eleventh symbol 1c-25 corresponds to t11, and directional beams (or analog beams), which are configured to have the same beam width for each symbol, to cover different areas, and to have directionality of different directions, may be transmitted.

An overhead signal may be transmitted for each symbol of the OSF.

A signal for establishing downlink synchronization, such as a primary synchronization signal (PSS), secondary synchronization signal (SSS), or the like A beam reference signal (BRS) for measuring a received signal strength or a received signal quality for each beam System information, a master information block (MIB) or a physical broadcast channel (PBCH)

A PBCH includes information essential for a UE to access a system, for example, a downlink beam bandwidth, a system frame number, and the like For reference, a public land mobile network (PLMN) identifier may be broadcasted via a channel different from an MIB.

The same beam is transmitted in consecutive symbols of a subframe different from the periodically transmitted OSF, and user data associated with a preconfigured connected-state UE may be transmitted via the beam. Hereinafter, the subframe different from the OSF is referred to as a data subframe (DSF) 1c-30.

Figure 1D:
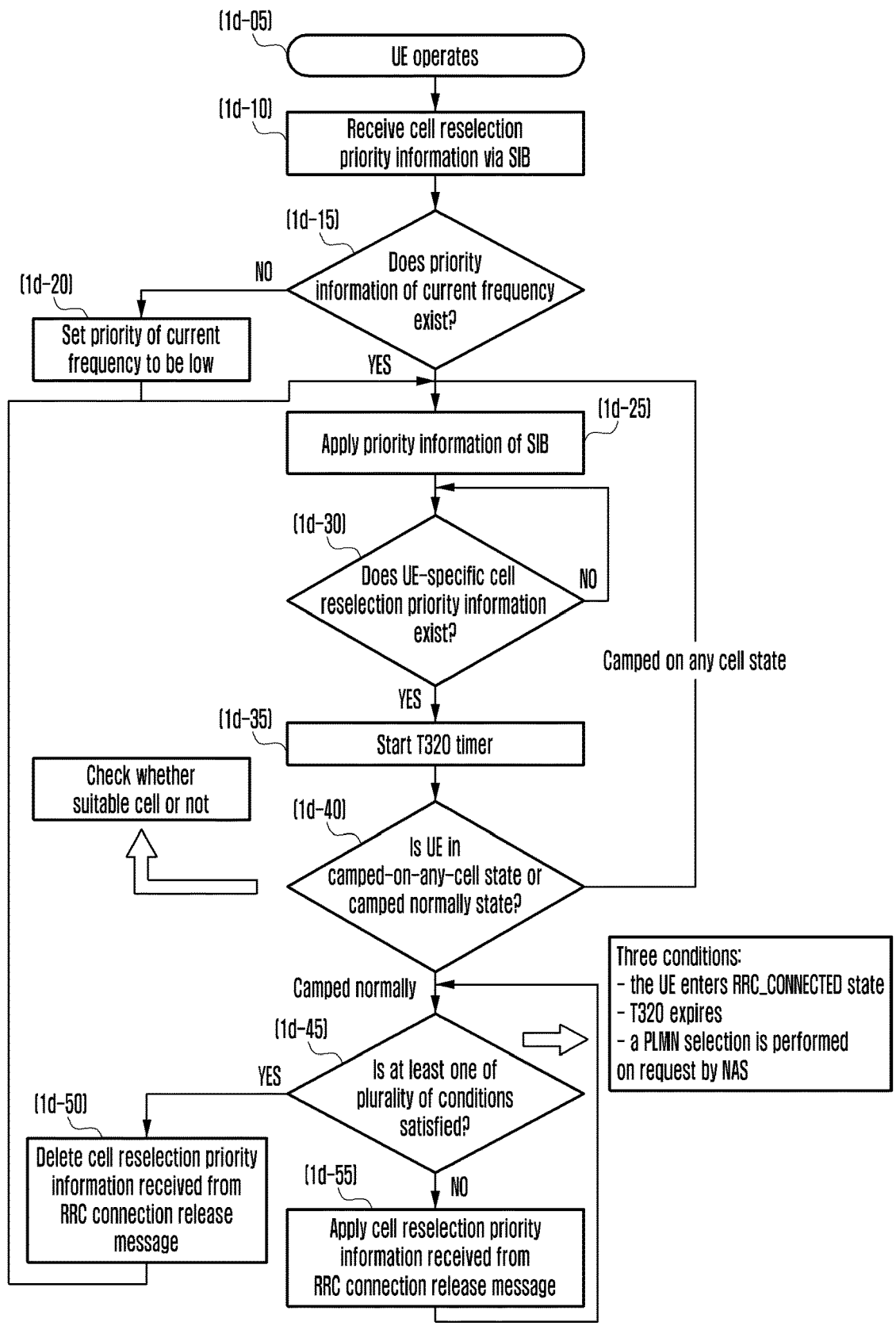
FIG. 1D is a diagram illustrating a process in which frequency-based priority information for cell reselection is broadcasted via an SIB or is applied to a preconfigured user equipment (UE) via an RRC connection release message, which is dedicated RRC signaling, in a next-generation mobile communication system that uses a single beam according to an embodiment of the present disclosure, and is a diagram illustrating a method of detecting a suitable cell.

FIG. 1D is a diagram illustrating a process in which frequency-based priority information for cell reselection is broadcasted via an SIB or is applied to a preconfigured UE via an RRC connection release message, which is dedicated RRC signaling, in a next-generation mobile communication system that uses a single beam according to an embodiment of the present disclosure, and is a diagram illustrating a method of detecting a suitable cell.

Referring to FIG. 1D, the UE may receive priority information for cell reselection in operation 1d-10. The UE may receive, via a system information block (SIB), priority information associated with frequencies used in evolved universal mobile telecommunications system (UMTS) terrestrial radio access (EUTRA), and frequencies used in other radio access technologies (RATs). However, priority information associated with all frequencies may not always be provided. The priority information associated with the frequency of a service cell that a UE currently camps on may not be provided.

The UE may identify priority information in operation 1d-15. When priority information associated with the frequency of the current serving cell is not provided, the UE proceeds with operation 1d-20, and regards the priority of the frequency to be the lowest level. When the priority information associated with the frequency of the current serving cell is provided, the UE proceeds with operation 1d-25.

The UE may apply priority information of each frequency in operation 1d-25. The priority information may be priority information that the UE receives via the SIB.

When the UE receives a radio resource control (RRC) connection release message from a base station, the UE may change from a connected mode to an idle mode. The RRC message may include frequency priority information. This is UE-specific information, and may be preferentially applied over frequency priority information provided via system information (SIB). The system information is transmitted via a master information block (MIB) and a system information block (SIB). The SIB may be classified as SIB1, SIB2, SIB3, and the like depending on the information to transmit. A parameter related to cell reselection is included in SIB3, among them, and information associated with neighboring cells of the same frequency band is included in SIB4. The UE receives SIB3 and SIB4, and receives a parameter related to cell reselection in the same frequency band. S-intrasearch information, which determines whether to perform cell reselection on the basis of the strength and quality of a signal, may be transmitted via the SIB 3.

The UE may determine whether frequency priority information is included in the RRC message in operation 1d-30. When it is determined that frequency priority information exists in the RRC message in operation 1d-30, the UE proceeds with operation 1d-35. In operation 1d-35, the UE applies a T320 value, included in the RRC message, so as to drive a single timer.

In operation 1d-40, the UE may determine whether the current idle mode state is a "camped-on-any-cell state" or a "camped normally state". That is, the UE determines whether the cell that the UE currently camps on is a suitable cell. The camped normally state indicates the state in which the UE camps on a suitable cell. A suitable cell is a cell that is capable of providing normal service to a UE and satisfies the detailed conditions below.

A cell corresponds to a selected PLMN, a registered PLMN, or a PLMN in an equivalent PLMN list
A cell that is not barred
A cell belonging to a PLMN that satisfies the above condition, and belonging to at least one of the tracking areas (TAs) which are not part of a TA list including forbidden TAs
A cell that satisfies a cell selection criterion
In the case of a closed subscriber group (CSG) cell, a cell of which a CSG ID is included in a whitelist of a UE The cell selection criterion indicates S-criteria, and the S-criteria may be calculated using the equation below.

Srxlev>0 AND Squal>0

Here, Srxlev and Squal may be calculated as below.

$$Srxlev = Q_{rxlevmeas} - (Q_{rxlevmin} + Q_{rxlevminoffset}) - Pcompensation - Qoffset_{temp}$$

$$Squal = Q_{qualmeas} - (Q_{qualmin} + Q_{qualminoffset}) - Qoffset_{temp}$$

$Q_{rxlevmeas}$ denotes a measured received strength, and $Q_{qualmeas}$ denotes a measured received quality. $Q_{rxlevmin}$ denotes the minimum power value needed for operation, and $Q_{qualmin}$ denotes the minimum quality value needed for operation. $Q_{rxlevminoffset}$ denotes an offset value of power for base stations with priority, $Q_{qualminoffset}$ denotes an offset value of quality for base stations with priority, and Pcompensation denotes a compensation parameter based on uplink transmission power of a UE. Also, $Qoffset_{temp}$ denotes an offset value used when a UE fails to reestablish RRC connection (RRC connection reestablishment failure).

The cell selection criterion may be applied to an initial cell selection procedure, in addition to a cell reselection procedure. That is, since the UE does not have information associated with an RF channel of a network, the UE may measure all RF channels that the UE can measure so as to detect the cell having the highest strength for each frequency. The UE may determine whether the cells satisfy the detailed conditions (whether a cell corresponds to a selected PLMN, a registered PLMN, or a PLMN included in an equivalent PLMN list, whether a cell is not barred, whether a cell belongs to a PLMN satisfying the above condition and belongs to at least one of the TAs which are not part of a TA list including forbidden TAs, whether a cell satisfies a calculated cell selection criterion, and whether the CSG ID of a cell is included in a whitelist of a UE in the case of a CSG cell), and may detect a suitable cell.

The "camped-on-any-cell state" indicates the state in which the UE fails to camp on a suitable cell, and camps on an acceptable cell. For an acceptable cell, normal service is not allowed, and only emergency calls are allowed to the UE. An acceptable cell is a cell that satisfies the conditions below.

A cell that is not barred
A cell that satisfies a cell selection criterion

When the result of the determination in operation 1d-40 shows that the UE is in the camped-on-any-cell state, the UE returns to operation 1d-25. The UE that returns to operation 1d-25 may apply the frequency priority information provided from the SIB, instead of the priority information provided from the RRC connection release message. When the result of the determination in operation 1d-40 shows that the UE is in the camped normally state, the UE proceeds with operation 1d-45.

In operation 1d-45, the UE determines whether a preconfigured condition is satisfied. For example, the UE determines whether at least one of the following three conditions is satisfied in operation 1d-45. The three conditions are as follows.

A UE is switched to a connected mode.
A T320 timer expires
A PLMN selection process is performed in response to a request from a non-access stratum (NAS).

If any one of the conditions is satisfied, the UE proceeds with operation 1d-50. In operation 1d-50, the priority information supplied from the RRC connection release message is discarded. The UE returns to operation 1d-25, and applies the frequency priority information provided from the SIB. If a preconfigured condition is not satisfied in operation 1d-50 (e.g., if any one of the three conditions is not satisfied), the UE proceeds with operation 1d-55, and applies the priority information provided from the RRC connection release message.

The frequency priority information may affect the UE's measurement of a preconfigured frequency. The UE always measures a frequency having a higher priority than that of the current serving cell.

Conversely, the UE does not measure a frequency (intra-frequency) that is the same as that of the serving cell or a frequency having a priority that is the same as, or lower than the priority of the frequency of the serving cell, for the economical use of power. Measurement may be performed when the channel QoS of the serving cell is less than or equal to a preconfigured threshold value. The channel QoS may be determined on the basis of Srxlev and Squal, and may be determined on the basis of a preconfigured function of reference signal received power (RSRP) or reference signal received quality (RSRQ). Cell reselection is performed for movement to a cell having a better channel status. If the channel QoS of the current serving cell is good, there is no need to move to a cell having a frequency of which the priority is the same as or lower than that of the current serving cell. Therefore, in order to reduce the amount of power consumed by unnecessary channel measurement, whether to perform measurement is determined on the basis of a preconfigured threshold value.

In the case of the same frequency (intra-frequency), if the QoS of the serving cell is the same as or lower than a preconfigured threshold value Sintrasearch, channel measurement is performed with respect to other cells having the same frequency. In the case of different frequencies having the same or lower priority, if the QoS of the serving cell is the same as or lower than a preconfigured threshold value Snonintrasearch, channel measurement is performed with respect to cells of different frequencies. For the channel QoS, RSRP and RSRQ are generally taken into consideration. The channel QoS is determined on the basis of Srxlev and Squal, and may be determined on the basis of a preconfigured function of RSRP or RSRQ.

While measurement is performed, if the channel QoS of a cell having a high-priority frequency is greater than a preconfigured threshold value ThreshX-high, the UE reselects the cell having the high-priority frequency as a serving cell. If the channel QoS of a cell having a low-priority frequency is greater than a preconfigured threshold value ThreshX-low and the QoS of the serving cell is lower than ThreshServing-low, the UE reselects the cell having the low-priority frequency as a serving cell. Cells having the same frequency or cells having frequencies of the same priority may be prioritized according to a preconfigured formula based on a channel QoS. This is referred to as cell ranking. The ranking value of a serving cell is defined to be $RS=Q_{meas,s}+Q_{Hyst}-Qoffset_{temp}$. Conversely, the ranking value of a neighboring cell is defined to be $Rn=Q_{meas,n}-Qoffset-Qoffset_{temp}$. $Q_{meas,s}$ and $Q_{meas,n}$ denote RSRP values of a serving cell and a neighboring cell. $Q_{Hyst}$ denotes a hysteresis value applied to a serving cell. Qoffset denotes an offset value between a serving cell and a neighboring cell. Also, $Qoffset_{temp}$ denotes an offset value used when a UE fails to reestablish RRC connection (RRC connection reestablishment failure). In the cell-ranking procedure, if the ranking value is high, a corresponding cell is selected as a serving cell.

Figure 1E:
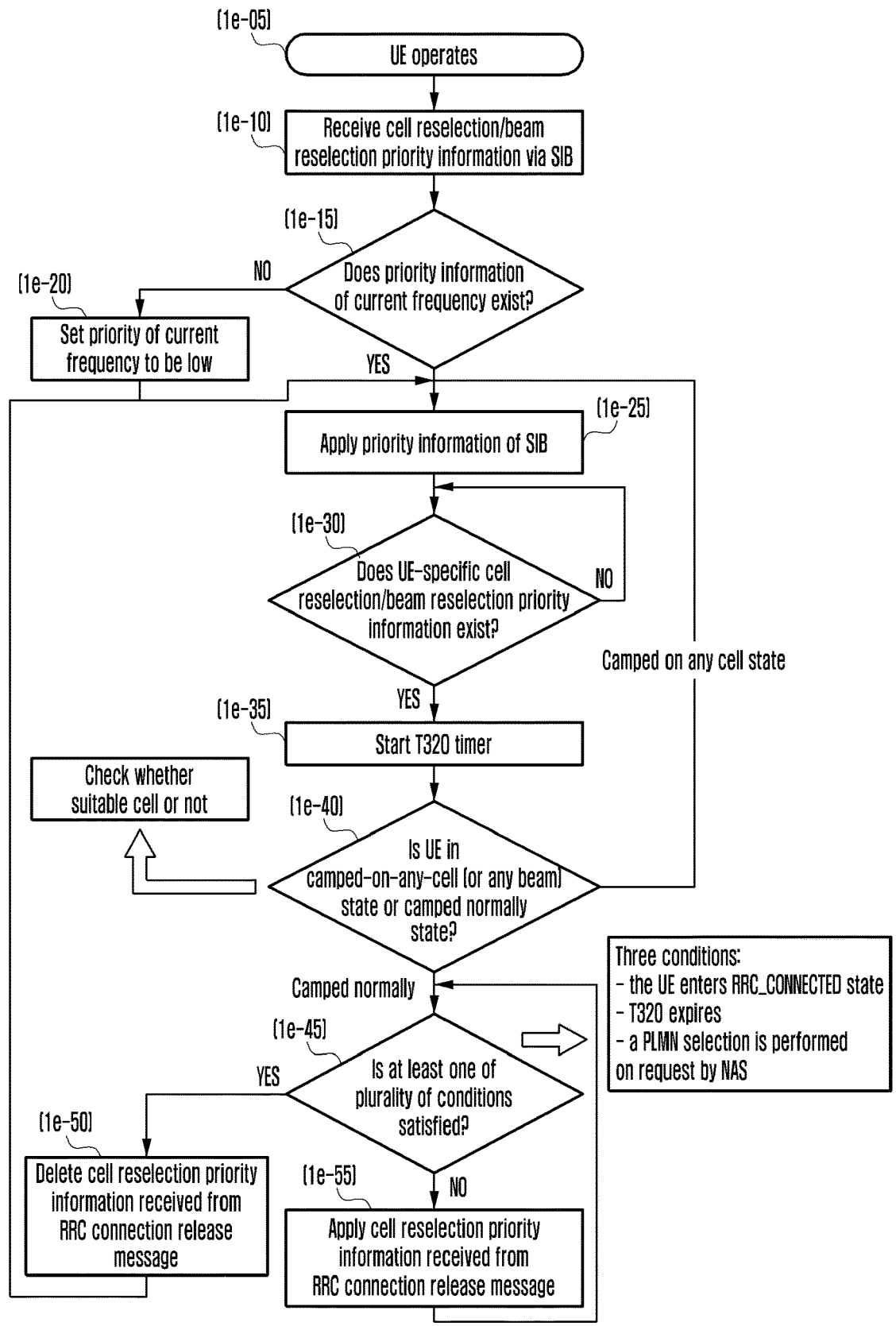
FIG. 1E is a diagram illustrating a process in which frequency-based priority information for cell or beam reselection is broadcasted via an SIB or is applied to a preconfigured UE via an RRC connection release message, which is dedicated RRC signaling, in a next-generation mobile communication system that uses a plurality of beams according to an embodiment of the present disclosure, and is a diagram illustrating a method of detecting a suitable beam from among a plurality of beams.

FIG. 1E is a diagram illustrating a process in which frequency-based priority information for cell or beam reselection is broadcasted via an SIB or is applied to a preconfigured UE via an RRC connection release message, which is dedicated RRC signaling, in a next-generation mobile communication system that uses a plurality of beams according to an embodiment of the present disclosure, and is a diagram illustrating a method of detecting a suitable beam from among a plurality of beams.

Referring to FIG. 1E, the UE may receive priority information for cell or beam reselection in operation 1e-10. The UE receives priority information associated with frequencies used in EUTRA, and frequencies used in other RATs, via an SIB. However, priority information associated with all frequencies may not always be provided. The priority information associated with the frequency of a service cell that a UE currently camps on may not be provided. A plurality of beams may be used in the next-generation mobile communication system, and thus priority information associated with the plurality of beams may be provided. Each of the plurality of beams may be identified on the basis of a beam identity that indicates each beam. Also, priority information associated with the plurality of beams may not be provided. The priority information associated with the plurality of beams is a subordinate concept of priority information associated with the frequencies. If a frequency is determined on the basis of the priority information associated with the frequencies, priority information associated with a plurality of beams may be determined for the plurality of beams of the corresponding frequency.

The UE identifies priority information in operation 1e-15. If priority information associated with the frequency of the current serving cell is not provided, the UE proceeds with operation 1e-20, and regards the priority of the frequency to be the lowest level. In the same manner, if priority information associated with a serving beam of the current serving cell is not provided, the UE regards the priority of the serving beam to be the lowest level.

The UE may apply priority information of each frequency in operation 1e-25. The priority information may be cell and/or beam priority information that the UE receives via an SIB. In the operation, the priority information associated with a plurality of beams may be applied.

If the UE receives an RRC connection release message from a base station, the UE may change from a connected mode to an idle mode. The RRC message may include frequency priority information. The RRC message may also include the priority information associated with a plurality of beams. This is UE-specific information, and may be preferentially applied over frequency priority information or priority information associated with a plurality of beams provided via system information (SIB). The system information is transmitted via a master information block (MIB) and a system information block (SIB). The SIB may be classified as SIB1, SIB2, SIB3, and the like depending on the information to transmit. A parameter related to cell reselection is included in SIB3 among them, and information associated with neighboring cells of the same frequency band is included in SIB4. SIB3 or SIB4 may include information associated with a plurality of beams. The information associated with the plurality of beams may include priority information associated with the plurality of beams, beam identity information, beam pattern information, beam width information, beam strength information, beam-related period information, beam offset information, and the like. The UE receives SIB3 and SIB4, and may receive a parameter related to cell reselection in the same frequency band or a parameter related to beam selection. S-intrasearch information, which determines whether to perform cell reselection on the basis of the strength and quality of a signal, may be transmitted via SIB 3. The S-intrasearch information may include information for determining whether to perform cell reselection on the basis of the strength and quality of a signal at a frequency, and information for determining whether to perform beam reselection on the basis of the strength and quality of a signal in a beam.

The UE may determine whether frequency priority information or priority information associated with a plurality of beams exists in the RRC message in operation 1e-30. If it is determined that the frequency priority information or beam priority information exists in the RRC message in operation 1e-30, the UE proceeds with operation 1e-35. In operation 1e-35, the UE applies a T320 value included in the RRC message so as to drive a single timer. In this operation, a separate timer for a beam may be driven.

In operation 1e-40, the UE may determine whether the current idle mode state corresponds to a "camped-on-any-cell state" or a "camped normally state". That is, the UE determines whether a cell or beam that the UE currently camps on is a suitable cell or beam. The "camped normally state" indicates the state in which the UE camps on a suitable cell or camps on a suitable beam. A suitable cell or a suitable beam indicates a cell or a beam that is capable of providing normal service to a UE and satisfies first conditions below.

- A cell or beam corresponds to a selected PLMN, a registered PLMN, or a PLMN in an equivalent PLMN list
- A cell or beam that is not barred
- A cell or beam belonging to a PLMN that satisfies the above conditions and belonging to at least one of TAs which are not part of a TA list including forbidden TAs.
- A cell or beam that satisfies a cell selection criterion or beam selection criterion
- A cell or beam of which the CSG ID is included in the whitelist of a UE in the case of a CSG cell The cell selection criterion indicates S-criteria, and the S-criteria may be calculated using the equation below.

Srxlev>0 AND Squal>0

Here, Srxlev and Squal may be calculated as below.

$$Srxlev = Q_{rxlevmeas} - (Q_{rxlevmin} + Q_{rxlevminoffset}) - Pcompensation - Qoffset_{temp}$$

$$Squal = Q_{qualmeas} - (Q_{qualmin} + Q_{qualminoffset}) - Qoffset_{temp}$$

$Q_{rxlevmeas}$ denotes a measured received strength, and $Q_{qualmeas}$ denotes a measured received quality. $Q_{rxlevmin}$ denotes the minimum power value needed for operation, and $Q_{qualmin}$ denotes the minimum quality value needed for operation. $Q_{rxlevminoffset}$ denotes an offset value of power for base stations with priority, $Q_{qualminoffset}$ denotes an offset value of quality for base stations with priority, and Pcompensation denotes a compensation parameter based on uplink transmission power of a UE. Also, $Qoffset_{temp}$ denotes an offset value that is used when a UE fails to reestablish RRC connection (RRC connection reestablishment failure). The cell selection criterion may be applied to an initial cell selection procedure, in addition to a cell reselection procedure. That is, since the UE does not have information associated with an RF channel of a network, the UE may measure all RF channels that the UE can measure so as to detect the cell having the highest strength for each frequency. The UE may determine whether the detailed conditions (whether a cell corresponds to a selected PLMN, a registered PLMN, or a PLMN included in an equivalent PLMN list, whether a cell is not barred, whether a cell belongs to a PLMN satisfying the above conditions and belongs to at least one of the TAs which are not part of a TA list including forbidden TAs, whether a cell satisfies a calculated cell selection criterion, and whether the CSG ID of a cell is included in a whitelist of a UE in the case of a CSG cell) are satisfied, and may detect a suitable cell.

The beam selection criterion indicates B-criteria, and the B-criteria may be calculated using the equation below.

Srxlev>0 AND Squal>0

Here, Srxlev and Squal may be calculated as below.

$$Srxlev = Q_{rxlevmeas,b} - (Q_{rxlevmin,b} + Q_{rxlevminoffset,b}) - Pcompensation,b - Qoffset_{temp,b}$$

$$Squal = Q_{qualmeas,b} - (Q_{qualmin} + Q_{qualminoffset,b}) - Qoffset_{temp,b}$$

The parameter may be a parameter associated with a beam. $Q_{rxlevmeas,b}$ denotes a measured received strength, and $Q_{qualmeas,b}$ denotes a measured received quality. $Q_{rxlevmin}$ denotes the minimum power value needed for operation, and $Q_{qualmin}$ denotes the minimum quality value needed for operation. $Q_{rxlevminoffset}$ denotes an offset value of power for base stations with priority or an offset value of power for beams with priority. $Q_{qualminoffset}$ denotes an offset value of quality for base stations with priority or an offset value of power for beams with priority. Also, $Qoffset_{temp}$ denotes an offset value that is used when a UE fails to reestablish RRC connection (RRC connection reestablishment failure). Pcompensation is a compensation parameter based on the uplink transmission power of a UE.

Pcompensation may take into consideration the beamforming capability of a UE. For example, if the UE forms a narrow beam, the strength of a received signal may increase, and accordingly, the UE may control the value of Pcompensation to be increased or decreased. That is, Pcompensation may be controlled in consideration of the beamforming capability of the UE. The beamforming capability of the UE may include the number of beams, a beam width, a beam gain, the maximum beam gain, an antenna pattern or antenna configuration, a beam orientation, the resolution of beamforming, the maximum transmission power, a beam sweeping length, and the like. New beamforming factors (UL beamforming factors (UL BF factors)) may be defined to show the beamforming capability of the UE as numerical values, and the beamforming factor values may be applied, whereby Pcompensation may be determined according to a function of the beamforming factor values. The beamforming capability of the UE may be defined for each frequency band, and the beamforming factors may be defined for each frequency band.

For example, Pcompensation may be determined to be $f(P_{powerclass}, P_{EMAX},$ UL BF factor), which is a function of $P_{powerclass}, P_{EMAX}$, and a UL BF factor, or may be determined to be $f(P_{powerclass}, P_{EMAX})$–UL BF factor, which indicates subtraction between a $P_{powerclass}$ and $P_{EMAX}$ function and a UL BF factor. $P_{powerclass}$ denotes the maximum RF transmission power that the UE can transmit. $P_{EMAX}$ denotes the maximum uplink transmission power allowed in a cell that the UE camps on. The number of downlink reception beams (a reception beam width or a sweeping length) may be determined by a combination of a first parameter and a second parameter (or the lower of the two values).

- The first parameter is information related to the number of reception beams that a UE supports
- The second parameter is an integer preconfigured for each frequency band According to an embodiment of the present disclosure, in order to apply the beamforming capability of the UE to a procedure for selecting a suitable beam, Pcompensation may be used, or a new factor (Newfactor) may be defined as below and additionally applied. The beamforming capability of the UE may include the number of beams, a beam width, a beam gain, a maximum beam gain, an antenna pattern or antenna configuration, a beam orientation, the resolution of beamforming, a maximum transmission power, a beam sweeping length, and the like.

Srxlev>0 AND Squal>0

Here, Srxlev and Squal may be calculated as below.

$$Srxlev = Q_{rxlevmeas,b} - (Q_{rxlevmin,b} + Q_{rxlevminoffset,b}) - Pcompensation,b - Qoffset_{temp,b} - Newfactor$$

$$Squal = Q_{qualmeas,b} - (Q_{qualmin} + Q_{qualminoffset,b}) - Qoffset_{temp,b}$$

That is, Newfactor may be adjusted in consideration of the beamforming capability of the UE. New beamforming factors (UL beamforming factors) may be defined to show the beamforming capability of the UE as numerical values, and the beamforming factor values may be applied, whereby Newfactor may be determined according to a function of the beamforming factor values. The beamforming capability of the UE may be defined for each frequency band, and the beamforming factors or Newfactor may be defined for each frequency band. The number of downlink reception beams (a reception beam width or a sweeping length) may be determined by a combination of a first parameter and a second parameter (or the lower of the two values).

The first parameter is information related to the number of reception beams that a UE supports The second parameter is an integer preconfigured for each frequency band The beam selection criterion may be applied to an initial beam selection procedure, in addition to a beam reselection procedure. That is, since the UE does not have information associated with a radio-frequency (RF) channel of a network, the UE may measure all RF channels and all beams that the UE is capable of measuring, and may detect the beam having the highest strength for each frequency or for each beam. The UE may determine whether the detailed conditions (whether a cell or beam corresponds to a selected PLMN, a registered PLMN, or a PLMN included in an equivalent PLMN list, whether a cell or beam is not barred, whether a cell or beam belongs to a PLMN satisfying the above conditions and belongs to at least one of the TAs which are not part of a TA list including forbidden TAs, whether a cell or beam satisfies a calculated cell selection criterion or beam selection criterion, and whether the CSG ID of a cell or beam is included in a whitelist of a UE in the case of a CSG cell or beam) are satisfied, and may detect a suitable cell or beam.

The "camped-on-any-cell state" indicates the state in which the UE does not camp on a suitable cell or suitable beam, but camps on an acceptable cell or an acceptable beam. In the acceptable cell or acceptable beam, normal service is not allowed, and only emergency calls are allowed to the UE. The acceptable cell or acceptable beam may be a cell or beam that satisfies the following conditions.

A cell or beam that is not barred

A cell or beam that satisfies a cell selection criterion or a beam selection criterion If the result of the determination in operation 1e-40 shows that the UE is in the "camped-on-any-cell (or beam) state", the UE returns to operation 1e-25. The UE that returns to operation 1e-25 may apply the frequency priority information or the priority information associated with the plurality of beams provided from the SIB, instead of the priority information provided from the RRC connection release message. If the result of the determination in operation 1e-40 shows that the UE is in the "camped normally state", the UE proceeds with operation 1e-45.

In operation 1e-45, the UE determines whether a preconfigured condition is satisfied. For example, the UE determines whether at least one of the following three conditions is satisfied in operation 1e-45. The three conditions are as follows.

A UE is switched to a connected mode.

A T320 timer expires

A PLMN selection process is performed in response to a request from a NAS

If any one of the conditions is satisfied, the UE proceeds with operation 1e-50. In operation 1e-50, the priority information supplied from the RRC connection release message is discarded, and the UE returns to operation 1e-25 and applies the frequency priority information or the priority information associated with the plurality of beams provided from the SIB. If a preconfigured condition is not satisfied in operation 1e-45 (e.g., if any one of the three conditions is not satisfied), the UE proceeds with operation 1e-55, and applies the priority information provided from the RRC connection release message.

The frequency priority information may affect the UE's measurement of a preconfigured frequency. The UE may always measure a frequency having a higher priority than that of the current serving cell (or beam).

Conversely, the UE does not measure a frequency (intra-frequency) that is the same as that of the serving cell (or beam) or a frequency having a priority that is the same as, or lower than, that of the serving cell, for the economical use of power. Measurement may be performed when the channel QoS of the serving cell (or beam) is less than or equal to a preconfigured threshold value. The channel QoS is determined on the basis of Srxlev and Squal, and may be determined on the basis of a preconfigured function of RSRP or RSRQ. Cell (or beam) reselection is performed for movement to a cell (or beam) having a good channel status. If the channel QoS of the current serving cell (or beam) is good, there is no need to move to a cell (or beam) having a frequency of the same or lower priority. Therefore, in order to reduce the amount of power consumed by unnecessary channel measurement, whether to perform measurement is determined on the basis of a preconfigured threshold value.

In the case of the same frequency (intra-frequency), if the QoS of the serving cell (or beam) is the same as or lower than a preconfigured threshold value Sintrasearch, channel measurement is performed with respect to other cells (or beams) having the same frequency. In the case of different frequencies having the same or lower priority, if the QoS of the serving cell (or beam) is the same as or lower than a preconfigured threshold value Snonintrasearch, channel measurement is performed with respect to cells (or beams) of the different frequencies. For the channel QoS, RSRP and RSRQ are generally taken into consideration. The channel QoS is determined on the basis of Srxlev and Squal, and may be determined on the basis of a preconfigured function of RSRP or RSRQ. While measurement is performed, if the channel QoS of a cell (or beam) having a high-priority frequency is higher than a preconfigured threshold value ThreshX-high, the UE reselects the cell (or beam) having the high-priority frequency as a serving cell (or beam). If the channel QoS of a cell (or beam) having a low-priority frequency is higher than a preconfigured threshold value ThreshX-low, and the QoS of the serving cell is lower than ThreshServing-low, the UE reselects the cell (or beam) having the low-priority frequency as a serving cell (or beam).

Cells having the same frequency or cells having frequencies of the same priority may be prioritized according to a preconfigured formula based on a channel QoS. This is referred to as cell ranking. The ranking value of a serving cell is defined to be $Rs = Q_{meas,s} + Q_{Hyst} - Qoffset_{temp}$. Conversely, the ranking value of a neighboring cell is defined to be $Rn = Q_{meas,n} - Qoffset - Qoffset_{temp}$. $Q_{meas,s}$ and $Q_{meas,n}$ denote RSRP values of a serving cell and a neighboring cell. $Q_{Hyst}$ denotes a hysteresis value applied to a serving cell. Qoffset denotes an offset value between a serving cell and a neighboring cell. Also, $Qoffset_{temp}$ denotes an offset value used when a UE fails to reestablish RRC connection (RRC connection reestablishment failure). In the cell-ranking procedure, if the ranking value is high, a corresponding cell is selected as a serving cell.

Beams having the same frequency or having frequencies of the same priority may be prioritized according to a preconfigured formula based on a channel QoS. This is referred to as beam ranking. The ranking value of a serving beam may be defined to be Rs,b=$Q_{meas,s,b}$+$Q_{Hyst,b}$−Qoffset$_{temp,b}$−BFfactor2. Conversely, the ranking value of a neighboring beam is defined to be Rn,b=$Q_{meas,n,b}$−Qoffset, b−Qoffset$_{temp,b}$−BFfactor3. $Q_{meas,s,b}$ and $Q_{meas,n,b}$ denote RSRP values of a serving cell and a neighboring cell. $Q_{Hyst}$ denotes a hysteresis value applied to a serving cell. Qoffset denotes an offset value between a serving cell and a neighboring cell. Also, Qoffset$_{temp}$ denotes an offset value used when a UE fails to reestablish RRC connection (RRC connection reestablishment failure). In the beam ranking procedure, if a ranking value is high, a corresponding beam is selected as a serving beam. BFfactor2 and BFfactor3 may be the same value, or may be different values. BFfactor2 and BFfactor3 may be adjusted in consideration of the beamforming capability of the UE. The beamforming capability of the UE may include the number of beams, a beam width, a beam gain, the maximum beam gain, an antenna pattern or antenna configuration, a beam orientation, the resolution of beamforming, the maximum transmission power, and the like. New beamforming factors (UL beamforming factors) may be defined to show the beamforming capability of the UE as numerical values, and the beamforming factor values may be applied, whereby BFfactor2 and BFfactor3 may be determined according to the function of the beamforming factor values. The beamforming capability of the UE may be defined for each frequency band, and the beamforming factors may be defined for each frequency band.

Figure 1F:
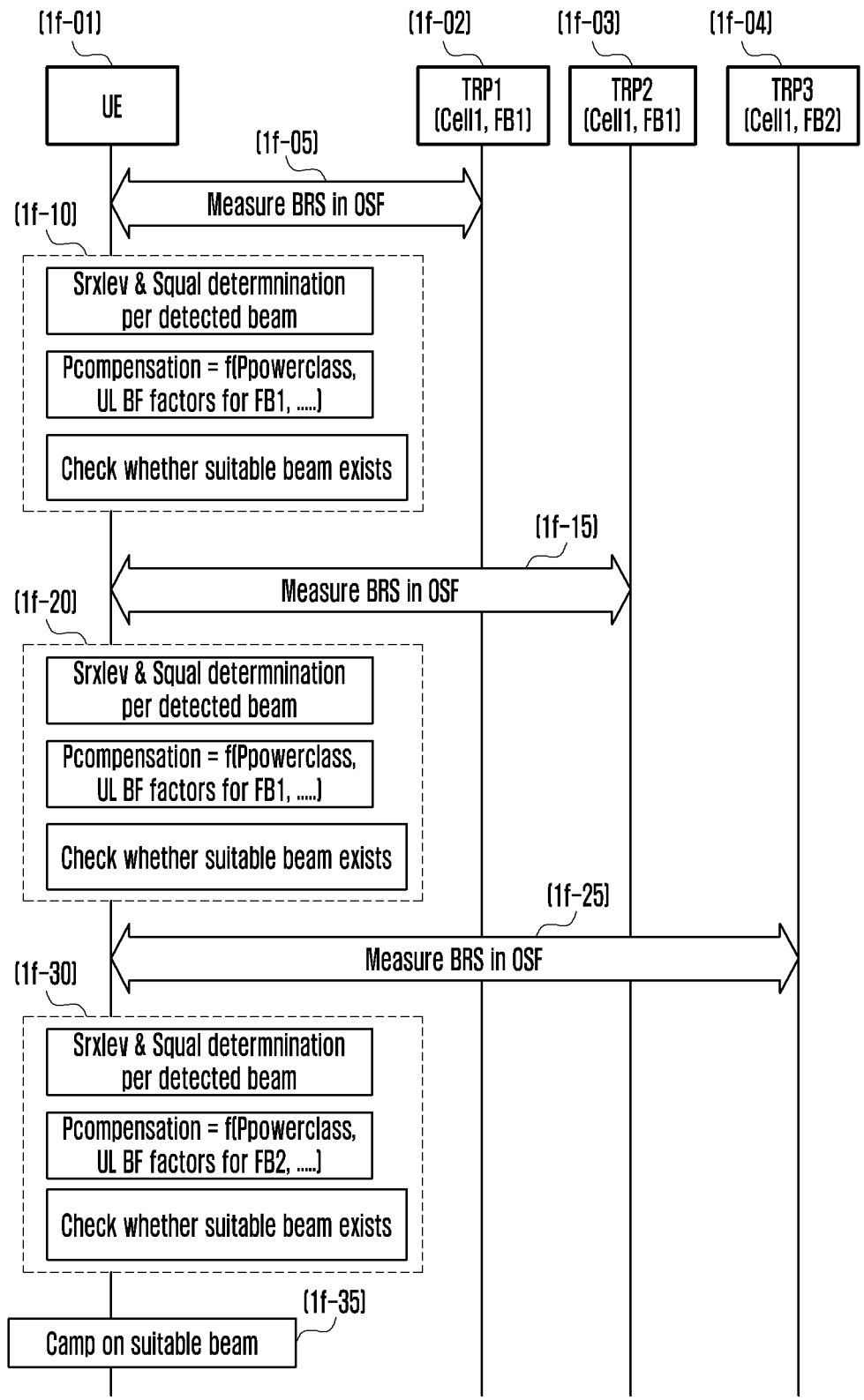
FIG. 1F is a diagram illustrating a procedure of reselecting a suitable beam in a next-generation mobile communication system that uses a plurality of beams according to an embodiment of the present disclosure.

FIG. 1F is a diagram illustrating a procedure of reselecting a suitable beam in a next-generation mobile communication system that uses a plurality of beams according to an embodiment of the present disclosure. The operations of FIG. 1F may correspond to detailed operations of operation 1e-40 of FIG. 1E.

Referring to FIG. 1F, FIG. 1F assumes an environment in which three transmission and reception points (TRP) 1f-02, 1f-03, and 1f-04 around a UE 1f-01 use a plurality of beams in a single cell. It is assumed that TRP1 1f-02 and TRP2 1f-03 use the same frequency band 1 (FB1), and that TRP3 1f-04 uses frequency band 2 (FB2) in the cell. The UE 1f-01 may perform RF channel scanning with respect only to some bands that satisfy a preconfigured condition from among all frequency bands of next-generation mobile communication system that the UE 1f-01 supports, or may perform RF channel scanning with respect to all bands of the next-generation mobile communication system that the UE 1f-01 supports. The UE performs RF channel scanning such that a downlink reception beam is formed to have a preconfigured beam width in a preconfigured direction, instead of performing downlink reception beam sweeping in order to detect a downlink reception beam that accords with a downlink transmission beam. If the UE 1f-01 detects a carrier, the UE 1f-01 may select the beam that satisfies the beam selection criterion of the first conditions from among downlink beams of the corresponding carrier, so as to receive system information. Subsequently, the UE 1f-01 determines whether the remaining first conditions are satisfied, and if the beam satisfies all of the first conditions, the UE 1f-01 selects the beam as a suitable beam and camps thereon.

For some reason, if the beam selection criterion of the UE 1f-01 is not satisfied, the UE 1f-01 may perform beam reselection. The UE 1f-01 performs downlink synchronization with TRP1 1f-02 and receives system information.

In operation 1f-05, the UE 1f-01 measures a beam reference signal. The UE 1f-01 measures beam reference signals for respective downlink beams in a subframe (overhead subframe (OSF) 1c-05 of FIG. 1C), which includes an overhead signal and is repeatedly transmitted at regular intervals.

In operation 1f-10, the UE 1f-01 calculates Srxlev and Squal so as to determine whether each beam satisfies the beam selection criterion on the basis of the measurement of a beam reference signal. Also, the UE 1f-01 determines whether a suitable beam exists on the basis of the calculation of Srxlev and Squal.

In the process of calculating Srxlev and Squal, Pcompensation may be determined in consideration of the beamforming capability of the UE 1f-01. The beamforming capability of the UE 1f-01 may include the number of beams, a beam width, a beam gain, the maximum beam gain, an antenna pattern or antenna configuration, a beam orientation, the resolution of beamforming, the maximum transmission power, a beam sweeping length, and the like. New beamforming factors (UL beamforming factors (UL BF factors)) may be defined to show the beamforming capability of the UE 1f-01 as numerical values, and the beamforming factor values may be applied, whereby Pcompensation may be determined according to a function of the beamforming factor values. The beamforming capability of the UE 1f-01 may be defined for each frequency band, and the beamforming factors may be defined for each frequency band. For example, Pcompensation may be determined to be f($P_{powerclass}$, $P_{EMAX}$, UL BF factor), which is a function of $P_{powerclass}$, $P_{EMAX}$, and a UL BF factor, or may be determined to be f($P_{powerclass}$, $P_{EMAX}$)−UL BF factor, which indicates subtraction between a $P_{powerclass}$ and $P_{EMAX}$ function and a UL BF factor. $P_{powerclass}$ denotes the maximum RF transmission power that the UE can transmit. $P_{EMAX}$ denotes the maximum uplink transmission power allowed in a cell that the UE camps on.

In operation 1f-10, the UE 1f-01 determines Pcompensation by taking into consideration the beamforming capability of the UE 1f-01 as described above, and calculates Srxlev and Squal so as to determine whether a suitable beam exists from among beams measured in operation 1f-05. If a suitable beam exists, the UE 1f-01 may camp on the identified suitable beam.

When it is determined that a suitable beam does not exist, the UE 1f-01 performs downlink synchronization with another TRP again, and receives system information. For example, the UE 1f-01 performs downlink synchronization with TRP2 1f-03 and receives system information.

In operation 1f-05, the UE 1f-01 measures a beam reference signal. The UE 1f-01 measures beam reference signals for respective downlink beams in a subframe (overhead subframe (OSF) 1c-05 of FIG. 1C) that includes an overhead signal and is repeatedly transmitted at regular intervals.

In operation 1f-20, the UE 1f-01 calculates Srxlev and Squal so as to determine whether each beam satisfies the beam selection criterion on the basis of the measurement of a beam reference signal. Also, the UE 1f-01 determines whether a suitable beam exists on the basis of the calculation of Srxlev and Squal. In the process of calculating Srxlev and Squal, Pcompensation may be determined in consideration of the beamforming capability of the UE 1f-01. As described in operation 1f-10, the UE 1f-01 determines Pcompensation by taking into consideration the beamforming capability of the UE 1f-01, and calculates Srxlev and Squal, so as to determine whether a suitable beam exists from among beams measured in operation 1f-15. If a suitable beam exists, the UE 1f-01 may camp on the identified suitable beam.

When it is determined that a suitable beam does not exist, the UE 1f-01 performs downlink synchronization with another TRP again, and receives system information. For example, the UE 1f-01 performs downlink synchronization with TRP3 1f-04 and receives system information.

In operation 1f-25, the UE 1f-01 measures a beam reference signal. The UE 1f-01 measures beam reference signals for respective downlink beams in a subframe (overhead subframe (OSF) 1c-05 of FIG. 1C) that includes an overhead signal and is repeatedly transmitted at regular intervals.

In operation 1f-30, the UE 1f-01 calculates Srxlev and Squal so as to determine whether each beam satisfies the beam selection criterion on the basis of the measurement of a beam reference signal. Also, the UE 1f-01 determines whether a suitable beam exists on the basis of the calculation of Srxlev and Squal.

In the process of calculating Srxlev and Squal, Pcompensation may be determined in consideration of the beamforming capability of the UE 1f-01. In operation 1f-30, the UE 1f-01 determines Pcompensation by applying UL BF factors which are different depending on a frequency band since TRP3 1f-04 uses frequency band 2 (FB2), which is different from the frequency band of TRP1 1f-02 and TRP2 1f-03. The UL BF factors may be factors that quantify the beamforming capability of a UE, such as the number of beams, a beam width, a beam gain, the maximum beam gain, an antenna pattern or antenna configuration, a beam orientation, the resolution of beamforming, the maximum transmission power, a beam sweeping length, and the like, as described in operation 1f-10, and may be different depending on a frequency band. In operation 1f-30, Pcompensation is determined in consideration of the beamforming capability of the UE, and Srxlev and Squal are calculated so as to determine whether a suitable beam exists from among beams measured in operation 1f-25. If a suitable beam exists, the UE 1f-01 may camp on the identified suitable beam in operation 1f-35. If a suitable beam does not exist, the UE performs downlink synchronization with another TRP and receives system information again, as described above.

Figure 1G:
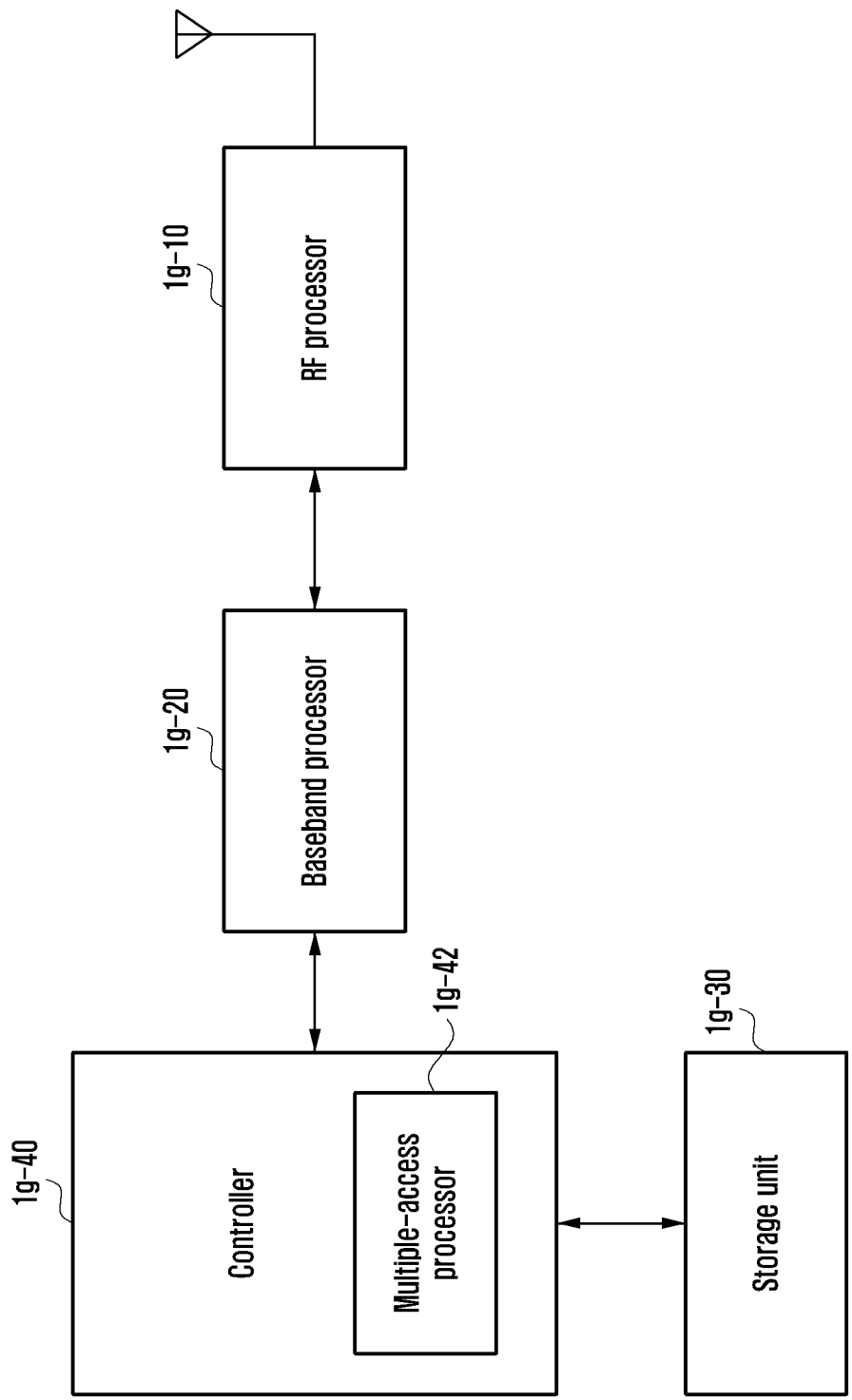
FIG. 1G is a block diagram of the internal structure of a UE according to an embodiment of the present disclosure.

FIG. 1G is a block diagram of the structure of a UE according to an embodiment of the present disclosure.

Referring to FIG. 1G, the UE may include a radio-frequency (RF) processor 1g-10, a baseband processor 1g-20, a storage unit 1g-30, and a controller 1g-40.

The RF processor 1g-10 performs a function for transmitting and receiving a signal via a radio channel, such as band conversion and amplification of a signal. That is, the RF processor 1g-10 up-converts a baseband signal provided from the baseband processor 1g-20 into an RF band signal, transmits the RF band signal via an antenna, and down-converts the RF band signal received via the antenna into a baseband signal. For example, the RF processor 1g-10 may include a transmission filter, a reception filter, an amplifier, a mixer, an oscillator, a digital-to-analog convertor (DAC), an analog-to-digital convertor (ADC), and the like. Although only a single antenna is illustrated in the drawing, the UE may include a plurality of antennas. In addition, the RF processor 1g-10 may include a plurality of RF chains. Moreover, the RF processor 1g-10 may perform beamforming. For the beamforming, the RF processor 1g-10 may control the phase and the size of each signal transmitted/received via a plurality of antennas or antenna elements. Also, the RF processor may perform MIMO, and may receive a plurality of layers while performing a MIMO operation. The RF processor 1g-10 may appropriately configure a plurality of antennas or antenna elements according to the control of the controller so as to perform reception beam sweeping, or may control the orientation of a reception beam and a beam width such that a reception beam accords with a transmission beam.

The baseband processor 1g-20 performs a function for conversion between a baseband signal and a bitstream according to the physical layer standard of the system. For example, in the case of data transmission, the baseband processor 1g-20 generates complex symbols by encoding and modulating a transmission bitstream. Further, in the case of data reception, the baseband processor 1g-20 reconstructs a reception bitstream by demodulating and decoding a baseband signal provided from the RF processor 1g-10. For example, according to an orthogonal-frequency-division-multiplexing (OFDM) scheme, in the case of data transmission, the baseband processor 1g-20 generates complex symbols by encoding and modulating a transmission bitstream, maps the complex symbols to subcarriers, and then configures OFDM symbols via an inverse fast Fourier transform (IFFT) operation and a cyclic prefix (CP) insertion. Further, in the case of data reception, the baseband processor 1g-20 divides the baseband signal provided from the RF processor 1g-10 into OFDM symbol units, reconstructs the signals mapped to the subcarriers via a fast Fourier transform (FFT) operation, and then reconstructs a reception bitstream via demodulation and decoding.

The baseband processor 1g-20 and the RF processor 1g-10 transmit and receive a signal, as described above. Accordingly, each of the baseband processor 1g-20 and the RF processor 1g-10 may be referred to as a transmitter, a receiver, a transceiver, or a communication unit. In addition, at least one of the baseband processor 1g-20 or the RF processor 1g-10 may include a plurality of communication modules so as to support many different radio access technologies. In addition, at least one of the baseband processor 1g-20 or the RF processor 1g-10 may include different communication modules to process signals of different frequency bands. For example, the different radio access technologies may include an LTE network, an NR network, and the like. Further, the different frequency bands may include a super-high frequency (SHF) (e.g., 2.5 GHz and 5 GHz) band and a millimeter (mm) wave (e.g., 60 GHz) band.

The storage unit 1g-30 stores data such as a basic program, an application program, and configuration information for the operation of the UE. The storage unit 1g-30 may provide stored data in response to a request from the controller 1g-40.

The controller 1g-40 controls the overall operation of the UE. For example, the controller 1g-40 transmits and receives a signal via the baseband processor 1g-20 and the RF processor 1g-10. Also, the controller 1g-40 writes and reads data to/from the storage unit 1g-40. To this end, the controller 1g-40 may include at least one processor. For example, the controller 1g-40 may include a communication processor (CP), which performs control for communication, and an application processor (AP), which controls a higher layer such as an application program. The controller 1g-40 may include a baseband processor 1g-42.

According to an embodiment of the present disclosure, the controller 1g-40 may perform control so as to receive system information including first beam reselection priority information, to receive a radio resource control (RRC) message including second beam reselection priority information, to determine whether the UE camps on a suitable beam, and to apply one of the first beam reselection priority information and the second beam reselection priority information on the basis of the result of the determination.

Also, the controller 1g-40 may perform control so as to determine whether the UE camps on a suitable beam on the basis of the beamforming capability of the UE. The beamforming capability of the UE corresponds to at least one beamforming factor, and may be defined for each frequency band. Also, the beamforming capability of the UE may include at least one of the number of beams, a beam width, a beam gain, the maximum beam gain, an antenna pattern, a beam orientation, the resolution of beamforming, the maximum transmission power, or a beam sweeping length.

If the UE does not camp on a suitable beam, the controller 1g-40 may perform control so as to apply the first beam reselection priority information. If the UE camps on a suitable beam, the controller 1g-40 performs control so as to apply the second beam reselection priority information. Also, if the UE camps on a suitable beam and a preconfigured condition is satisfied, the controller 1g-40 may perform control so as to delete the second beam reselection priority information.

Also, the controller 1g-40 may control the operation of the UE according to the first embodiment of the present disclosure. The controller 1g-40 may control the operation of the UE as described with reference to FIGS. 1A to 1F.

Figure 1H:
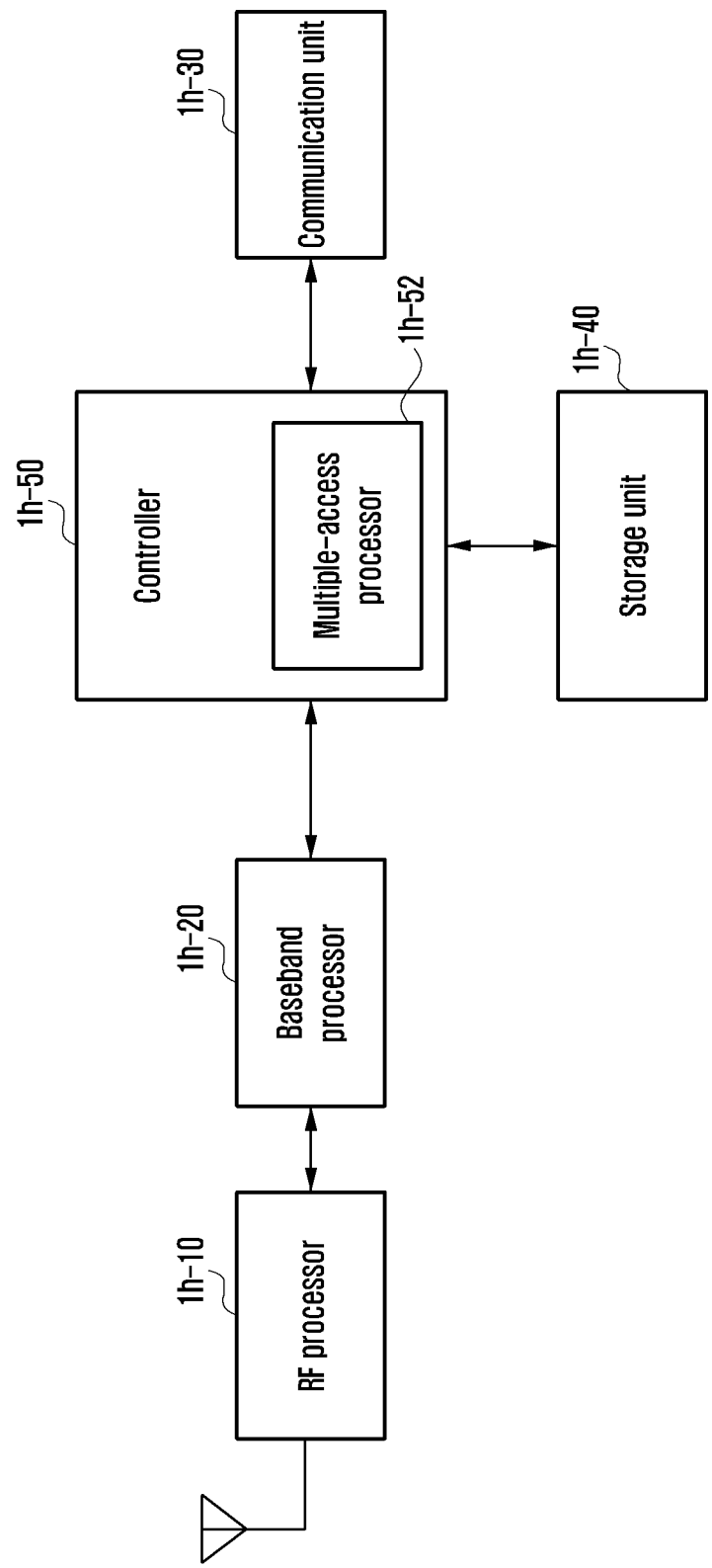
FIG. 1H is a block diagram of the configuration of a base station transceiver apparatus according to an embodiment of the present disclosure.

FIG. 1H is a block diagram of a TRP in a wireless communication system according to an embodiment of the present disclosure. A base station may include at least one TRP.

Referring to FIG. 1H, the base station may include an RF processor 1h-10, a baseband processor 1h-20, a communication unit 1h-30, a storage unit 1h-40, and a controller 1h-50.

The RF processor 1h-10 performs a function for transmitting and receiving a signal via a radio channel, such as band conversion and amplification of a signal. That is, the RF processor 1h-10 up-converts a baseband signal provided from the baseband processor 1h-20 into an RF band signal and then transmits the converted signal via an antenna, and down-converts an RF band signal received via the antenna into a baseband signal. For example, the RF processor 1h-10 may include a transmission filter, a reception filter, an amplifier, a mixer, an oscillator, a DAC, and an ADC. Although only a single antenna is illustrated in the drawing, a first access node may include a plurality of antennas. In addition, the RF processor 1h-10 may include a plurality of RF chains. Moreover, the RF processor 1h-10 may perform beamforming. For the beamforming, the RF processor 1h-10 may control the phase and the size of each of the signals transmitted and received via a plurality of antennas or antenna elements. The RF processor may perform downlink MIMO operation by transmitting one or more layers.

The baseband processor 1h-20 performs a function of converting between a baseband signal and a bitstream according to the physical layer standard of a first radio access technology. For example, in the case of data transmission, the baseband processor 1h-20 generates complex symbols by encoding and modulating a transmission bitstream. Further, in the case of data reception, the baseband processor 1h-20 reconstructs a reception bitstream by demodulating and decoding a baseband signal provided from the RF processor 1h-10. For example, according to an OFDM scheme, in the case of data transmission, the baseband processor 1h-20 generates complex symbols by encoding and modulating the transmission bitstream, maps the complex symbols to subcarriers, and then configures OFDM symbols via an IFFT operation and CP insertion. Also, in the case of data reception, the baseband processor 1h-20 divides a baseband signal provided from the RF processor 1h-10 into OFDM symbol units, restores signals mapped onto the subcarriers via the FFT operation, and restores a received bitstream via demodulation and decoding. The baseband processor 1h-20 and the RF processor 1h-10 transmit and receive a signal as described above. Accordingly, each of the baseband processor 1h-20 and the RF processor 1h-10 may be referred to as a transmitter, a receiver, a transceiver, a communication unit, or a wireless communication unit.

The communication unit 1h-30 provides an interface for performing communication with other nodes in a network. The communication unit 1h-30 may be referred to as "backhaul communication unit".

The storage unit 1h-40 may store data, such as a basic program, an application program, configuration information, or the like, used for operating the main base station. Particularly, the storage unit 1h-40 may store information associated with a bearer allocated to a connected UE, a measurement result reported from a connected UE, and the like. Also, the storage unit 1h-40 may store information which is a criterion to determine whether to provide or interrupt multiple access to a UE. The storage unit 1h-40 may provide stored data in response to a request from the controller 1h-50.

The controller 1h-50 may control the overall operation of the main base station. For example, the controller 1h-50 may transmit and receive a signal via the baseband processor 1h-20 and the RF processor 1h-10, or via the backhaul communication unit 1h-30. Also, the controller 1h-50 writes and reads data to/from the storage unit 1h-40. To this end, the controller 1h-50 may include at least one processor. The controller 1h-50 may include a baseband processor 1h-52. Also, the controller 1h-50 may control the operation of the base station or TRP according to the first embodiment of the present disclosure. The controller 1h-50 may control the operations of the base station or TRP which have been described with reference to FIGS. 1A to 1F.

Second Embodiment

Figure 2A:
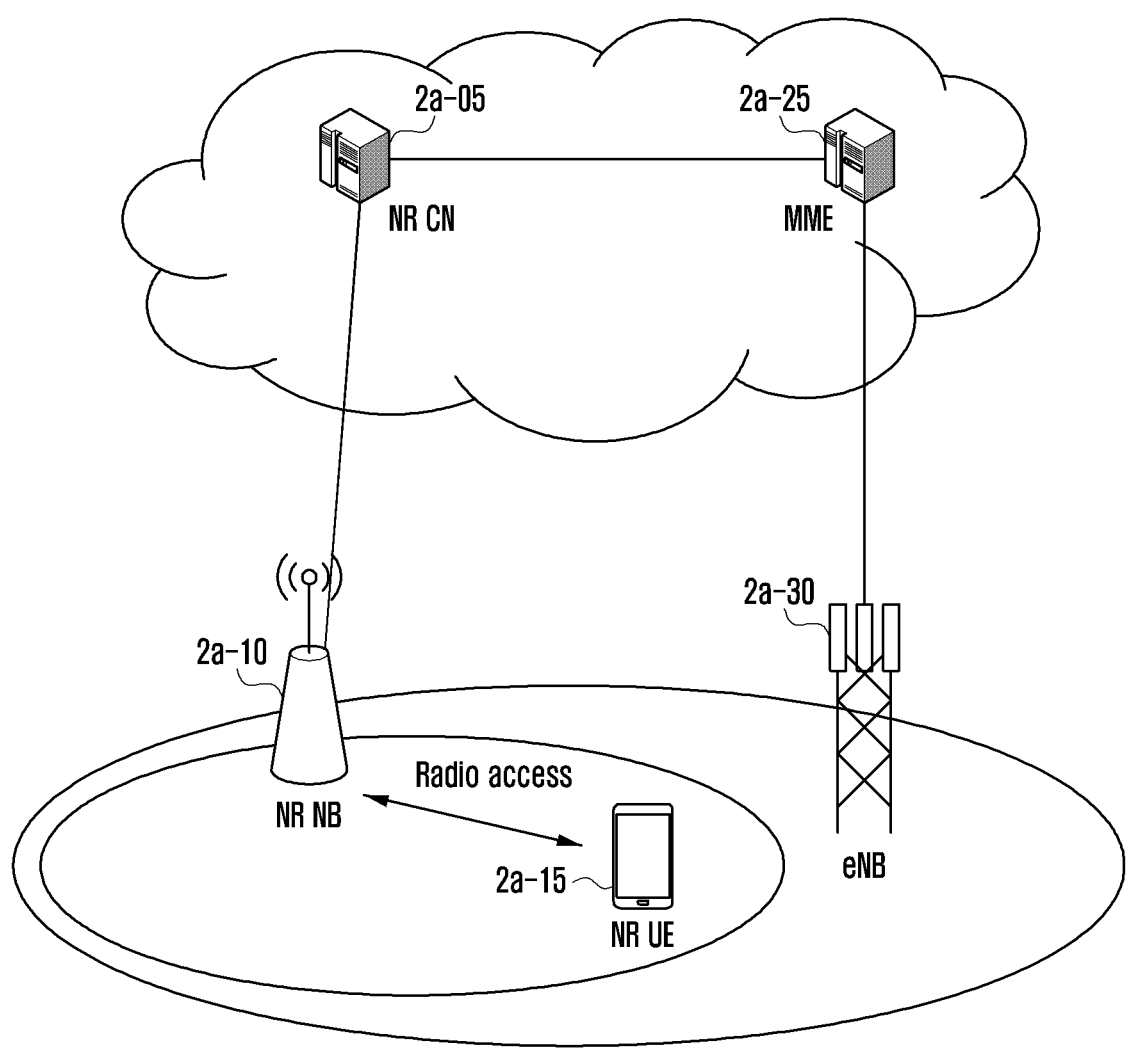
FIG. 2A is a diagram illustrating the structure of a next-generation mobile communication system according to an embodiment of the present disclosure.

FIG. 2A is a diagram illustrating the structure of a next-generation mobile communication system according to an embodiment of the present disclosure.

Referring to FIG. 2A, a radio access network of the next-generation mobile communication system includes a new radio node B (hereinafter referred to as NR NB or a base station) 2a-10 and a new radio core network (NR CN) 2a-05, as illustrated in the drawing. A new radio user equipment (NR UE or UE) 2a-15 may access an external network via the NR NB 2a-10 and the NR CN 2a-05.

In FIG. 2A, the NR NB 2a-10 may correspond to an evolved node B (eNB) in the legacy LTE system. The NR NB is connected to the NR UE 2a-15 via a radio channel, and may provide better service than the legacy node B. In the next-generation mobile communication system, all user traffic is serviced via a shared channel, and thus a device that collects status information of UEs, such as a buffer status, an available transmission power status, a channel status or the like, and performs scheduling is needed, and the NR NB 2a-10 takes charge of the same. One NR NB generally controls a plurality of cells. In order to implement high-speed data transmission compared to legacy LTE, a bandwidth greater than or equal to the maximum legacy bandwidth may be needed, orthogonal frequency division multiplexing (OFDM) is used as a radio access technology, and beamforming technology is additionally used. Further, an adaptive modulation and coding (hereinafter, referred to as AMC) scheme, which determines a modulation scheme and a channel coding rate according to the channel status of the UE, is applied to the LTE system. The NR NB may include one or more TRPs and a single central device. The TRP is a device for transmitting and receiving a radio signal, and the central device is a device that takes charge of an RRC function such as mobility management or connection management associated with a UE.

The NR CN 2a-05 supports mobility, configures a bearer, or configures QoS. The NR CN is a device that is in charge of various control functions in addition to a mobility management function associated with a UE, and may be connected to a plurality of node Bs. Also, the next-generation mobile communication system may interoperate with the legacy LTE system, and the NR CN may be connected to the MME 2a-25 via a network interface. The MME is connected to an eNB 2a-30, which is the legacy node B.

The NR is aimed at supporting a faster data transmission speed than legacy LTE. As a method of increasing the data transmission speed in the NR, a method is being considered in which a signal is transmitted using a wide frequency band existing in a frequency band greater than or equal to 6 GHz. That is, it is being considered to use a millimeter wave (hereinafter mmWave) band, such as a 28 GHz band, a 60 GHz band, or the like, in order to increase a transmission rate. In a frequency band, which is considered for a mmWave band, signal attenuation per distance is relatively large, and thus, transmission on the basis of a directional beam generated using multiple antennas is required in order to secure coverage. In the case of directional-beam-based transmission, transmission or reception of a signal may be difficult at a location where a beam is not formed. In order to overcome the above-described drawback, beam sweeping is used. Beam sweeping is a scheme in which a transmission apparatus sequentially sweeps or rotates and transmits directional beams having a preconfigured beam width, such that a beam is received by a reception apparatus which exists within a beam range of the transmission apparatus.

Figure 2B:
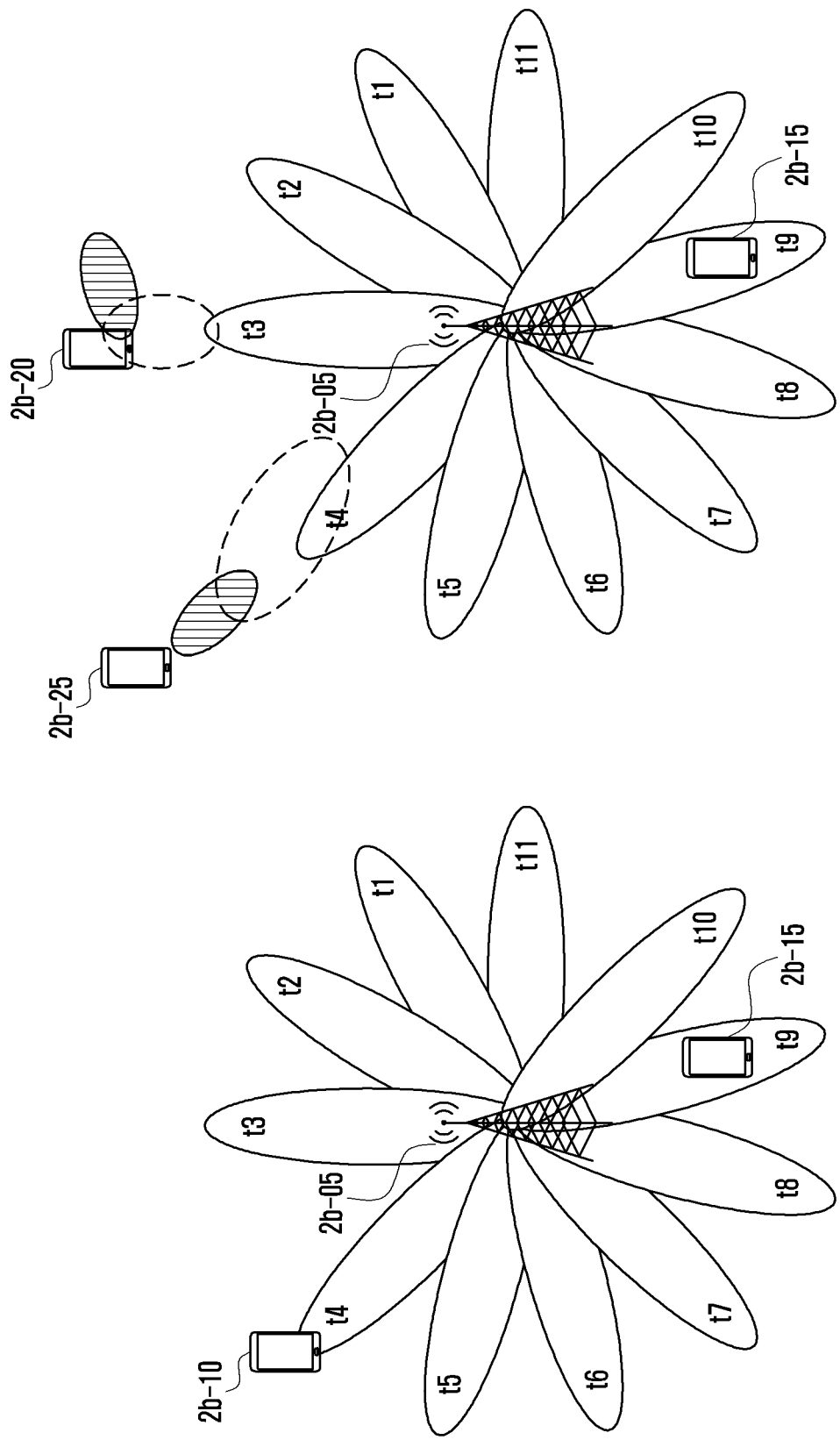
FIG. 2B is a diagram illustrating beam sweeping of an NR system according to an embodiment of the present disclosure.

FIG. 2B is a diagram illustrating beam sweeping of a next-generation mobile communication system according to an embodiment of the present disclosure.

Referring to FIG. 2B, for example, a transmission reception point (TRP) 2b-05 (a device for transmitting and receiving a radio signal in a network, an NR NB, or a device connected to an NR NB) transmits a directional beam having a preconfigured width at a preconfigured point in time t1 in a preconfigured direction, and transmits a directional beam having the same width at t2 in another direction, and so on, whereby the beams are transmitted in all directions during a preconfigured period of time. Accordingly, a downlink signal transmitted by a base station arrives at a UE 2b-15 at t9, and arrives at a UE 2b-10 at t4.

The beam sweeping is mainly used when a base station does not know the orientation of a directional beam to be applied to a UE, and a common overhead signal to be transmitted to an idle-state UE may be transmitted via beam sweeping.

A directional reception beam, in addition to a directional transmission beam, may be used in order to increase beam efficiency. When a directional reception beam is used, the directionality/orientation of a transmission beam and the directionality/orientation of the reception beam need to be aligned with each other. For example, although a UE 2b-20 is located in the area of a transmission beam, if the directionality of a reception beam is not aligned with the directionality of the transmission beam, the UE may not receive the transmission beam. Conversely, if the directionality of a transmission beam and the directionality of a reception beam are aligned with each other, a UE 2b-25 may transmit and receive data with higher efficiency than when the reception beam is not used.

In order to detect a reception beam that accords with a transmission beam, a reception apparatus may sequentially rotate the directionality of a reception beam with respect to the same transmission beam so as to detect the reception beam providing best quality of reception. This process is referred to as reception beam sweeping.

A mobile communication system that uses a directional beam, an analog beam, or a hybrid beam may transmit the common overhead signal in a preconfigured subframe via beam sweeping, and may perform transmission and reception of user data with a preconfigured UE using a unidirectional beam in another subframe.

Figure 2C:
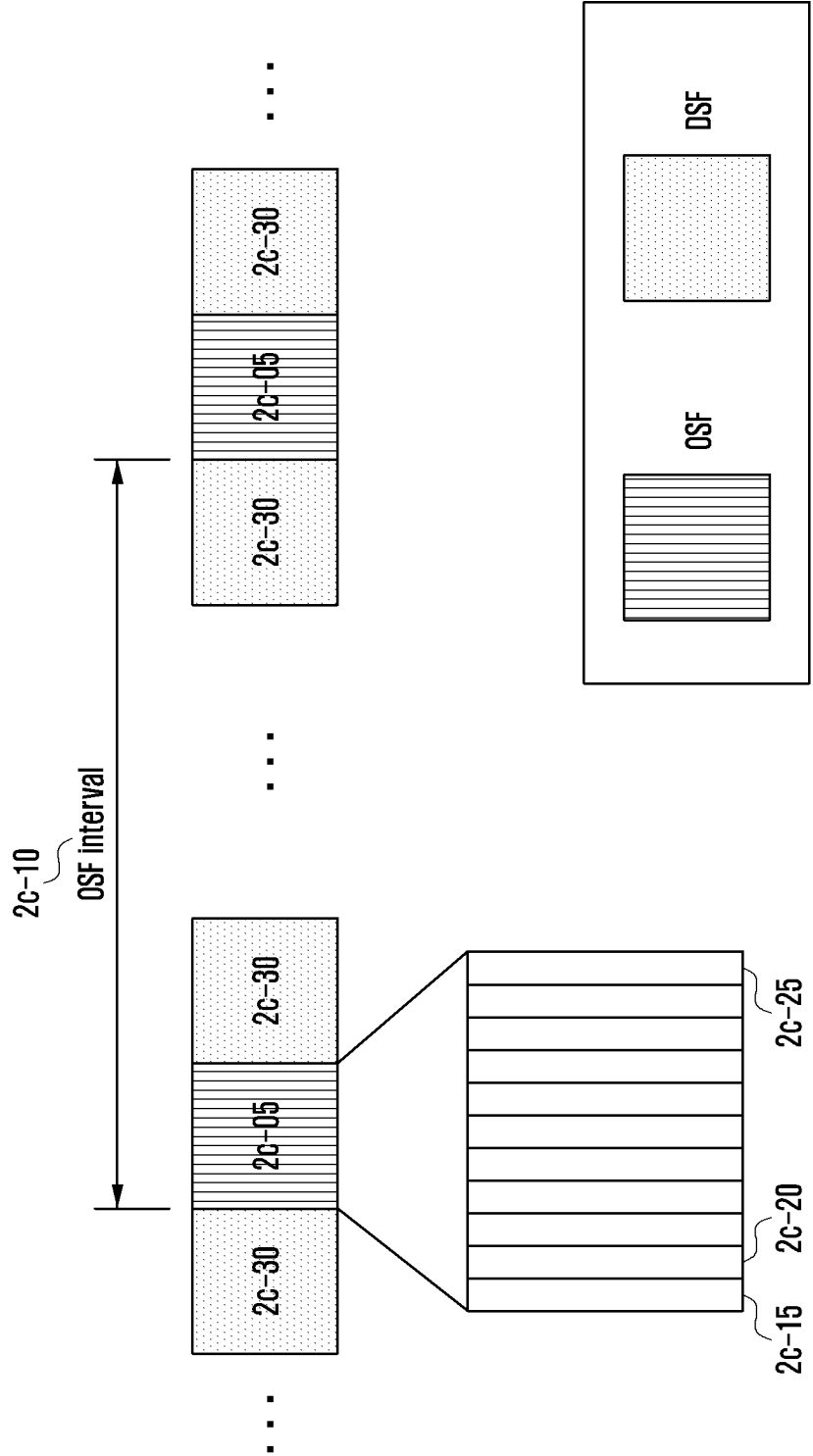
FIG. 2C is a diagram illustrating the structure of a subframe of an NR system according to an embodiment of the present disclosure.

FIG. 2C is a diagram illustrating the structure of a subframe of a next-generation mobile communication system according to an embodiment of the present disclosure.

Referring to FIG. 2C, a subframe 2c-05 (overhead subframe (OSF)) that includes an overhead signal may be repeatedly transmitted at regular intervals 2c-10. A single subframe includes a plurality of symbols, and a single directional beam is transmitted per symbol in an OSF. For example, a first symbol 2c-15 of the OSF corresponds to t1, a second symbol 2c-20 corresponds to t2, and an eleventh symbol 2c-25 corresponds to t1 1, and directional beams (or analog beams), which are configured to have the same beam width for each symbol, to cover different areas, and to have directionality of different directions, may be transmitted.

An overhead signal below may be transmitted for each symbol of the OSF.

A signal for establishing downlink synchronization, such as a primary synchronization signal (PSS), secondary synchronization signal (SSS), or the like A beam reference signal (BRS) that is capable of measuring a received signal strength or a received signal quality for each beam System information, a master information block (MIB) or physical broadcast channel (PBCH)

The PBCH includes information essential for a UE to access a system, for example, a downlink beam bandwidth, a system frame number, and the like The PBCH may be transmitted, including a first parameter related to reception beam configuration of a UE.

For reference, preconfigured system information (e.g., random access resource information or the like) may be transmitted via another subframe, as opposed to a subframe in which a PSSS/SSS is transmitted.

The same beam is transmitted in consecutive symbols in a subframe different from the periodically transmitted OSF, and user data associated with a preconfigured connected-state UE may be transmitted via the beam. Hereinafter, the subframe different from the OSF is referred to as a data subframe (DSF) 2c-30.

A UE needs to continuously measure and evaluate the received strength/quality of a downlink transmission beam when performing an idle state operation and a connected state operation (hereinafter, the received quality in the present disclosure indicates both received strength (received power) and received quality). In the analog/hybrid beam system, the received quality of a downlink transmission beam may be different on the basis of a downlink reception beam configuration (the downlink reception beam configuration indicates the directionality/orientation of a downlink reception beam, a width, an angle, the number of beams needed to cover all directions, a beam sweeping length, and the like). For example, even if the same downlink transmission beam is used, if a reception beam of 15 degrees is used, better received quality may be obtained compared to the case of using a reception beam of 30 degrees. That is, the received quality may be different depending on the width of a received beam. If the width of a received beam is narrow, a relatively better received quality may be obtained. Conversely, if a reception beam of 30 degrees is used, the transmission beam needs to be received 12 times in order to recognize the beam orientation that provides the best quality. If a reception beam of 15 degrees is used, the transmission beam needs to be received 24 times.

An idle-state UE needs to measure the quality of a current serving downlink transmission beam once at least every discontinuous reception interval. The serving downlink transmission beam indicates the downlink transmission beam that the UE camps on or via which the UE is receiving data. Depending on the reception beam configuration that the UE applies, the amount of time and the amount of charge of a battery spent for measuring the quality of a transmission beam may be different. For example, if the UE applies reception beam configuration 1 (a configuration that needs to perform reception beam sweeping 24 times in order to cover all directions, a range of 360 degrees, i.e., a downlink reception beam configuration that performs sweeping of a downlink reception beam having a width of 15 degrees in a preconfigured direction), 24 units of time may be spent for measuring the quality of a serving downlink transmission beam. If the UE applies reception beam configuration 2 (a configuration that needs to perform reception beam sweeping 4 times in order to cover all directions, a range of 360 degrees, i.e., a downlink reception beam configuration that performs sweeping of a downlink reception beam having a width of 90 degrees in a preconfigured direction), only 4 units of time may be spent measuring the serving downlink transmission beam. A unit of time is an interval between the same transmission beam, or a transmission beam transmission interval, or an OSF interval.

The downlink reception beam configuration of the UE is related to the capability of the UE. The number of reception beams or the width of a reception beam that is needed to cover all directions may be determined by an antenna element/array included in the UE. A high-performance UE covers all directions using a larger number of reception beams, and may have high reception performance. A low-performance UE covers a smaller number of reception beams and may have low reception performance.

The major role of an idle-state UE is to detect whether paging occurs, and high reception performance may not be needed to receive a paging message. If a high-performance UE spends 24 units of time for single measurement of a downlink transmission beam only for receiving paging well, this may result in insignificant improvement in performance and significant battery charge expense. In addition, when idle-state UEs measure a serving cell/beam, if the amount of time spent for the measurement is different depending on the performance of a UE, it is difficult to guarantee consistent performance of the system as a whole.

In order to overcome the above-described problem, in the second embodiment of the present disclosure, an idle-state UE applies a preconfigured common configuration when measuring a downlink reception beam, and a connected-state UE applies a preconfigured dedicated configuration. A UE determines the common configuration by taking into consideration the UE's capability and reference configuration information associated with a TRP/cell/frequency/frequency band, and determines the dedicated configuration by taking into consideration the UE's capability, or as indicated by a dedicated message from a base station.

Figure 2D:
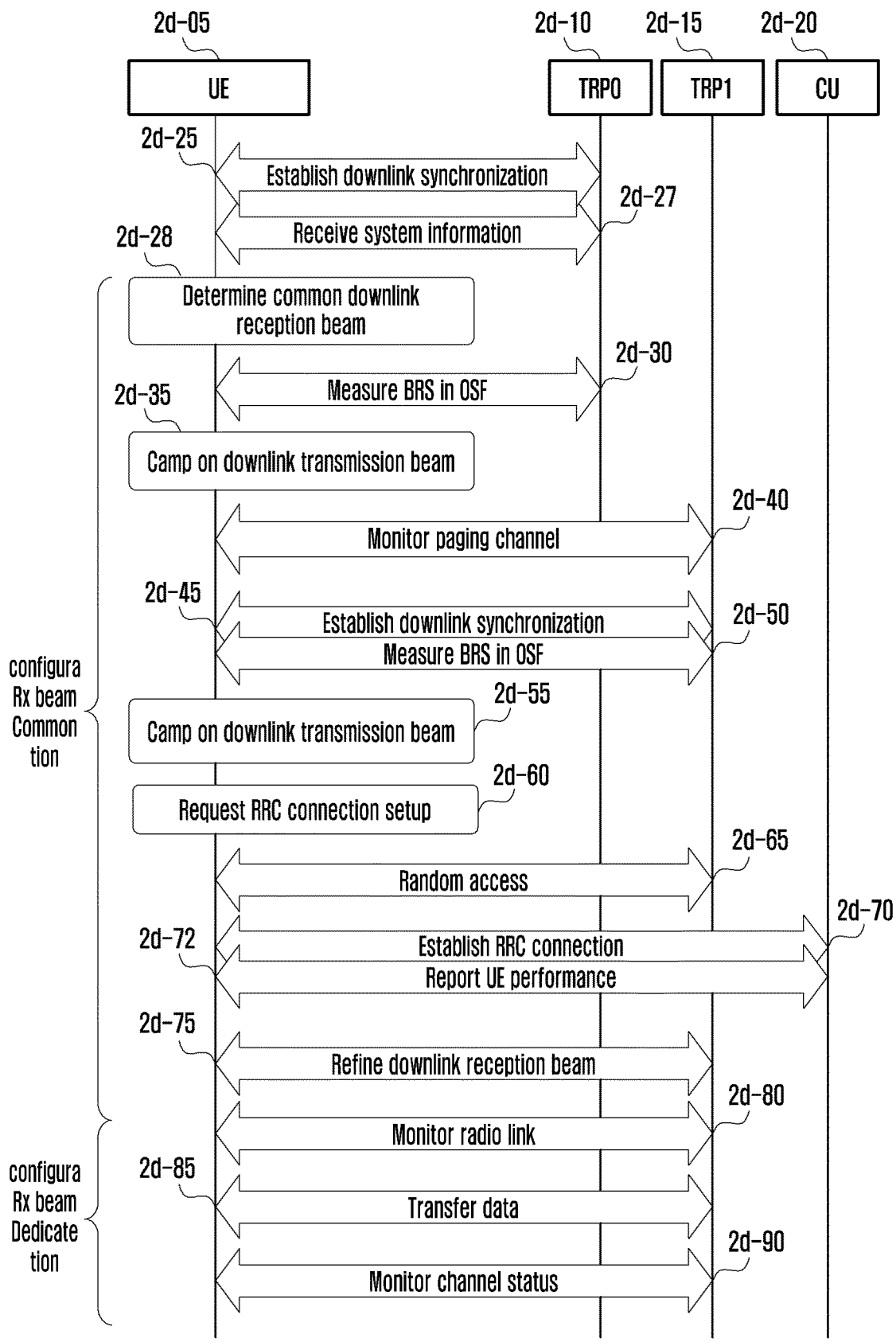
FIG. 2D is a diagram illustrating the overall operation according to an embodiment of the present disclosure.

FIG. 2D is a diagram illustrating the overall operation according to an embodiment of the present disclosure.

Referring to FIG. 2D, in a mobile communication system including a UE 2d-05 and at least one TRP 2d-10 and 2d-15, TRP0 2d-10 and TRP1 2d-15 transmit OSFs at regular intervals.

In operation 2d-25, the UE 2d-05 receives a PSS/SSS of an OSF transmitted from the TRP0 2d-10, and establishes downlink synchronization.

In operation 2d-27, the UE 2d-05 may receive preconfigured system information in the OSF. The system information may include reference configuration information (or parameter 1).

In operation 2d-28, the UE 2d-05 may determine a common downlink reception beam configuration on the basis of the reference configuration information. The common downlink reception beam configuration may be referred to as a common reception beam configuration, first reception beam configuration, first common reception beam configuration, or the like. For example, the UE 2d-05 may take into consideration the reference configuration information and the capability of the UE 2d-05, and may determine the common downlink reception beam configuration to be the lower value therebetween.

The scope of the reference configuration information may include a TRP, a cell, and a frequency or frequency band. If the scope is a TRP, the UE 2d-05 may take into consideration the reference configuration information when receiving or measuring a downlink transmission beam of the OSF in which the system information is received. If the scope is a cell, the UE 2d-05 may take into consideration the reference configuration information when receiving or measuring a downlink transmission beam of a cell in which the system information is received. If the scope is a frequency, the UE 2d-05 may take into consideration the reference configuration information when receiving or measuring a downlink transmission beam of a frequency at which the system information is received. If the scope is a frequency band, the UE 2d-05 may take into consideration the reference configuration information when receiving or measuring a downlink transmission beam of a frequency band in which the system information is received.

In operation 2d-30, the UE 2d-05 measures a beam reference signal. The UE 2d-05 may measure the beam reference signal on the basis of the common downlink reception beam. The UE 2d-05 may measure the quality and the strength of a beam reference signal by applying the determined downlink reception beam configuration.

In operation 2d-35, the UE 2d-05 may determine a beam to camp on, on the basis of the measurement result, and may camp on the determined beam. The UE 2d-05 may camp on the downlink transmission beam having the best signal quality, for example, transmission beam 0, from among a plurality of transmission beams of the TRP0 2d-10. "Camping on a beam" means receiving remaining system information at the beam and monitoring a paging channel at the beam.

In operation 2d-40, the UE 2d-10 may monitor a paging channel transmitted via the downlink transmission beam. In other words, the UE 2d-05 may determine whether a paging message is received via the paging channel. In this instance, the downlink reception beam common configuration determined in operation 2d-28 is applied.

If a preconfigured condition is satisfied, for example, if the received quality of a serving downlink transmission beam is less than or equal to a preconfigured reference, the UE 2d-05 initiates measurement of a neighboring TRP. In this instance, the UE 2d-05 may measure the neighboring TRP by applying the downlink reception beam common configuration determined in operation 2d-28. In other words, the UE 2d-05 explores a PSS/SSS by applying the downlink reception beam common configuration, establishes downlink synchronization, and receives a downlink transmission beam by applying different reception beam directionality/orientations the number of times defined in the downlink reception beam common configuration when measuring the received quality of a beam reference signal of the preconfigured downlink transmission beam.

In operation 2d-45, the UE 2d-05 may establish downlink synchronization with TRP1 2d-15. In operation 2d-50, the UE 2d-05 may receive beam reference signals in an OSF of TRP1 2d-15, and determines the received quality of each beam.

If a beam that satisfies a preconfigured reference exists among downlink transmission beams of the TRP1 2d-15, the UE 2d-05 camps on the beam (e.g., a transmission beam 10) in operation 2d-55. The UE 2d-05 may monitor a paging channel in the beam that the UE2d-05 camps on.

At any point in time, the UE 2d-05 may need to set up an RRC connection. When it is necessary to set up an RRC connection, the UE 2d-05 requests RRC connection establishment in operation 2d-60. For example, if the UE 2d-05 receives a paging message, a higher-layer device of the UE 2d-05 may direct an access-layer device of the UE 2d-05 to set up an RRC connection.

In operation 2d-65, the UE 2d-05 may perform a random access procedure in the current serving beam or serving cell. Via the random access procedure, the UE 2d-05 may inform TRP1 2d-15 of the downlink transmission beam (or serving downlink transmission beam) having the best received quality.

In operation 2d-70, the UE 2d-05 transmits an RRC connection setup request message to a central unit 2d-20, and the central unit 2d-20 indicates an RRC connection configuration to the UE 2d-05.

The UE 2d-05 that sets up the RRC connection may report, to the CU 2d-20, the capability of the UE 2d-05 (UE capability), for example, downlink reception beam configuration capability, in operation 2d-72. That is, the UE 2d-05 may report UE capability information. On the basis of the information, the CU 2d-20 may be aware of the downlink reception beam configuration that the UE currently uses. If it is possible to use a reception beam narrower than the current reception beam configuration, the CU 2d-20 may determine to refine a downlink reception beam of the UE 2d-05. The CU 2d-20 may direct the TRP1 2d-15 to perform a downlink reception beam refinement procedure.

In operation 2d-75, TRP1 2d-15 and the UE 2d-05 may perform the downlink reception beam refinement procedure. Via the process, the TRP1 2d-15 repeatedly transmits a serving downlink transmission beam to the UE 2d-05, and the UE 2d-05 performs sweeping of a reception beam within a limited range, and identifies the downlink reception beam having the best reception signal. In this instance, the newly determined downlink reception beam may be configured on the basis of the dedicated configuration of the UE 2d-05. The dedicated configuration may be referred to as a downlink dedicated reception beam configuration, a second reception beam configuration, a refined reception beam configuration, and the like. The dedicated configuration of the UE 2d-05 may be configured on the basis of the maximum performance of the UE. For example, a UE that is capable of configuring a total of 24 reception beams to cover all directions may set the internal angle of a downlink reception beam to 15 degrees, and may set a reception beam sweeping length to 24. A UE that is capable of configuring a total of 12 reception beams to cover all directions may set the internal angle of a downlink reception beam to 30 degrees, and may set a reception beam sweeping length to 12.

The UE 2d-05 may perform radio link monitoring (operation 2d-80), data reception (operation 2d-85), and channel status monitoring (operation 2d-90) by applying the dedicated downlink reception beam configured as described above.

Radio link monitoring is monitoring the status of the current radio link of the UE 2d-05, and on the basis of the strength/quality of a reference signal of the current downlink transmission beam, the UE 2d-05 may determine whether smooth service is allowed in the corresponding beam. In this instance, the UE 2d-05 may determine the quality of a serving downlink transmission beam by applying the downlink reception beam dedicated configuration (or using a downlink reception beam formed by applying the downlink reception beam dedicated configuration).

The UE 2d-05 may receive downlink data via the serving downlink transmission beam. In this instance, the downlink reception beam dedicated configuration is applied (or a downlink reception beam is used that is formed by applying the downlink reception beam dedicated configuration).

The UE 2d-05 may monitor the received quality of a preconfigured reference signal, for example, a channel status indication reference signal, or downlink data via the serving downlink transmission beam, and may report the result of monitoring to a TRP via a preconfigured uplink channel. In this instance, the UE 2d-05 may apply the downlink reception beam dedicated configuration (or use a downlink reception beam formed by applying the downlink reception beam dedicated configuration) when measuring the quality of the reference signal.

As described above, the UE 2d-05 may use a reception beam formed by applying the downlink reception beam common configuration in operations 2d-28 to 2d-72, and may use a reception beam formed by applying the downlink reception beam dedicated configuration in operations 2d-75 to 2d-90.

Figure 2E:
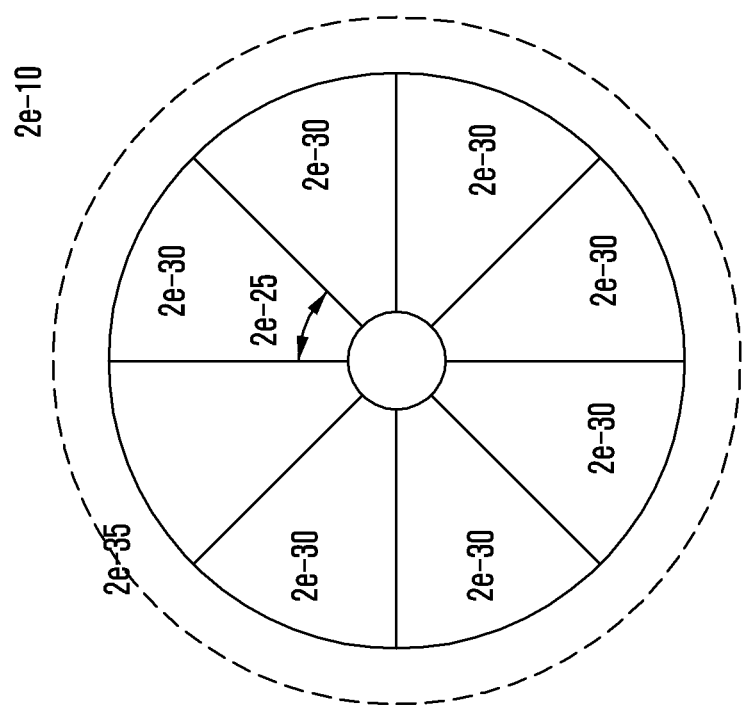
FIG. 2E is a diagram illustrating the reception beam configuration of a UE according to an embodiment of the present disclosure.
Figure 2E:
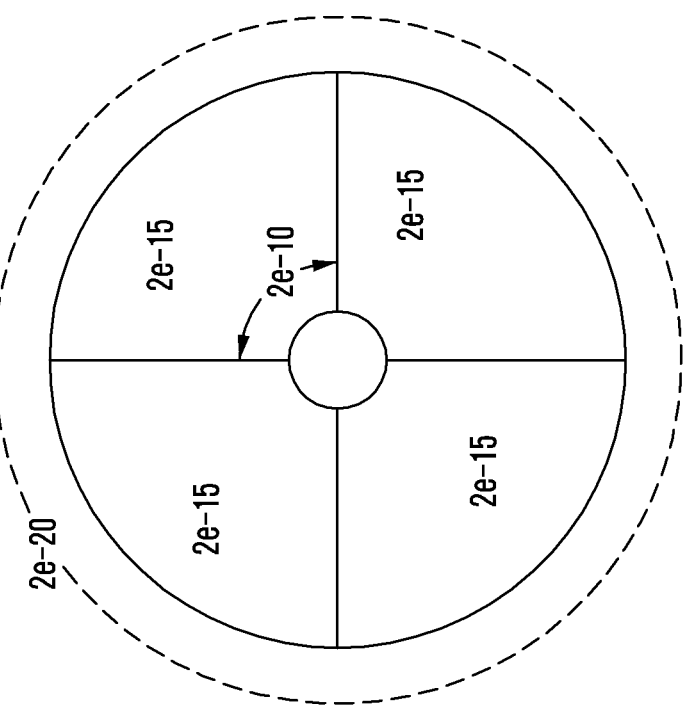

FIG. 2E is a diagram illustrating a reception beam configuration of a UE according to an embodiment of the present disclosure.

The reception beam configuration may indicate the width/coverage/angle or the like of a reception beam. For example, according to a first reception beam configuration 2e-20, four downlink reception beams are used to cover all directions, the internal angle 2e-10 of a beam is 90 degrees, and a width/coverage is as shown in the diagram 2e-15. According to a second reception beam configuration 2e-35, 8 downlink reception beams are used to cover all directions, the internal angle 2e-25 of a beam is 45 degrees, and a width/coverage is as shown in the diagram 2e-30, unlike the first reception beam configuration 2e-20.

In other words, according to the first reception beam configuration 2e-20, in order to determine an optimal reception beam for a single transmission beam, the corresponding transmission beam needs to be received four times (i.e., a reception beam sweeping length is 4). According to the second reception beam configuration 2e-35, in order to determine an optimal reception beam for a single transmission beam, the corresponding transmission beam needs to be received 8 times (i.e., a reception beam sweeping length is 8). FIGS. 2B and 2E describe a beam in different formats, but both are examples for describing a beam.

Figure 2F:
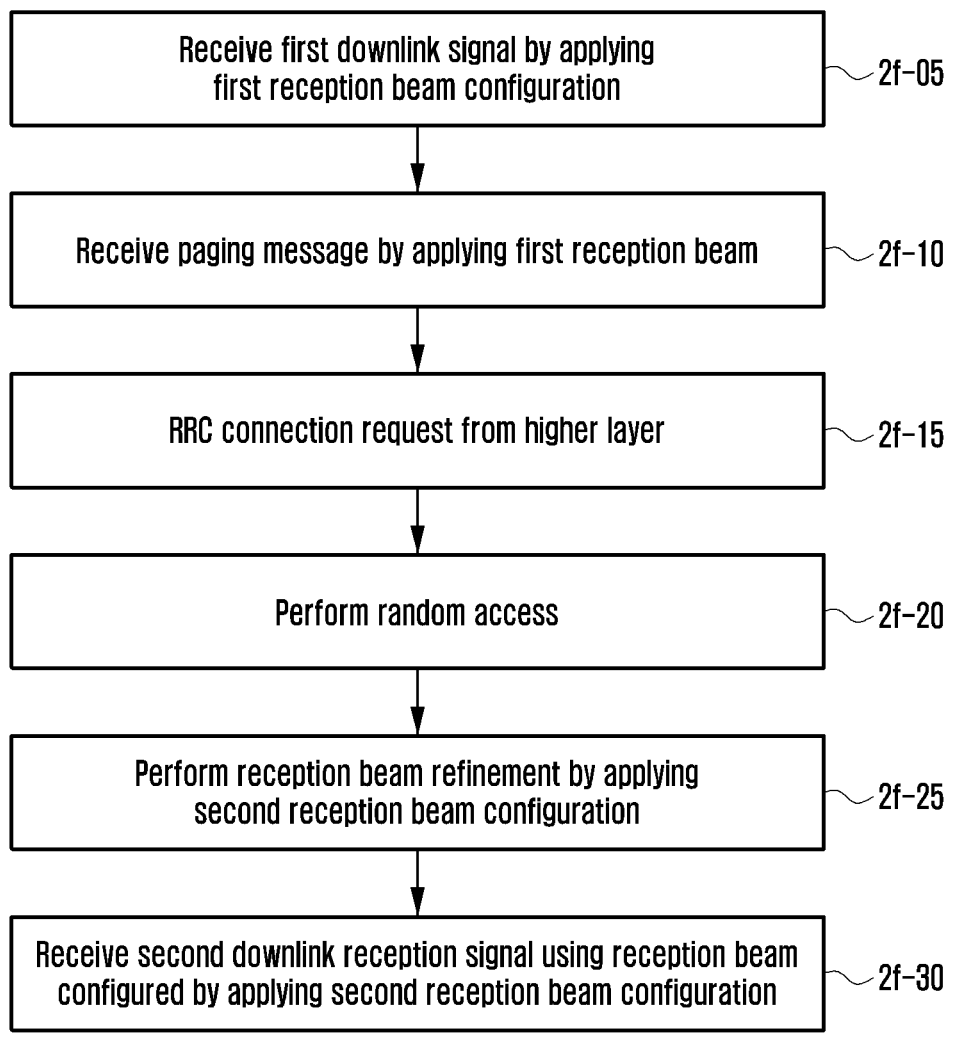
FIG. 2F is a diagram illustrating operations of a UE according to an embodiment of the present disclosure.

FIG. 2F is a diagram illustrating the operation of a UE according to an embodiment of the present disclosure.

Referring to FIG. 2F, in operation 2*f*-05, an idle-state UE applies a first reception beam configuration and receives a first downlink signal. The first reception beam configuration may be reference configuration information, and may be information associated with a common downlink reception beam.

The first downlink signal is a beam reference signal received in a preconfigured first subframe, and the first subframe may be an OSF transmitted from a TRP.

The first downlink signal is repeatedly transmitted at regular intervals. Accordingly, receiving the first downlink signal by applying the first reception beam configuration indicates that a measurement period that is proportional to the number of reception beams (or a reception beam sweeping length) of the first reception beam configuration is used in order to determine an optimal reception beam for the single first downlink signal or in order to determine the received quality of the first downlink signal. For example, if the beam sweeping length of the first reception beam configuration is 4, or if the internal angle/width of a beam is 90 degrees, the measurement period needed to determine the received quality of a single transmission beam is 4 units of time.

The first reception beam configuration is determined on the basis of a first parameter and a second parameter, wherein the first parameter is determined for each frequency band or is indicated by system information, and the second parameter is determined by the capability of a UE. The first parameter and the second parameter may be parameters for specifying the width of a reception beam, parameters for specifying the angle (or internal angle) of a reception beam, or parameters for specifying the number of reception beams (or a reception beam sweeping length) needed to cover all directions. If the first parameter and the second parameter are used for specifying the angle of a reception beam, the first reception beam configuration may be determined to be the larger value between the first parameter and the second parameter. If the first parameter and the second parameter are used for specifying the width of a reception beam or the number of reception beams, the first reception beam configuration may be determined to be the smaller value between the first parameter and the second parameter.

In operation 2*f*-10, the UE may receive a signal by applying the first reception beam configuration. The UE may apply the first reception beam configuration, and may receive a paging message in a serving downlink transmission beam.

In operation 2*f*-15, it is determined whether the UE needs to set up an RRC connection. If it is determined that the UE needs to set up an RRC connection, a higher-layer device of the UE directs an access-layer device of the UE to set up an RRC connection. Subsequently, the UE proceeds with operation 2*f*-20.

In operation 2*f*-20, the UE performs a random access procedure. The UE performs a random access procedure with a TRP by applying the first reception beam configuration.

In operation 2*f*-25, the UE initiates a reception beam refinement procedure with the TRP according to an indication by a base station. When the reception beam refinement procedure is initiated, the UE changes to a second reception beam configuration, and determines an optimal reception beam of the second reception beam configuration via the reception beam refinement procedure.

The second reception beam configuration is determined on the basis of a first parameter and a second parameter, determined on the basis of the capability of the UE, or may be determined on the basis of a third parameter. If the first parameter and the second parameter are used for specifying the angle of a reception beam, the second reception beam configuration may be determined to be the smaller value between the first parameter and the second parameter. If the first parameter and the second parameter are used for specifying the width of a reception beam or the number of reception beams, the second reception beam configuration may be determined to be a higher value between the first parameter and the second parameter. Alternatively, the second reception beam configuration may be determined on the basis of the third parameter, and the third parameter may be a value inferred based on a parameter transmitted by a CU or a TRP. For example, if the third parameter is defined to be the maximum time (i.e., a measurement period for a downlink beam) spent when a UE determines an optimal reception beam for a preconfigured beam or a UE completes measurement of the preconfigured beam, the UE may set the number of reception beams or the internal angle of a reception beam such that the measurement period is satisfied and the best reception performance is obtained.

In operation 2*f*-30, the UE may apply the second reception beam configuration, and may receive a second downlink reception signal using a reception beam. The second downlink reception signal may be transmitted in a second subframe, and may be a reference signal used for estimating a channel status, or may be user data transmitted to the UE. The second subframe may be a data subframe (DSF).

Figure 2G:
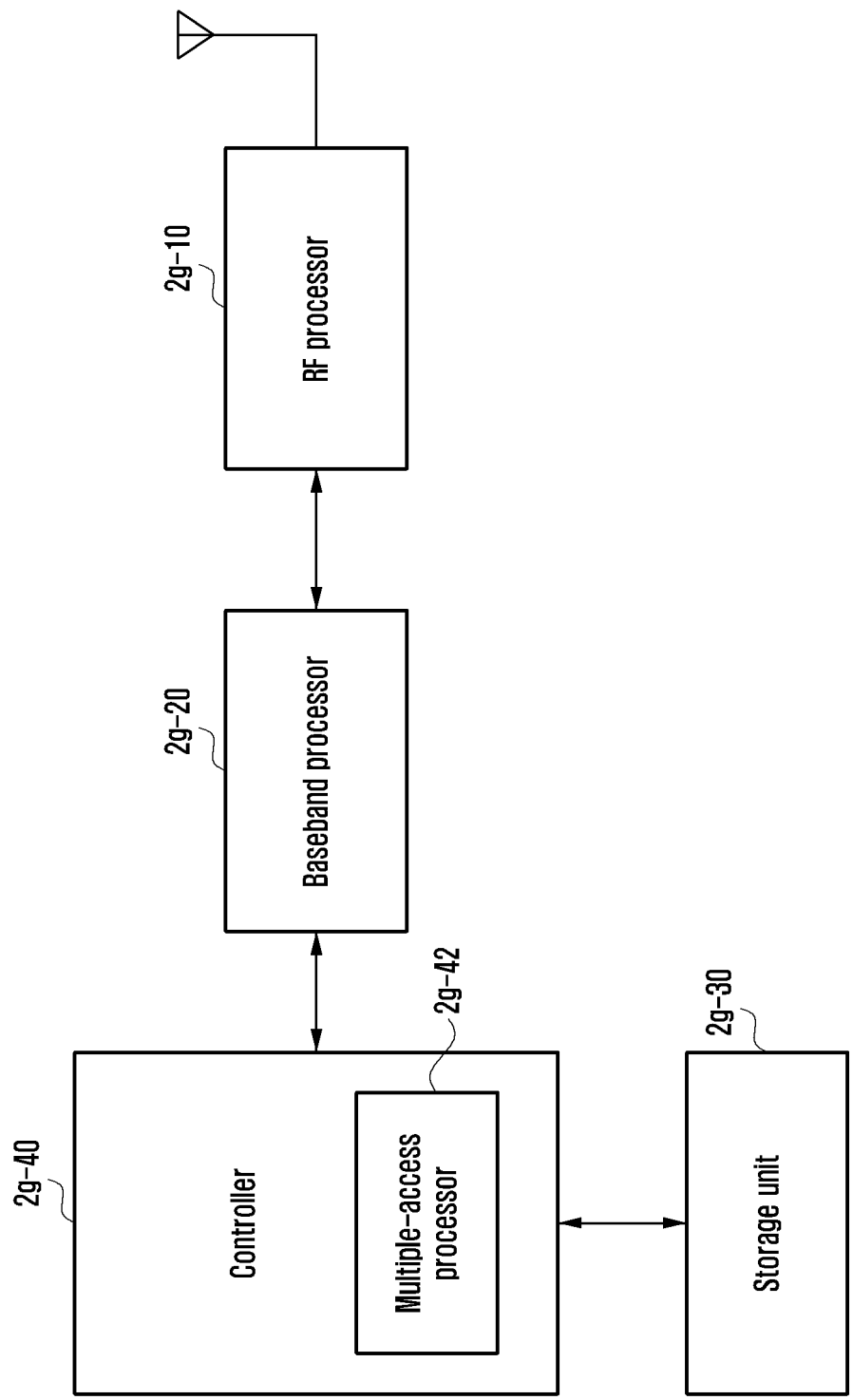
FIG. 2G is a block diagram of the internal structure of a UE according to an embodiment of the present disclosure.

FIG. 2G is a diagram of the structure of a UE according to an embodiment of the present disclosure.

Referring to FIG. 2G, the UE may include a radio-frequency (RF) processor 2*g*-10, a baseband processor 2*g*-20, a storage unit 2*g*-30, and a controller 2*g*-40.

The RF processor 2*g*-10 performs a function of transmitting and receiving a signal via a radio channel, such as band conversion and amplification of a signal. That is, the RF processor 2*g*-10 up-converts a baseband signal provided from the baseband processor 2*g*-20 into an RF band signal, transmits the RF band signal via an antenna, and down-converts the RF band signal received via the antenna into a baseband signal. For example, the RF processor 2*f*-10 may include a transmission filter, a reception filter, an amplifier, a mixer, an oscillator, a digital-to-analog convertor (DAC), an analog-to-digital convertor (ADC), and the like. Although only a single antenna is illustrated in the drawing, the UE may include a plurality of antennas. In addition, the RF processor 2*g*-10 may include a plurality of RF chains. In addition, the RF processor 2*g*-10 may perform beamforming. For the beamforming, the RF processor 2*g*-10 may control the phase and the size of each signal transmitted/received via a plurality of antennas or antenna elements. Also, the RF processor may perform MIMO, and may receive a plurality of layers while performing MIMO operation. The RF processor 2*g*-10 may appropriately configure a plurality of antennas or antenna elements according to the control of the controller so as to perform reception beam sweeping, or may control the orientation of a reception beam and a beam width such that a reception beam accords with a transmission beam.

The baseband processor 2*g*-20 performs a function for conversion between a baseband signal and a bitstream according to the physical layer standard of the system. For example, in the case of data transmission, the baseband processor 2g-20 generates complex symbols by encoding and modulating a transmission bitstream. Further, in the case of data reception, the baseband processor 2g-20 reconstructs a reception bitstream by demodulating and decoding a baseband signal provided from the RF processor 2g-10. For example, according to an orthogonal-frequency-division-multiplexing (OFDM) scheme, in the case of data transmission, the baseband processor 2g-20 generates complex symbols by encoding and modulating a transmission bitstream, maps the complex symbols to subcarriers, and then configures OFDM symbols via an IFFT (inverse fast Fourier transform) operation and a CP (cyclic prefix) insertion. Further, in the case of data reception, the baseband processor 2g-20 divides the baseband signal provided from the RF processor 2g-10 into OFDM symbol units, reconstructs the signals mapped to the subcarriers via a fast Fourier transform (FFT) operation, and then reconstructs a reception bitstream via demodulation and decoding.

The baseband processor 2g-20 and the RF processor 2g-10 transmit and receive a signal, as described above. Accordingly, each of the baseband processor 2g-20 and the RF processor 2g-10 may be referred to as a transmitter, a receiver, a transceiver, or a communication unit. In addition, at least one of the baseband processor 2g-20 or the RF processor 2g-10 may include a plurality of communication modules so as to support many different radio access technologies. In addition, at least one of the baseband processor 2g-20 or the RF processor 2g-10 may include different communication modules to process signals of different frequency bands. For example, the different radio access technologies may include an LTE network, an NR network, and the like. Further, the different frequency bands may include a super-high frequency (SHF) (e.g., 2.5 GHz and 5 GHz) band and a millimeter (mm) wave (e.g., 60 GHz) band.

The storage unit 2g-30 stores data such as a basic program, an application program, and configuration information for the operation of the UE. The storage unit 2g-30 may provide stored data in response to a request from the controller 2g-40.

The controller 2g-40 controls the overall operation of the UE. For example, the controller 2g-40 transmits and receives a signal via the baseband processor 2g-20 and the RF processor 2g-10. Also, the controller 2g-40 writes and reads data to/from the storage unit 2g-40. To this end, the controller 2g-40 may include at least one processor. For example, the controller 2g-40 may include a communication processor (CP), which performs control for communication, and an application processor (AP), which controls a higher layer such as an application program. The controller 2g-40 may include a multiple-access processor 2g-42. Also, the controller 2g-40 may control the operations of the UE according to the second embodiment of the present disclosure. The controller 2g-40 may control the operations of the UE, which have been described with reference to FIGS. 2A to 2F.

Figure 2H:
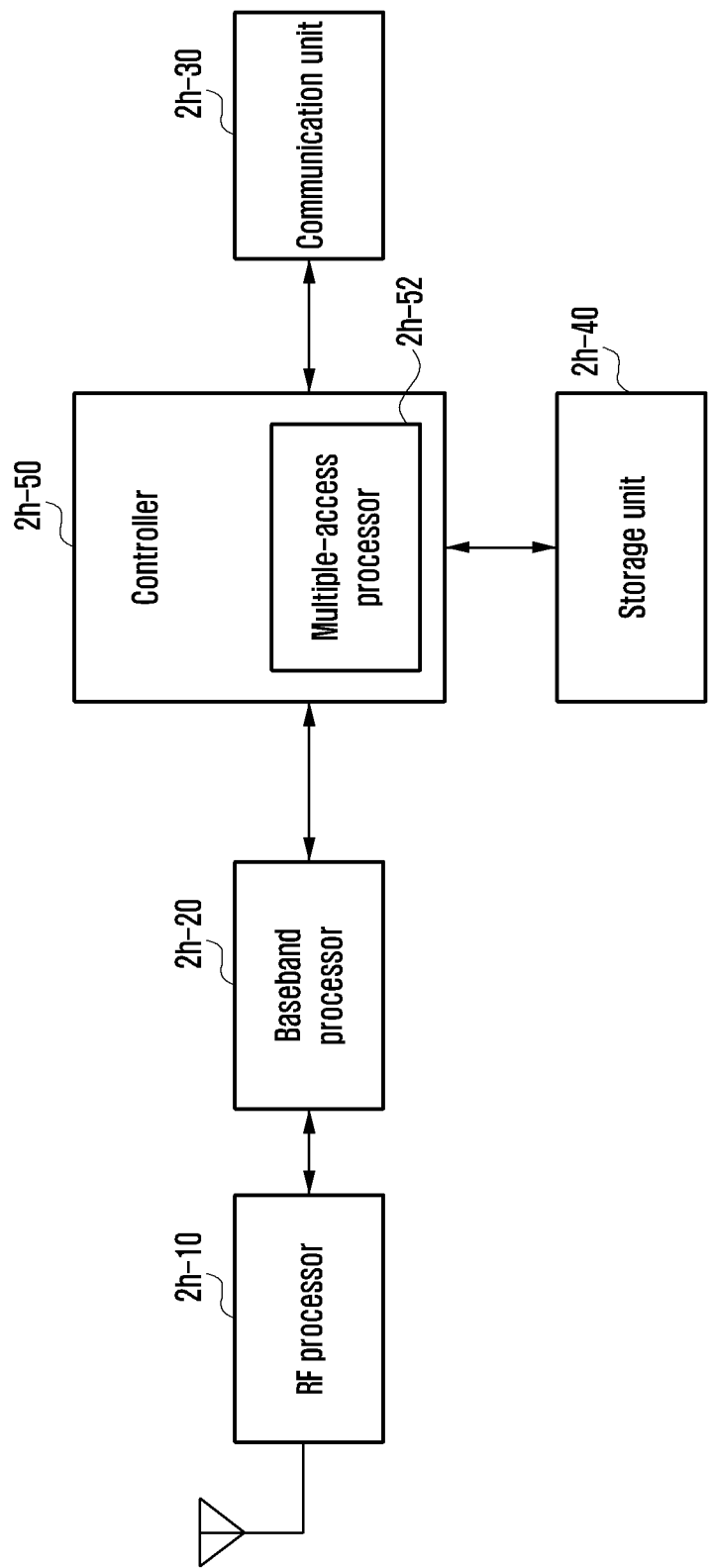
FIG. 2H is a block diagram of the configuration of a base station transceiver apparatus according to an embodiment of the present disclosure.

FIG. 2H is a block diagram of a TRP in a wireless communication system according to an embodiment of the present disclosure. A base station may include at least one TRP.

Referring to FIG. 2H, the base station may include an RF processor 2h-10, a baseband processor 2h-20, a backhaul communication unit 2h-30, a storage unit 2h-40, and a controller 2h-50.

The RF processor 2h-10 performs a function of transmitting and receiving a signal via a radio channel, such as band conversion and amplification of a signal. That is, the RF processor 2h-10 up-converts a baseband signal provided from the baseband processor 2h-20 into an RF band signal and then transmits the converted signal via an antenna, and down-converts an RF band signal received via the antenna into a baseband signal. For example, the RF processor 2h-10 may include a transmission filter, a reception filter, an amplifier, a mixer, an oscillator, a DAC, and an ADC. Although only a single antenna is illustrated in the drawing, a first access node may include a plurality of antennas. In addition, the RF processor 2h-10 may include a plurality of RF chains. In addition, the RF processor 2h-10 may perform beamforming. For the beamforming, the RF processor 2h-10 may control the phase and the size of each of the signals transmitted and received via a plurality of antennas or antenna elements. The RF processor may perform downlink MIMO operation by transmitting one or more layers.

The baseband processor 2h-20 performs a function of converting between a baseband signal and a bitstream according to the physical layer standard of a first radio access technology. For example, in the case of data transmission, the baseband processor 2h-20 generates complex symbols by encoding and modulating a transmission bitstream. Further, in the case of data reception, the baseband processor 2h-20 reconstructs a reception bitstream by demodulating and decoding a baseband signal provided from the RF processor 2h-10. For example, according to an OFDM scheme, in the case of data transmission, the baseband processor 2h-20 generates complex symbols by encoding and modulating the transmission bitstream, maps the complex symbols to subcarriers, and then configures OFDM symbols via an IFFT operation and CP insertion. Also, in the case of data reception, the baseband processor 2h-20 divides a baseband signal provided from the RF processor 2h-10 into OFDM symbol units, restores signals mapped onto the subcarriers via the FFT operation, and restores a reception bitstream via demodulation and decoding. The baseband processor 2h-20 and the RF processor 2h-10 transmit and receive a signal as described above. Accordingly, each of the baseband processor 2h-20 and the RF processor 2h-10 may be referred to as a transmitter, a receiver, a transceiver, a communication unit, or a wireless communication unit.

The communication unit 2h-30 provides an interface for performing communication with other nodes in a network. The communication unit 2h-30 may be referred to as "backhaul communication unit".

The storage unit 2h-40 may store data, such as a basic program, an application program, configuration information, or the like, used for operating the main base station. Particularly, the storage unit 2h-40 may store information associated with a bearer allocated to a connected UE, a measurement result reported from a connected UE, and the like. Also, the storage unit 2h-40 may store information which is a criterion to determine whether to provide or interrupt multiple access to a UE. The storage unit 2h-40 may provide stored data in response to a request from the controller 2h-50.

The controller 2h-50 may control the overall operation of the main base station. For example, the controller 2h-50 may transmit and receive a signal via the baseband processor 2h-20 and the RF processor 2h-10 or the backhaul communication unit 2h-30. Also, the controller 2h-50 writes and reads data to/from the storage unit 2h-40. To this end, the controller 2h-50 may include at least one processor. The controller 2h-50 may include a multiple-access processor 2h-52. Also, the controller 2h-50 may control the operation of the base station or TRP according to the second embodiment of the present disclosure. The controller 2h-50 control the operations of the base station or TRP which have been described with reference to FIGS. 2A to 2F.

Third Embodiment

The present disclosure relates to serving beam reselection of a UE in a next-generation mobile communication system that operates on the basis of a beam, and relates to a method and apparatus for applying a gradual reselection criterion on the basis of the type of a neighboring cell.

The recent mobile communication system is being developed by grafting various new technologies in order to satisfy various demands for services and increasing data traffic. Particularly, the discussion on the $5^{th}$ generation (5G), which is a next-generation mobile communication system that takes into consideration the demands, has been actively conducted. The 5G system is referred to as a new radio access technology (hereinafter NR). The NR system aims to provide a super-high-speed data service of several Gbps by using an ultra-wideband greater than 100 MHz, unlike the legacy LTE and LTE-A. However, it is difficult to secure an ultra-wideband frequency greater than 100 MHz in a frequency band of hundreds of MHz or several GHz used in LTE and LTE-A. The NR system considers a method of transmitting a signal using a wide frequency band existing in a frequency band greater than 6 GHz. Particularly, the NR system considers a method of increasing a transmission rate by using a millimeter wave (hereinafter, mmWave) band such as a 28 GHz band, a 60 GHz band, or the like. Since a frequency band and the path loss of a radio wave are proportional to each other, the path loss of a radio wave is high in super-high frequencies, and a service area is small. In the NR system, a beamforming technology, which generates a directional beam using a plurality of antennas so as to increase a travel distance of a radio wave, is emphasized as an important technology in order to overcome the drawback of a small service area. The beamforming technology may be applied to each of a transmission end and a reception end, and the beamforming technology may increase a service area, and may decrease interference attributable to physical beam concentration in a target direction. Also, in the case of directional-beam-based transmission, transmission or reception of a signal may be difficult at a location where a beam is not formed. In order to overcome the above-described drawback, beam sweeping is used. Beam sweeping is a scheme in which a transmission apparatus sequentially sweeps and rotates, and transmits directional beams having a preconfigured beam width, such that a beam is received by a reception apparatus which exists within a beam range of the transmission apparatus.

Figure 3A:
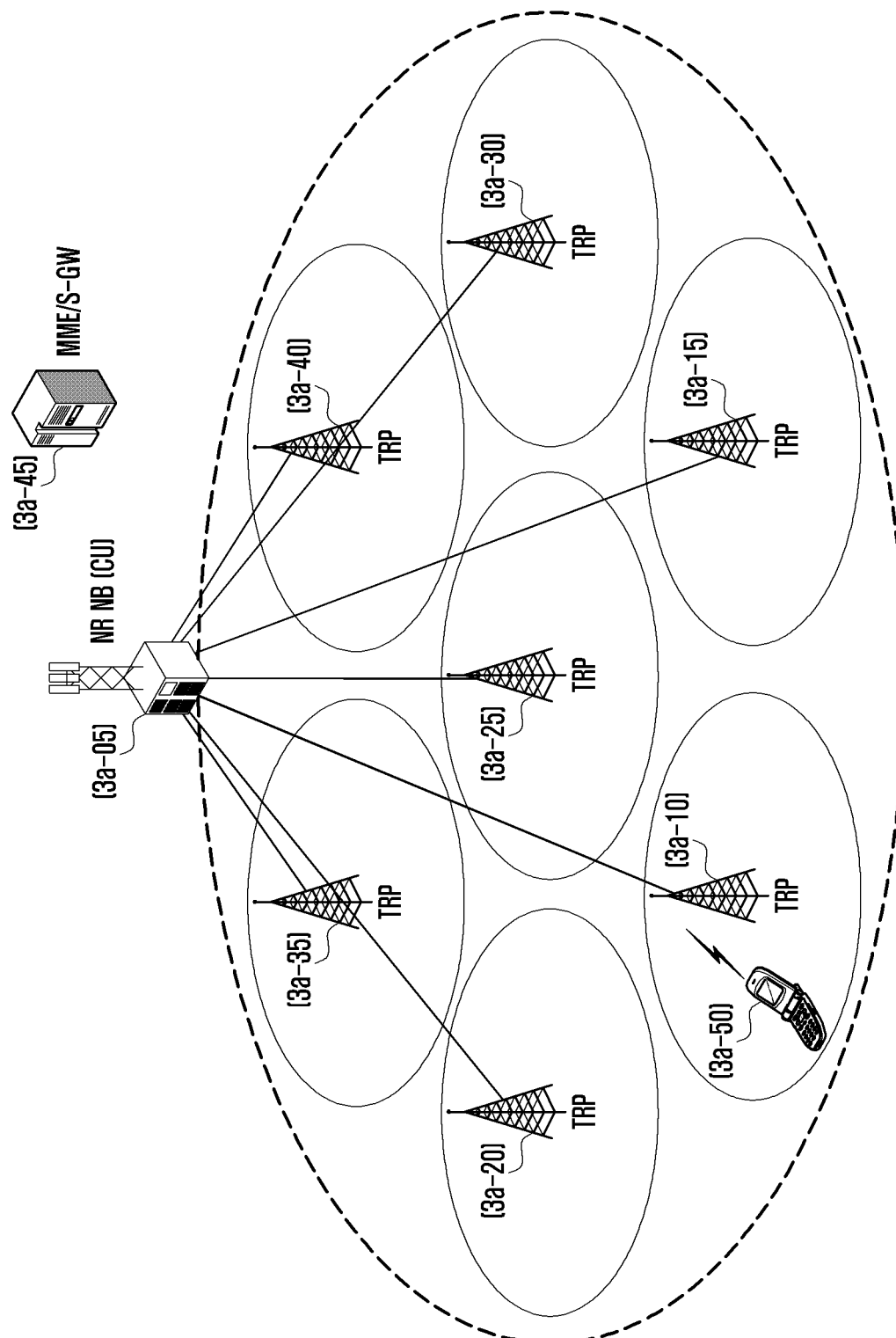
FIG. 3A is a diagram illustrating the structure of a next-generation mobile communication system according to an embodiment of the present disclosure.

FIG. 3A is a diagram illustrating the structure of a next-generation mobile communication system according to an embodiment of the present disclosure.

Referring to FIG. 3A, a cell serviced by an NR node B (NR NB or a base station) 3a-05 that operates on the basis of a beam may include various transmission reception points (TRPs) 3a-10, 3a-15, 3a-20, 3a-25, 3a-30, 3a-35, and 3a-40. The TRPs 3a-10 to 3a-40 are blocks which are separated from a legacy LTE eNB so as to perform only a function of transmitting and receiving a physical signal, and include a plurality of antennas. Particularly, the TRPs 3a-10 to 3a-40 may generate beams in various directions using a plurality of transmission and reception antennas, and may perform beamforming, and may be referred to as a beam group (BG). A UE 3a-50 may access an NR NB 3a-05 or an external network via the TRPs 3a-10 to 3a-40. The NR NB 3a-05 may perform scheduling by collecting status information such as the buffer status of UEs, an available transmission power status, a channel status, or the like, and may support connection between the UEs and a core network (CN), so as to service traffic of users. The NR NB 3a-05 may not include a TRP. In this instance, a scenario of directly performing communication with UEs 3a-50 within the cell using different beams may be taken into consideration.

Also, in the NR system, an MME may be a device that takes charge in various control functions as well as a mobility management function associated with the UE 3a-50, and is connected to a plurality of NR NBs 3a-05, and an S-GW is a device that provides a data bearer. Also, the MME and the S-GW 3a-45 may further perform authentication for the UE 3a-50 that accesses a network, bearer management, and the like, and may process a packet received from the NR NB 3a-05 or a packet to be transmitted to the NR NB 3a-05.

Figure 3B:
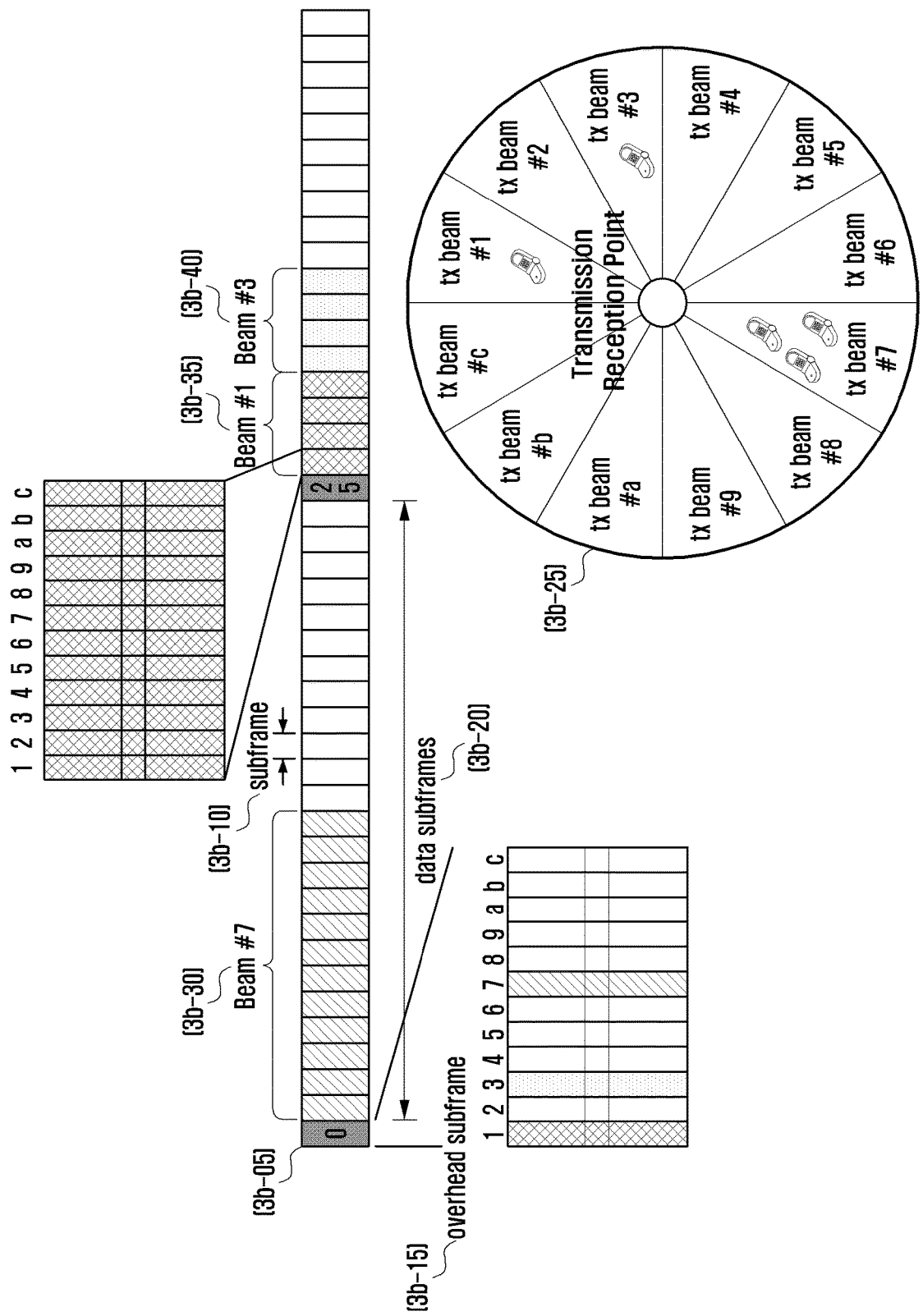
FIG. 3B is a diagram illustrating the structure of a frame used by an NR system that operates on the basis of a beam according to an embodiment of the present disclosure.

FIG. 3B is a diagram illustrating the structure of a frame used by an NR system that operates on the basis of a beam according to an embodiment of the present disclosure.

Referring to FIG. 3B, a radio frame 3b-05 of the NR system includes a plurality of subframes 3b-10. Particularly, the subframe of the NR system may include two types, namely an overhead subframe (OSF) 3b-15 and a data subframe (DSF) 3b-20.

The overhead subframe 3b-15 is a subframe in which a common overhead signal required for beam selection is transmitted, and a different overhead signal is transmitted according to a beam sweeping scheme for each symbol included in the subframe. The overhead subframe 3b-15 may include a primary synchronization signal (PSS) for obtaining a timing of an orthogonal-frequency-division-multiplexing (OFDM) symbol, a secondary synchronization signal (SSS) for detecting a cell ID, an extended synchronization signal (ESS) for obtaining a timing of a subframe, and a beam reference signal (BRS) for identifying a beam. Also, a physical broadcast channel (PBCH) may be transmitted, and may include system information, a master information block (MIB), or essential information for a UE to access a system (e.g., including a downlink beam bandwidth, a system frame number or the like). Single or multiple overhead subframes 3b-15 may exist in a radio frame 3b-05. In the present diagram, transmission occurs in a $0^{th}$ radio frame and $25^{th}$ radio frame.

The data subframe 3b-20 is a subframe in which data is actually transmitted to a preconfigured UE, and a different beam pattern may be applied depending on the geographical distribution of UEs. A TRP 3b-25 performs beam sweeping in a different direction for each symbol during the overhead subframe 3b-15. On the basis of the result of measurement based thereon, resources for data transmission and reception with UEs may be allocated for each beam 3b-30, 3b-35, and 3b-40 in the data subframe 3b-20. If the orientation of a beam transmitted by the TRP 3b-25 does not match the position of a UE, the UE may not receive any signal in the corresponding data subframe. Also, a single TRP 3b-25 may transmit many data subframes during a single radio frame 3b-05, and may receive many beams from many TRPs 3b-25 depending on the position of the UE.

Figure 3C:
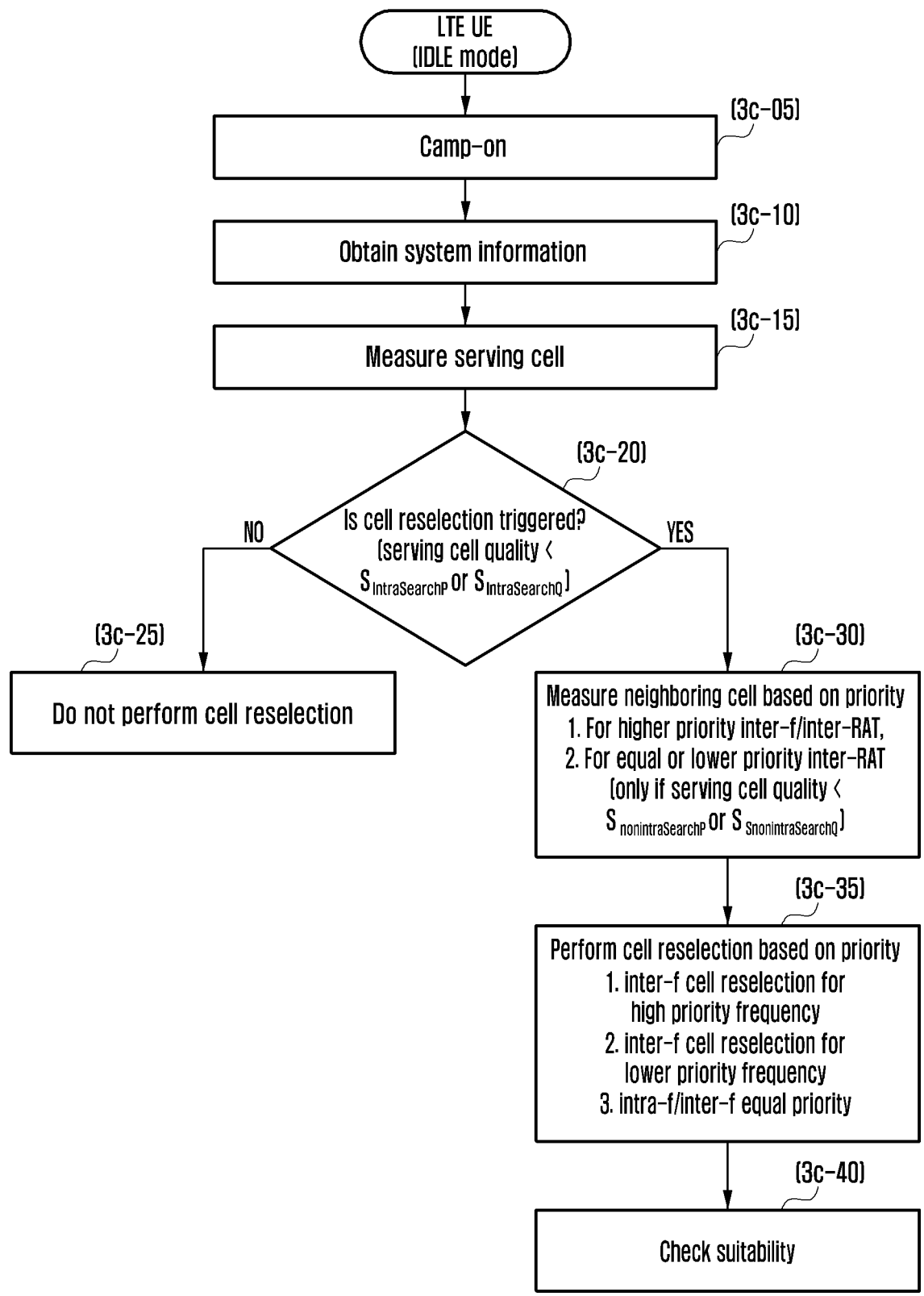
FIG. 3C is a diagram illustrating a procedure in which a UE reselects a cell in an LTE system.

FIG. 3C is a diagram illustrating the procedure in which a UE reselects a cell in an LTE system according to an embodiment of the present disclosure.

The cell reselection is a procedure to determine the cell on which the UE is to camp when the service quality of a serving cell is lower than the service quality of a neighboring cell due to the movement of an idle-state UE or a change of a channel status. Handover is determined on the basis of a network (an MME or a source eNB). However, cell reselection is determined by a UE on the basis of a measurement value. Also, a cell that is reselected as a UE moves may be a cell that uses the same LTE frequency as that of the serving cell on which the UE currently camps, a cell that uses a different LTE frequency (inter-frequency), or a cell that uses a different radio access technology. The cell that uses the same frequency as that of the current serving cell is referred to as an intra frequency cell. The cell that uses a frequency different from that of the serving cell is referred to as an inter-frequency cell.

In operation 3c-05, it is assumed that an idle-state UE camps on a serving cell. The idle-state UE camps on the serving cell and performs a series of operations.

In operation 3c-10, the UE obtains a system information block (SIB). The UE receives system information broadcasted by a base station of the serving cell. In the system information, MIB, SIB1, and SIB2 are system information applied in common to all UEs. SIB3 to SIB8 include information needed when an idle-state UE reselects a cell. The system information may include a threshold value used to determine whether to measure a neighboring cell signal, a parameter used when calculating the ranks of a serving cell and neighboring cells, and the like.

In operation 3c-15, the UE measures a signal of the serving cell. The idle-state UE may wake up at discontinuous reception (DRX) intervals so as to measure an absolute signal strength (a reference signal received power (RSRP) $Q_{rxlevmeas}$) and a relative signal quality (a reference signal received quality (RSRQ) $Q_{qualmeas}$) of the serving cell. Using the measurement values and the parameters received from the base station, the UE may calculate the received level (Srxlev) and the received quality (Squal) of the serving cell and may compare the values with threshold values so as to determine whether to perform cell reselection. The received level (Srxlev) and the received quality (Squal) of the serving cell are calculated according to the equation below.

Srxlev=$Q_{rxlevmeas}$-($Q_{rxlevmin}$+$Q_{rxlevminoffset}$)-Pcompensation-$Q$offset$_{temp}$ Squal=$Q_{qualmeas}$-($Q_{qualmin}$+$Q_{qualminoffset}$)-$Q$offset$_{temp}$ For the definitions of the parameters used herein, refer to the 3GPP standard document "36.304: User Equipment (UE) procedures in idle mode".

In operation 3c-20, the UE may determine whether a cell reselection operation is triggered. The UE may determine whether to trigger a cell reselection operation on the basis of the measurement values. If the strength and the quality of a signal of the serving cell calculated from the measurement values is lower than a threshold value (Srxlev<SIntraSearchP or Squal<SIntraSearchQ), it is identified that a trigger condition for cell reselection is satisfied, and the cell reselection operation is triggered. When the condition is not satisfied, the UE may not trigger the cell reselection operation. If the cell reselection operation is not triggered, the UE proceeds with operation 3c-25, and the UE may continuously camp on the corresponding serving cell without cell reselection.

If the condition is satisfied and cell reselection is triggered, the UE proceeds with operation 3c-30. The UE measures neighboring cells on the basis of priority. With respect to an inter-frequency/inter-RAT cell having a high priority, the UE initiates neighboring cell measurement irrespective of the quality of the serving cell. Also, with respect to an inter-frequency cell having the same or lower priority than that of the serving cell, the UE may initiate neighboring cell measurement if the strength and the quality of a signal of the serving cell are lower than threshold values (SnonIntraSearchP, SnonIntraSearchQ) received via the system information, that is, if Srxlev<SnonIntraSearchP or Squal<SnonIntraSearchQ is satisfied.

When the measurement of neighboring cells is completed, the UE performs cell reselection on the basis of priority in operation 3c-35. First, in association with reselection of an inter-frequency/inter-RAT cell having a high priority, if the signal quality of the corresponding cell is greater than a threshold value ThreshX, HighQ during a preconfigured period of time TreselectionRAT (Squal>ThreshX, HighQ), the UE reselects the corresponding cell. Second, in association with reselection of an inter-frequency cell having a low priority, the UE determines whether the condition that the signal quality of the serving cell is lower than a threshold value ThreshServing, LowQ (Squal<ThreshServing, LowQ) is satisfied, and if the condition is satisfied and the signal quality of the inter-frequency cell is greater than a threshold value ThreshX, LowQ during a preconfigured period of time TreselectionRAT (Squal>ThreshX, LowQ), the UE reselects the corresponding cell in operation 3c-40. Third, in association with reselection of an intra-frequency/inter-frequency cell having the same priority, the UE calculates a rank for each cell on the basis of the measurement values (e.g., RSRP) associated with neighboring cells. Ranks of a serving cell and a neighboring cell are calculated, respectively, as below.

$$Rs = Q_{meas,s} + Q_{Hyst} - Q\text{offset}_{temp}$$

$$Rn = Q_{meas,n} - Q\text{offset} - Q\text{offset}_{temp}$$

Here, $Q_{meas,s}$ denotes the RSRP measurement value of a serving cell. $Q_{meas,n}$ denotes the RSRP measurement value of a neighboring cell. $Q_{Hyst}$ denotes the hysteresis value of a serving cell. Qoffset denotes an offset value between a serving cell and a neighboring cell. Qoffset$_{temp}$ denotes an offset temporarily applied to a cell. If the rank of a neighboring cell calculated from the above equation is higher than the rank of the serving cell (Rn>Rs), the UE camps on an optimal cell among the neighboring cells.

If reselection is determined in the above-described process, the UE receives system information from the corresponding cell and checks suitability, that is, whether the UE is serviced via the new serving cell, in operation 3c-40. If a tracking area identity (TAI) is not included in a TAI list of the UE, the UE proceeds with a tracking area update (TAU) procedure, and if the corresponding cell is determined to be a new cell, the cell performs operations of a serving cell (obtaining system information, paging monitoring, serving cell signal measurement).

Figure 3D:
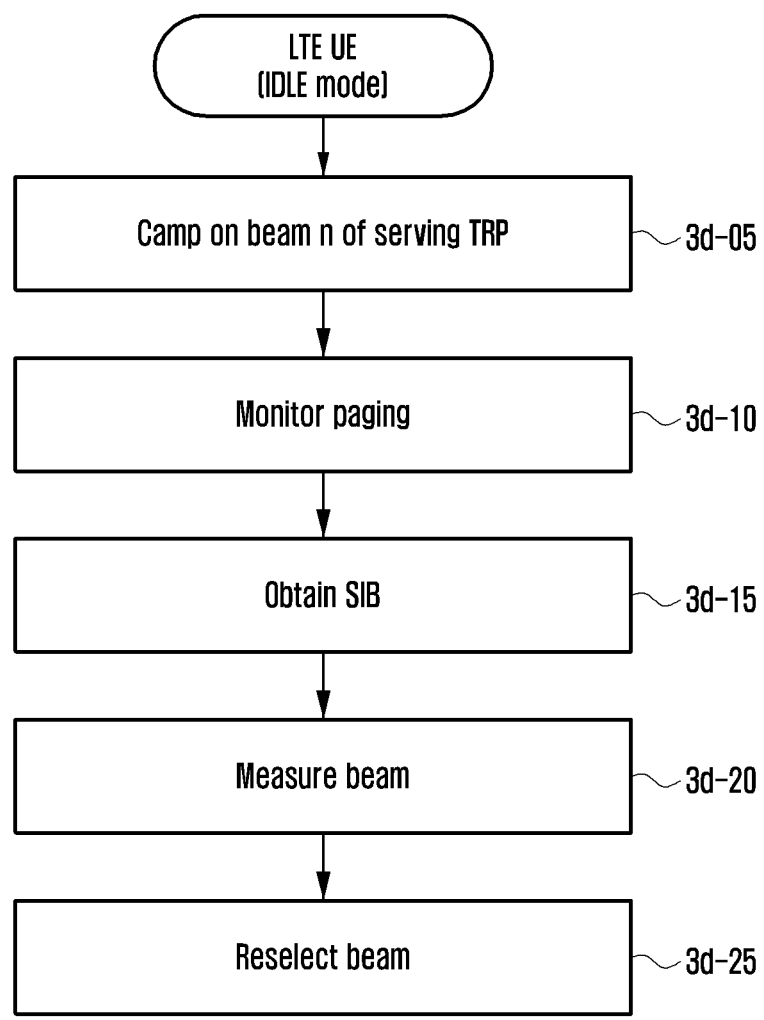
FIG. 3D is a diagram illustrating a method in which a UE reselects a serving beam in an NR system according to an embodiment of the present disclosure.

FIG. 3D is a diagram illustrating a method in which a UE reselects a serving beam in an NR system according to an embodiment of the present disclosure.

In operation 3d-05, an idle-state NR UE camps on an $n^{th}$ beam of a serving TRP. In operation 3d-10, the UE monitors a paging message. In operation 3d-15, the UE receives system information via a serving beam. In operation 3d-20, the UE measures the serving beam and neighboring beams.

If the result of measurement of neighboring beams corresponds to a beam reselection condition, the UE reselects a beam in operation 3d-25. Hereinafter, beam reselection in an NR system proposed in the present disclosure will be described in detail.

Figure 3E:
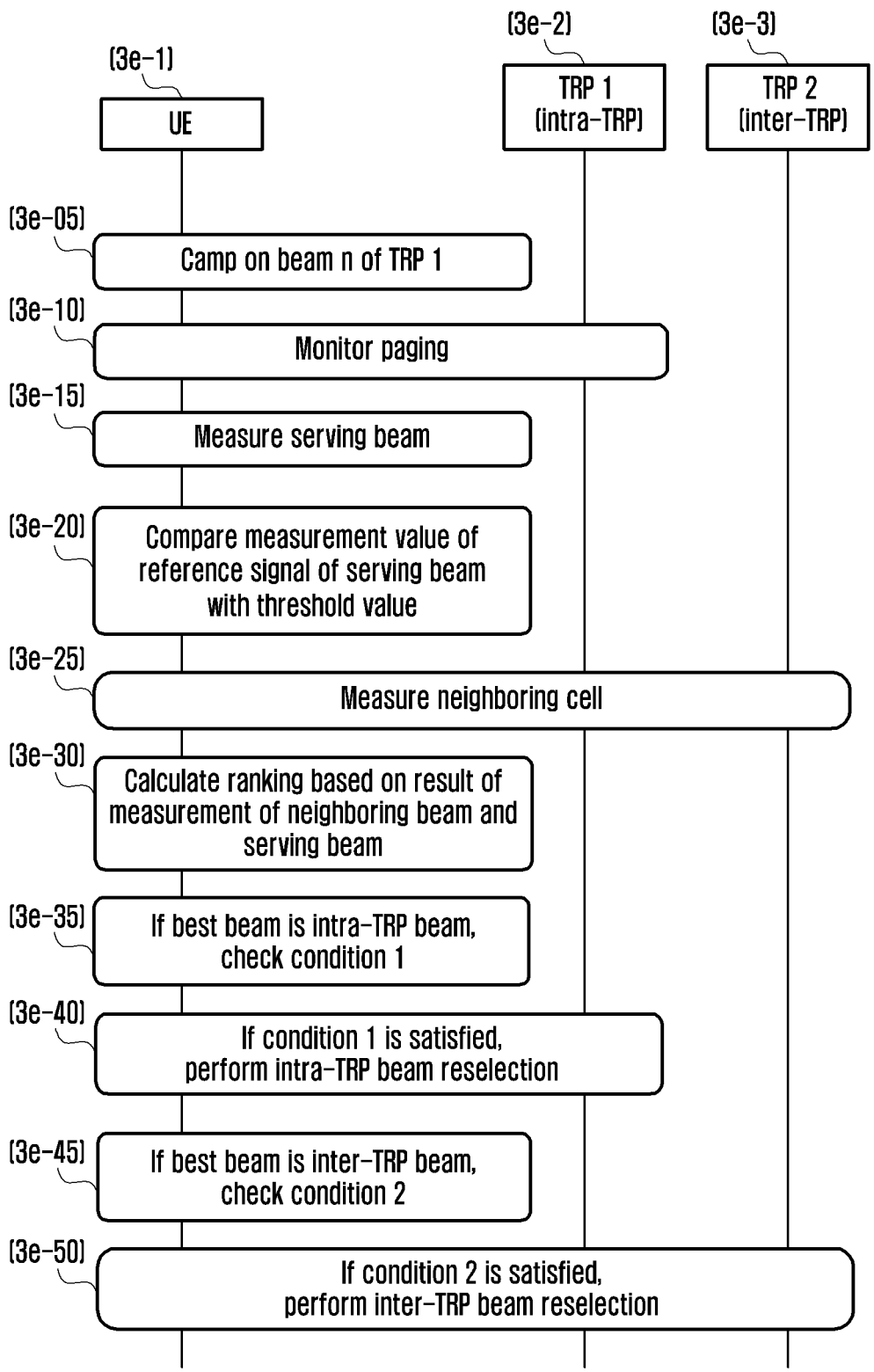
FIG. 3E is a diagram illustrating a beam reselection method of an NR system according to an embodiment of the present disclosure.

FIG. 3E is a diagram illustrating a beam reselection method of an NR system according to an embodiment of the present disclosure.

In operation 3e-05, a UE 3e-01 camps on a beam 3e-02 of a TRP/BG.

In operation 3e-10, the UE 3e-01 monitors a paging message.

In operation 3e-15, the UE 3e-01 measures the strength and the quality of a downlink beam reference signal of the serving beam. The downlink beam reference signal is transmitted and received via an overhead subframe of the corresponding TRP/BG.

In operation 3e-20, the UE 3e-01 measures the strength and the quality of the downlink reference signal of the serving beam with a preconfigured reference value. On the basis of the comparison result, the UE may determine whether to measure neighboring beams. If the strength and the quality of the downlink signal of the serving beam are lower than preconfigured threshold values (received via system information), the UE 3e-01 may measure neighboring beams in operation 3e-25. The measurement values may include measurements of neighboring beams included in an intra-TRP, an inter-TRP, and an inter-frequency cell.

In operation 3e-30, the UE 3e-01 calculates a ranking reference value. The UE 3e-01 may calculate the ranking reference value on the basis of the signal strength of the serving beam and the measurement value of a neighboring beam. The equation used for calculating the ranking reference value is as given below.

$$Rs = Q_{meas,s} + Q_{Hyst}$$

$$Rn = Q_{meas,n} - Q\text{offset\_BG}$$

Here, $Q_{meas,s}$ denotes the RSRP measurement value of a serving beam. $Q_{meas,n}$ denotes the RSRP measurement value of a neighboring beam. $Q_{Hyst}$ denotes the hysteresis value of a serving beam, and Qoffset_BG denotes an offset between a serving beam and a neighboring beam group, and includes a first offset and a second offset. Also, a first neighboring beam (intra-TRP neighboring beam) is defined to be a neighboring beam included in the beam group to which the serving beam belongs. A second neighboring beam (inter-TRP neighboring beam) is defined to be a neighboring beam included in a beam group that is different from the beam group to which the serving beam belongs. The first offset is applied when the ranking reference value of the first neighboring beam is calculated. The second offset is applied when the ranking reference value of the second neighboring beam is calculated. If the ranking value of the neighboring beam, calculated from the above equation, is higher than the ranking value of the serving beam (Rn>Rs), the UE camps on an optimal beam among the neighboring beams. The beam reselection of the present embodiment will be described below in detail.

In operation 3e-35, the UE 3e-01 identifies the neighboring beam group that the highest-ranking beam belongs to. If the highest-ranking beam is the first neighboring beam (intra-TRP neighboring beam), the UE determines whether a first condition is satisfied. If the first condition is satisfied, the UE performs beam reselection in operation 3e-45. The UE 3e-01 may perform beam reselection operation with respect to the first neighboring beam.

In operation 3e-45, the UE 3e-01 identifies whether a neighboring beam group that the highest-ranking beam belongs to. If the highest-ranking beam is a second neighboring beam (inter-TRP neighboring beam), the UE determines whether a second condition is satisfied. If the second condition is satisfied, the UE performs beam reselection in operation 3e-50. The UE 3e-01 may perform beam reselection operation with respect to the second neighboring beam.

Here, the first condition is satisfied when a corresponding beam is ranked higher than the serving beam during a period 1-1 and a period 1-2 elapses after a serving beam is reselected. The second condition is satisfied when a corresponding beam is ranked higher than the serving beam during a period 2-1 and a period 2-2 elapses after a serving beam is reselected. That is, in the embodiment of the present disclosure, a condition may be applied differently on the basis of the group to which the highest-ranking beam belongs. Different conditions may be information associated with the period 1-1, the period 1-2, the period 2-1, and the period 2-2, as described above.

The first offset, the second offset, the period 1-1, and the period 2-1 described above may be provided via the system information. Also, the period 1-2 and the period 2-2 may be provided via the system information, or may be determined in advance. That is, in the embodiment of the present disclosure, TreselectionRAT, which is used for cell reselection in LTE, is classified gradually as the period 1-1 and the period 2-1 on the basis of the neighboring beam group to which the highest-ranking beam belongs, and minimum ToS (Time of Stay), which is used to prevent repetitive cell reselection, is gradually defined to be the period 1-2 and the period 2-2, which are used for the cell reselection operation.

Figure 3F:
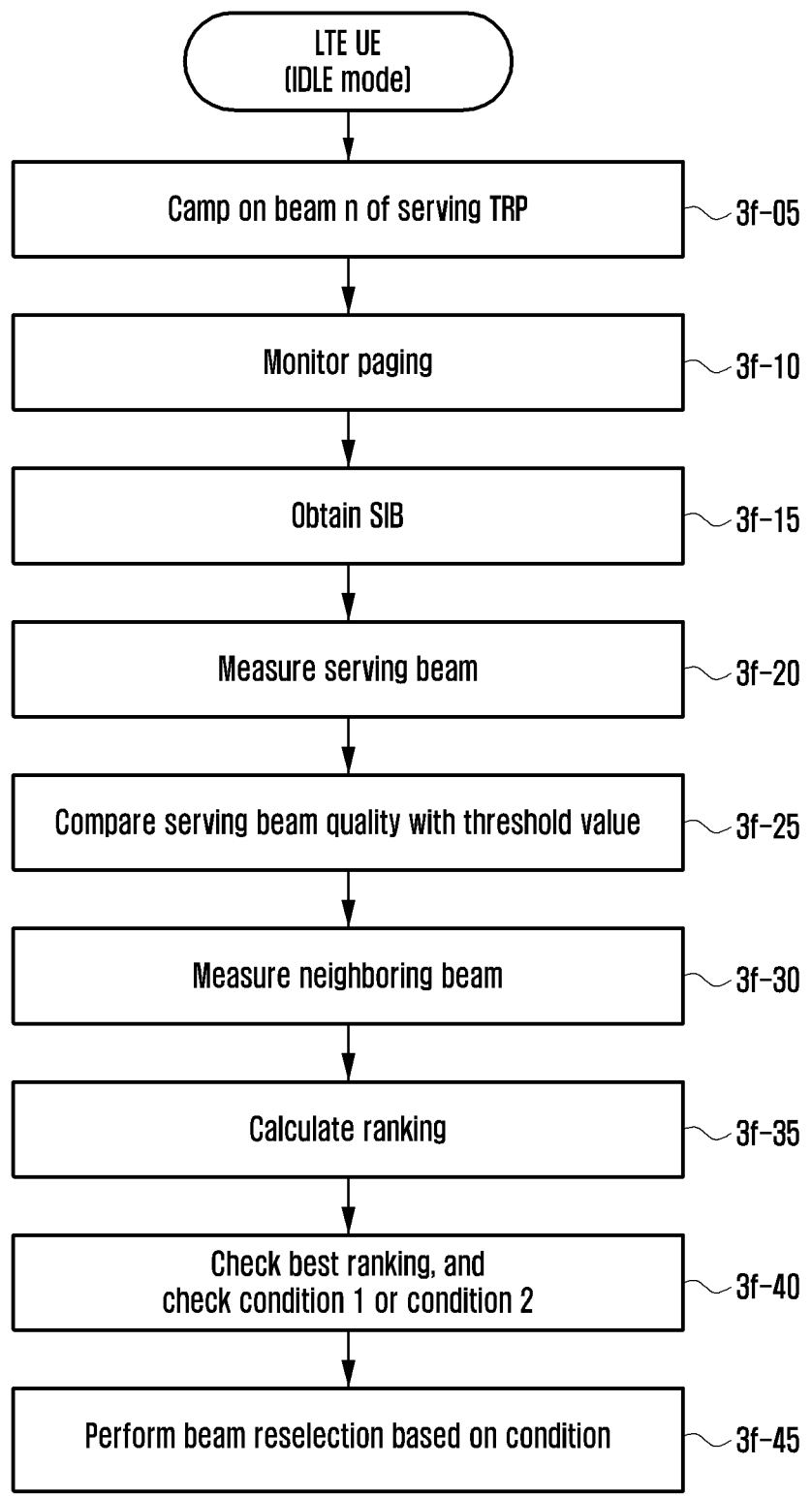
FIG. 3F is a diagram illustrating operations of a UE when the UE reselects a serving beam in an NR system according to an embodiment of the present disclosure.

FIG. 3F is a diagram illustrating operations of a UE when the UE reselects a serving beam in an NR system according to the first embodiment of the present disclosure. The UE may operate as follows. For the detailed operation of the UE in FIG. 3F, refer to the corresponding operations in FIG. 3E.

The UE camps on a beam of a TRP/BG in operation 3f-05, and the UE monitors a paging message in operation 3f-10.

In operation 3f-15, the UE obtains system information. In operation 3f-20, the UE may measure the strength and quality of a downlink beam reference signal of a serving beam. Here, the downlink beam reference signal is transmitted and received in an overhead subframe of a corresponding beam.

In operation 3f-25, the UE may compare the strength and quality of the downlink reference signal of the serving beam with a preconfigured reference value.

In operation 3f-30, the UE measures neighboring beams. The UE initiates measurement of neighboring beams if the downlink reference signal strength is lower than a reference value or the downlink signal quality is lower than a reference value.

In operation 3f-35, the UE calculates a ranking reference value. The UE calculates the ranking reference value on the basis of the measured signal strength of a neighboring beam and the signal strength of the serving beam.

The equation used for calculating the ranking reference value is as given below.

$$Rs = Q_{meas,s} + Q_{Hyst}$$

$$Rn = Q_{meas,n} - Q\text{offset\_BG}$$

$Q_{meas,s}$ denotes the RSRP measurement value of a serving beam. $Q_{meas,n}$ denotes the RSRP measurement value of a neighboring beam. $Q_{Hyst}$ denotes the hysteresis value of a serving beam, and Qoffset_BG denotes an offset between a serving beam and a neighboring beam group, and includes a first offset and a second offset. Here, a first neighboring beam (intra-TRP neighboring beam) is defined to be a neighboring beam included in the beam group to which the serving beam belongs. A second neighboring beam (inter- TRP neighboring beam) is defined to be a neighboring beam included in a beam group that is different from the beam group to which the serving beam belongs. The first offset is applied when the ranking reference value of the first neighboring beam is calculated. The second offset is applied when the ranking reference value of the second neighboring beam is calculated.

If the serving beam is the highest-ranking beam, the current serving beam is maintained.

In operation 3f-40, if a neighboring beam is the highest-ranking beam, the UE determines whether the highest-ranking beam is the first neighboring beam or the second neighboring beam. If the highest-ranking beam is the first neighboring beam, the UE may perform beam reselection by taking into consideration whether a first condition is satisfied. If the highest-ranking beam is the second neighboring beam, the UE may perform beam reselection by taking into consideration whether a second condition is satisfied.

The first condition is satisfied when a corresponding beam is ranked higher than the serving beam during a period 1-1 and a period 1-2 elapses after a serving beam is reselected. That is, the UE may perform control such that the corresponding beam is ranked higher than the serving beam during the period 1-1, and the reselected beam is maintained during the period 1-2.

The second condition is satisfied when a corresponding beam is ranked higher than the serving beam during a period 2-1 and a period 2-2 elapses after a serving beam is reselected. That is, the UE may perform control such that the corresponding beam is ranked higher than the serving beam during the period 1-2, and the reselected beam is maintained during the period 2-2.

The first offset, the second offset, the period 1-1, and the period 2-1 may be provided via system information. Also, the period 1-2 and the period 2-2 may be provided via the system information, or may be determined in advance.

Figure 3G:
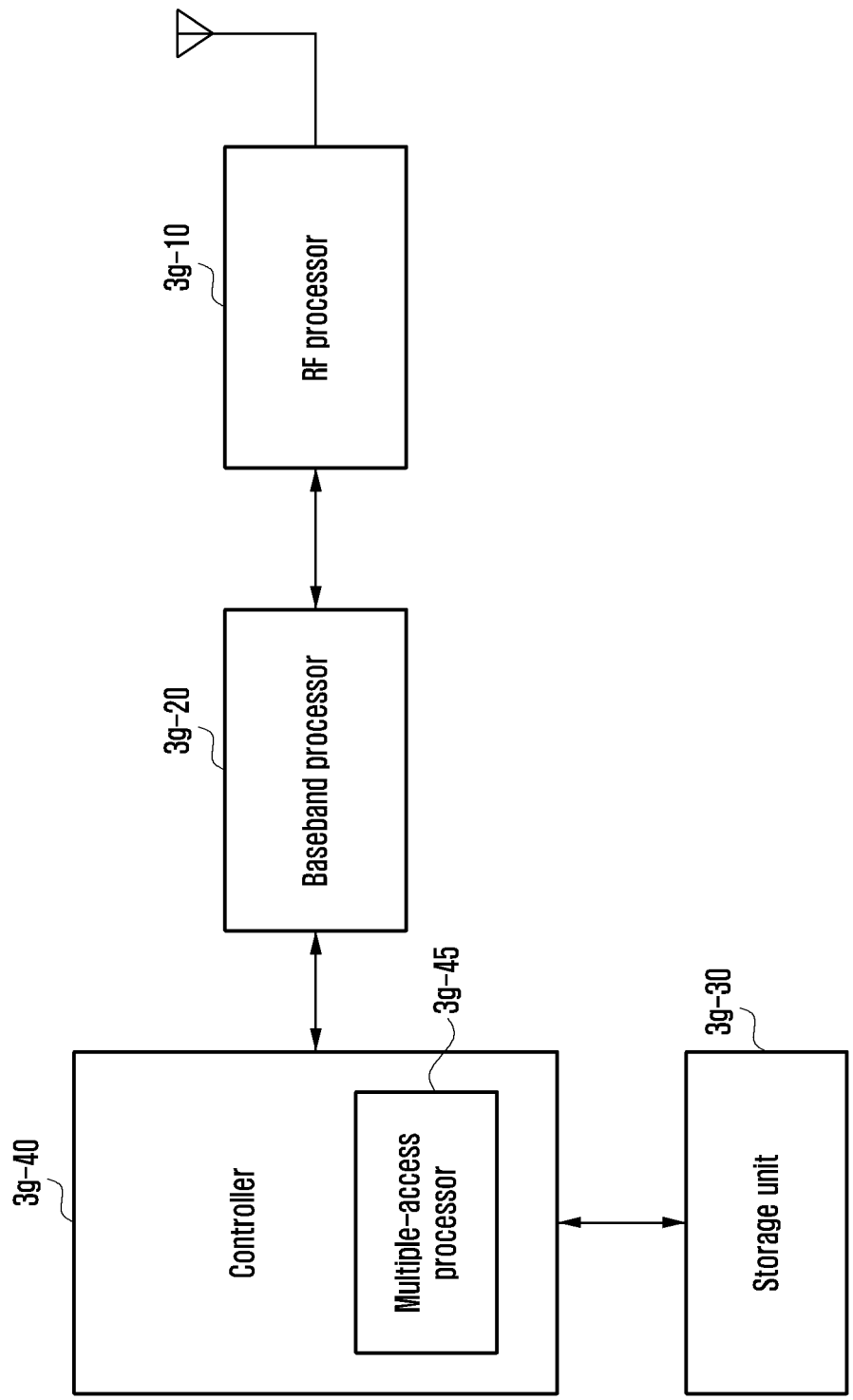
FIG. 3G is a block diagram of a UE according to an embodiment of the present disclosure.

FIG. 3G is a block diagram of a UE according to an embodiment of the present disclosure.

Referring to FIG. 3G, the UE according to an embodiment of the present disclosure may include a radio-frequency (RF) processor 3g-10, a baseband processor 3g-20, a storage unit 3g-30, and a controller 3g-40.

The RF processor 3g-10 performs a function of transmitting and receiving a signal via a radio channel, such as band conversion and amplification of a signal. That is, the RF processor 3g-10 up-converts a baseband signal provided from the baseband processor 3g-20 into an RF band signal, transmits the RF band signal via an antenna, and down-converts the RF band signal, received via the antenna, into a baseband signal. For example, the RF processor 3g-10 may include a transmission filter, a reception filter, an amplifier, a mixer, an oscillator, a digital-to-analog convertor (DAC), an analog-to-digital convertor (ADC), and the like. Although only a single antenna is illustrated in the drawing, the UE may include a plurality of antennas. In addition, the RF processor 3g-10 may include a plurality of RF chains. Moreover, the RF processor 3g-10 may perform beamforming. For the beamforming, the RF processor 3g-10 may control the phase and the size of each signal transmitted/ received via a plurality of antennas or antenna elements. Also, the RF processor 3g-10 may perform MIMO, and may receive a plurality of layers while performing a MIMO operation. The RF processor 3g-10 may appropriately configure a plurality of antennas or antenna elements according to the control of the controller 3g-40, so as to perform reception beam sweeping, or may control the orientation of a reception beam and a beam width such that a reception beam accords with a transmission beam.

The baseband processor 3g-20 executes a function of converting between a baseband signal and a bitstream on the basis of the physical layer standard of a system. For example, in the case of data transmission, the baseband processor 3g-20 generates complex symbols by encoding and modulating a transmission bitstream. In addition, in the case of data reception, the baseband processor 3g-20 recovers a reception bitstream via the demodulation and decoding of a baseband signal provided from the RF processor 3g-10. For example, according to an OFDM scheme, in the case of data transmission, the baseband processor 3g-20 generates complex symbols by encoding and modulating a transmission bitstream, maps the complex symbols to subcarriers, and then configures OFDM symbols via an inverse fast Fourier transform (IFFT) operation and a cyclic prefix (CP) insertion. Further, in the case of data reception, the baseband processor 3g-20 divides the baseband signal provided from the RF processor 3g-10 into OFDM symbol units, reconstructs the signals mapped to the subcarriers via a fast Fourier transform (FFT) operation, and then reconstructs the reception bitstream via demodulation and decoding.

The baseband processor 3g-20 and the RF processor 3g-10 transmit and receive a signal as described above. Accordingly, each of the baseband processor 3g-20 and the RF processor 3g-10 may be referred to as a transmitter, a receiver, a transceiver, or a communication unit. In addition, at least one of the baseband processor 3g-20 or the RF processor 3g-10 may include a plurality of communication modules so as to support many different radio access technologies. In addition, at least one of the baseband processor 3g-20 or the RF processor 3g-10 may include different communication modules so as to process signals of different frequency bands. For example, the different radio access technologies may include an LTE network, an NR network, and the like. Further, the different frequency bands may include a super-high frequency (SHF) (e.g., 2.5 GHz and 5 GHz) band and a millimeter (mm) wave (e.g., 60 GHz) band.

The storage unit 3g-30 stores data such as a basic program, an application program, and configuration information for the operation of the UE. The storage unit 3g-30 may provide stored data in response to a request from the controller 3g-40.

The controller 3g-40 controls the overall operation of the UE. For example, the controller 3g-40 transmits and receives a signal via the baseband processor 3g-20 and the RF processor 3g-10. Also, the controller 3g-40 writes and reads data to/from the storage unit 3g-40. To this end, the controller 3g-40 may include at least one processor. For example, the controller 3g-40 may include a communication processor (CP), which performs control for communication, and an application processor (AP), which controls a higher layer such as an application program. The controller 3g-40 may include a multiple-access processor 3g-42. Also, the controller 3g-40 may control the operations of the UE according to the third embodiment of the present disclosure. The controller 3g-40 may control the operations of the UE which have been described with reference to FIGS. 3A to 3F.

Figure 3H:
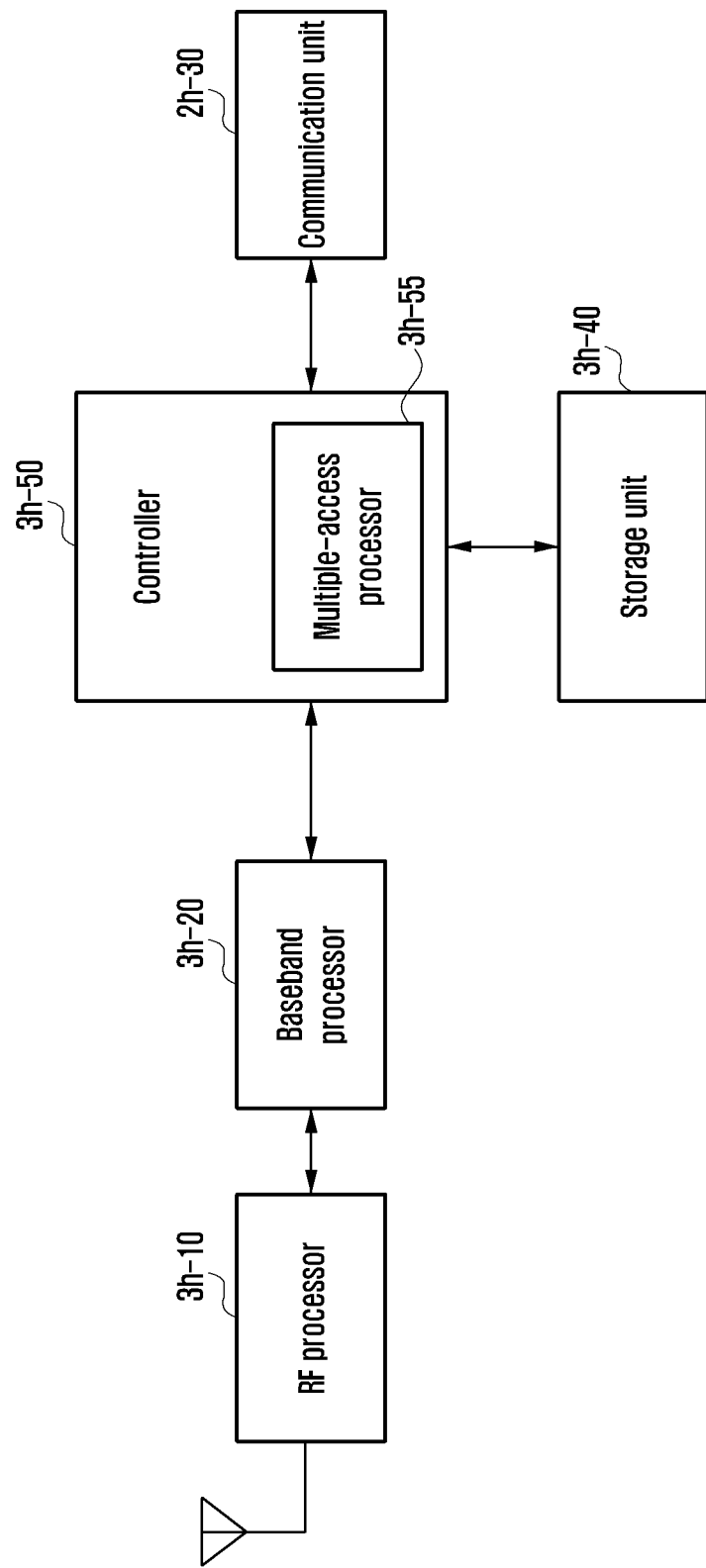
FIG. 3H is a block diagram of a TRP in a wireless communication system according to an embodiment of the present disclosure.

FIG. 3H is a block diagram of a TRP in a wireless communication system according to an embodiment of the present disclosure. A base station may include at least one TRP.

Referring to FIG. 3H, the base station according to an embodiment of the present disclosure may include an RF processor 3h-10, a baseband processor 3h-20, a backhaul communication unit 3h-30, a storage unit 3h-40, and a controller 3h-50.

The RF processor 3h-10 performs a function of transmitting and receiving a signal via a radio channel, such as band conversion and amplification of a signal. That is, the RF processor 3h-10 up-converts a baseband signal provided from the baseband processor 3h-20 into an RF band signal and then transmits the converted signal via an antenna, and down-converts an RF band signal received via the antenna into a baseband signal. For example, the RF processor 3h-10 may include a transmission filter, a reception filter, an amplifier, a mixer, an oscillator, a DAC, and an ADC. Although only a single antenna is illustrated in the drawing, a first access node may include a plurality of antennas. In addition, the RF processor 3h-10 may include a plurality of RF chains. Moreover, the RF processor 3h-10 may perform beamforming. For the beamforming, the RF processor 3h-10 may control the phase and the size of each of the signals transmitted and received via a plurality of antennas or antenna elements. The RF processor may perform downlink MIMO operation by transmitting one or more layers.

The baseband processor 3h-20 performs a function of converting between a baseband signal and a bitstream according to the physical layer standard of a first radio access technology. For example, in the case of data transmission, the baseband processor 3h-20 generates complex symbols by encoding and modulating a transmission bitstream. Further, in the case of data reception, the baseband processor 3h-20 reconstructs a reception bitstream by demodulating and decoding a baseband signal provided from the RF processor 3h-10. For example, according to an OFDM scheme, in the case of data transmission, the baseband processor 3h-20 generates complex symbols by encoding and modulating a transmission bitstream, maps the complex symbols to subcarriers, and then configures OFDM symbols via an IFFT operation and CP insertion. Also, in the case of data reception, the baseband processor 3h-20 divides a baseband signal provided from the RF processor 3h-10 into OFDM symbol units, restores signals mapped onto the subcarriers via the FFT operation, and restores a reception bitstream via demodulation and decoding. The baseband processor 3h-20 and the RF processor 3h-10 transmit and receive a signal as described above. Accordingly, each of the baseband processor 3h-20 and the RF processor 3h-10 may be referred to as a transmitter, a receiver, a transceiver, a communication unit, or a wireless communication unit.

The communication unit 3h-30 provides an interface for performing communication with other nodes in a network. The communication unit 3h-30 may be referred to as a "backhaul communication unit".

The storage unit 3h-40 may store data, such as a basic program, an application program, configuration information, or the like, used for operating the main base station. Particularly, the storage unit 3h-40 may store information associated with a bearer allocated to a connected UE, a measurement result reported from a connected UE, and the like. Also, the storage unit 3h-40 may store information which is a criterion to determine whether to provide or interrupt multiple access to a UE. The storage unit 3h-40 may provide stored data in response to a request from the controller 3h-50.

The controller 3h-50 may control the overall operation of the main base station. For example, the controller 3h-50 may transmit and receive a signal via the baseband processor 3h-20 and the RF processor 3h-10 or the backhaul communication unit 3h-30. Also, the controller 3h-50 writes and reads data to/from the storage unit 3h-40. To this end, the controller 3h-50 may include at least one processor. The controller 3h-50 may include a multiple-access processor 3h-52. Also, the controller 3h-50 may control the operations of the base station or TRP according to the third embodiment of the present disclosure. The controller 3h-50 may control the operations of the base station or TRP, which have been described with reference to FIGS. 3A to 3F.

Fourth Embodiment

An embodiment of the present disclosure relates to a method and an apparatus for performing a HARQ operation differently based on whether conditional transmission is set for decreasing a delay or on whether conditional transmission is not set.

In the present disclosure, a UE selectively applies an unconditional transmission operation or a conditional transmission operation according to an indication by a base station, and particularly, an HARQ operation is applied differently depending on whether a conditional transmission is set, which has characteristics as follows.

A conditional transmission operation is applied on the basis of a serving cell in which uplink transmission is performed and the type of a transmission resource. For example, a conditional transmission operation is applied only to SPS uplink transmission of a serving cell configured via RRC, and an unconditional transmission operation is applied to the remaining uplink transmission.

The conditional transmission operation is applied only when is it configured via RRC.

The conditional transmission operation performs transmission only when data available for transmission exists even when uplink grant for initial transmission is available. Otherwise, transmission is not performed.

The data available for transmission includes data available for transmission in a PDCP layer (defined in the standard 36.323) and data available for transmission in an RLC layer (defined in the standard 36.322) and MAC CE (defined in 36.321). The MAC CE includes uplink MAC CEs remaining after excluding a short BSR, a truncated BSR, or a long BSR, which is triggered as a padding BSR. Particularly, a power headroom report, a C-RNTI MAC CE, a short BSR or long BSR, triggered as a regular BSR, may be included.

If an initial transmission and a non-adaptive retransmission collide at a TTI for a UE configured with a conditional transmission operation, transmission is performed by selecting one of the initial transmission and the non-adaptive retransmission according to the type of transmission resource of the initial transmission.

If non-adaptive retransmission collides with initial transmission due to an SPS (or a configured uplink grant), non-adaptive retransmission is performed. Initial transmission is performed at the closest point in time at which a collision with non-adaptive retransmission does not occur.

If non-adaptive retransmission collides with initial transmission by normal uplink grant, initial transmission is performed.

Figure 4A:
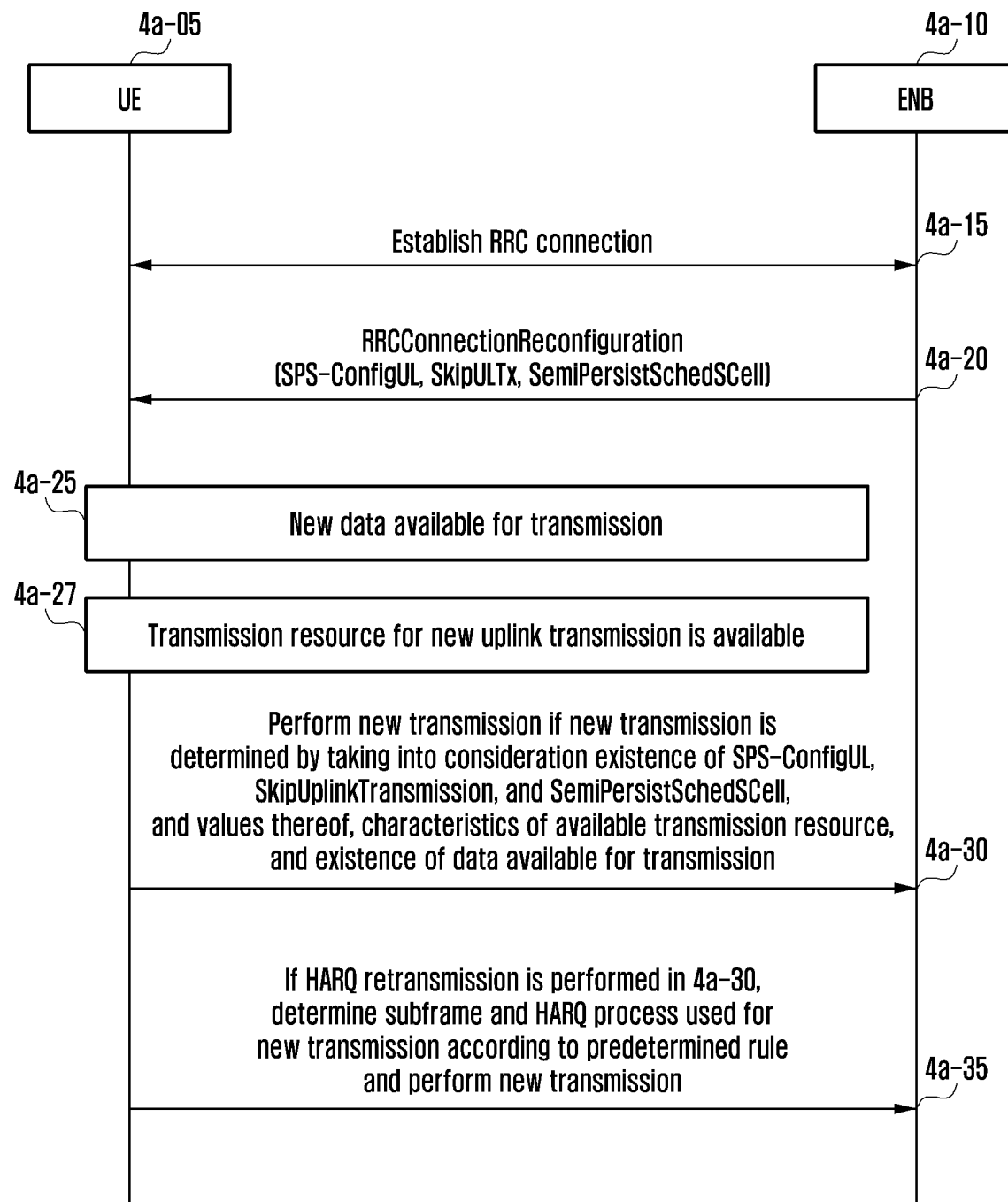
FIG. 4A is a diagram illustrating a procedure in which a UE and a base station perform HARQ new transmission and retransmission in association with conditional transmission according to an embodiment of the present disclosure.

FIG. 4A is a diagram illustrating the overall operation of the present disclosure according to an embodiment of the present disclosure.

Referring to FIG. 4A, a mobile communication system includes a UE 4a-05, a base station 4a-10, and other nodes.

In operation 4a-15, the UE 4a-05 establishes an RRC connection with a base station. The fact that the UE 4a-05 and the base station 4a-10 establish an RRC connection indicates that a signaling radio bearer (SRB) is configured between the UE 4a-05 and the base station 4a-10 such that an RRC control message may be transmitted and received therebetween. The RRC connection establishment is performed via a random access process, and includes processes in which the UE 4a-05 transmits an RRC connection establishment request message to the base station 4a-10, the base station 4a-10 transmits an RRC connection establishment message to the UE 4a-05, and the UE 4a-05 transmits an RRC connection establishment complete message to the base station 4a-10.

After establishment of an RRC connection, the base station 4a-10 indicates RRC connection reestablishment to the UE 4a-05 in operation 4a-20. Via the RRC connection reestablishment message, SPS configuration information is transferred to the UE 4a-05, and whether to apply a conditional transmission operation is indicated. Information indicating whether to apply a conditional transmission operation may be included in sub-information of sps-ConfigUL of the RRC connection reconfiguration message (RRCConnection-Reconfiguration), and may be defined in the form of ENUMERATED {SETUP}, being named SkipUplinkTransmission. For example, if SkipUplinkTransmission, indicating SETUP, is included in sps-ConfigUL of an RRCConnection-Reconfiguration message that the UE 4a-05 receives, the fact indicates a conditional transmission operation for preconfigured PUSCH transmission of a preconfigured serving cell. Otherwise, an unconditional transmission operation for all PUSCH transmission is indicated. The preconfigured serving cell is indicated using information named SemiPersistSchedSCell.

If new data is generated in operation 4a-25, the UE 4a-05 may wait until a new transmission resource for new data transmission becomes available.

If an uplink transmission resource for new uplink transmission is available in operation 4a-27 (UL resource allocated for new transmission is available), the UE 4a-05 proceeds with operation 4a-30 and determines whether to perform uplink transmission. The uplink transmission resource available for the new transmission may be a transmission resource allocated via a PDCCH addressed by a C-RNTI of the UE 4a-05, or may be a transmission resource for SPS, that is, a configured uplink grant (configured UL grant).

In operation 4a-30, the UE 4a-05 determines whether to perform transmission via the uplink transmission resource (or whether to generate a MAC PDU to be transmitted via the uplink transmission resource) by taking into consideration the existence of SPS-ConfigUL, SkipUplinkTransmission, and SemiPersistSchedSCell, and the values thereof, the characteristic of an available transmission resource, and the existence of data available for transmission, and may or may not perform uplink transmission. More particularly, the UE 4a-05 may determine whether to perform uplink transmission as below.

If the transmission resource is an SPS resource, SkipUplinkTransmission is configured, and data to be transmitted via the transmission resource for the uplink transmission does not exist, the UE 4a-05 may not perform new uplink transmission.

If the transmission resource is an SPS resource, SkipUplinkTransmission is configured, data to be transmitted via the transmission resource for the uplink transmission exists, and the new uplink transmission does not overlap (or collide) with another transmission, e.g., HARQ retransmission, the UE 4a-05 may perform new uplink transmission using the transmission resource.

If the new uplink transmission overlaps with HARQ retransmission, the UE 4a-05 may not perform new uplink transmission but may perform HARQ retransmission. The UE determines a subframe and a HARQ process to be used for transmitting new data as below.

A HARQ process and the subframe that is the closest to a corresponding point in time may be selected from among subframes in which an SPS transmission resource for new transmission is allocated and a buffer of a related HARQ process is empty, and new transmission is performed. If a transmission resource allocated via a PDCCH addressed by C-RNTI of the UE 4a-05 is available at a point in time earlier than the determined point in time, new transmission is performed using the dynamically allocated transmission resource.

Otherwise, the UE 4a-05 performs new transmission using the determined HARQ process at the determined point in time in operation 4a-35.

HARQ new transmission is preferentially performed over HARQ retransmission when the conditional transmission is configured, as shown in operations 4a-30 and 4a-35, since the base station 4a-10 has difficulty determining whether the transmission by the UE 4a-05 is HARQ retransmission or HARQ new transmission when the conditional transmission is configured. Therefore, if the UE 4a-05 performs HARQ new transmission in a subframe in which the base station 4a-10 expects HARQ retransmission, the base station 4a-10 may not perform soft combining well, and thus uplink transmission may fail.

Figure 4B:
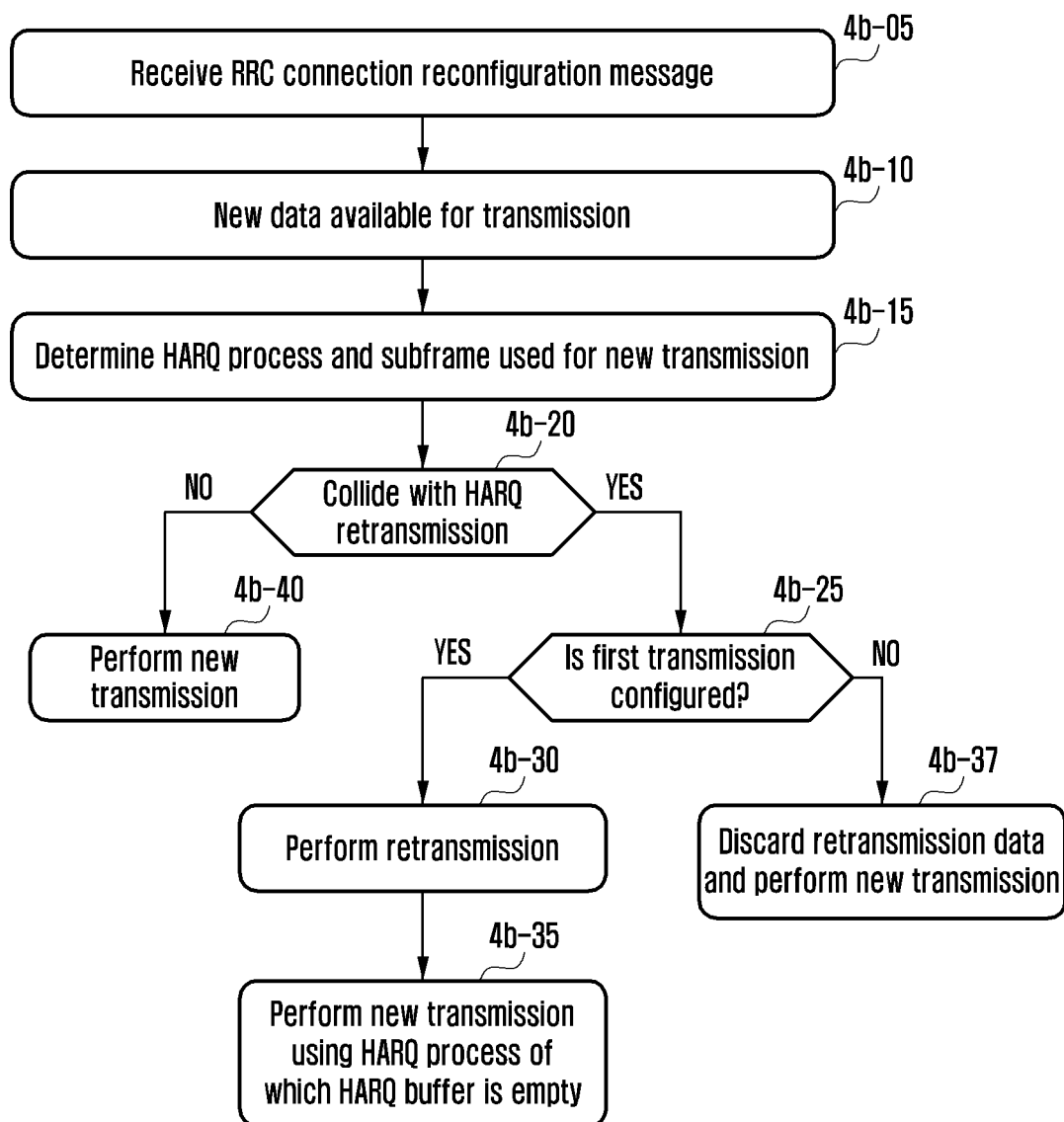
FIG. 4B is a diagram illustrating an operation by which a UE performs HARQ new transmission and retransmission in association with conditional transmission according to an embodiment of the present disclosure.

FIG. 4B is a diagram illustrating operations of a UE according to an embodiment of the present disclosure.

Referring to FIG. 4B, in operation 4b-05, a UE receives a RRCConnectionReconfiguration control message from a base station. The control message may include information indicating whether first transmission is configured and SPS transmission resource configuration information. The configuration of the first transmission indicates configuration of conditional transmission, and whether the conditional transmission is configured may be indicated depending on whether preconfigured control information such as SkipUplinkTransmission is included.

In operation 4b-10, the UE may have new data available for transmission. The UE may determine whether the new data available for transmission exists.

In operation 4b-15, the UE may select a subframe and a HARQ process to be used for transmitting the new data available for transmission.

In operation 4b-20, the UE determines whether HARQ retransmission is scheduled in the selected subframe. The UE proceeds with operation 4b-25 if HARQ retransmission is scheduled, and proceeds with operation 4b-40 to perform new transmission in the subframe if the new transmission does not overlap with HARQ retransmission. If HARQ retransmission is scheduled, it is determined that a collision with HARQ retransmission is to occur. If HARQ retransmission is not scheduled, it is determined that a collision with the HARQ retransmission is not to occur.

In operation 4b-25, the UE may determine whether to perform new transmission or HARQ retransmission in the subframe. The UE may determine whether the first transmission is configured.

If a semi-persistent transmission resource is configured/allocated/activated, the period of the semi-persistent transmission resource is a preconfigured value (e.g., 1 ms), and the first transmission is configured for the semi-persistent transmission, the UE proceeds with operation 4b-30, and perform HARQ retransmission in the subframe. The UE proceeds with operation 4b-35 in order to select a subframe in which new transmission is to be performed.

If a semi-persistent transmission resource is configured/ allocated/activated and the first transmission is not configured for semi-persistent transmission, the UE proceeds with operation 4b-37, discards data stored in a HARQ process related to the subframe (i.e. data for which HARQ retransmission is scheduled), and performs new transmission in the subframe.

In operation 4b-35, the UE selects a subframe in which a related HARQ buffer is empty (i.e., in which HARQ retransmission is not scheduled) from among subframes in which a semi-persistent transmission resource is allocated and performs new transmission in the subframe. Alternatively, the UE selects one of the HARQ processes having empty HARQ buffers from among HARQ processes, and may perform new transmission in a subframe related to the selected HARQ process.

If the conditional transmission is configured, the base station has difficulty determining whether transmission by the UE is HARQ retransmission or HARQ new transmission. Accordingly, as another method, a scheme may be considered in which retransmission is performed only when a base station indicates retransmission if the conditional transmission is configured.

Uplink HARQ retransmission may include non-adaptive retransmission and adaptive retransmission. Non-adaptive retransmission performs retransmission on the basis of only HARQ feedback information. Non-adaptive retransmission is a scheme that performs retransmission by applying a transmission resource and a transmission format which were used in a previous transmission if a HARQ NACK is received. Adaptive retransmission is a scheme that performs retransmission by applying a transmission resource and a transmission format explicitly indicated by base station.

If conditional transmission is not configured, both non-adaptive retransmission and adaptive-retransmission are used. If conditional transmission is configured, only adaptive retransmission is used. Accordingly, the above-described drawback is overcome.

Figure 4C:
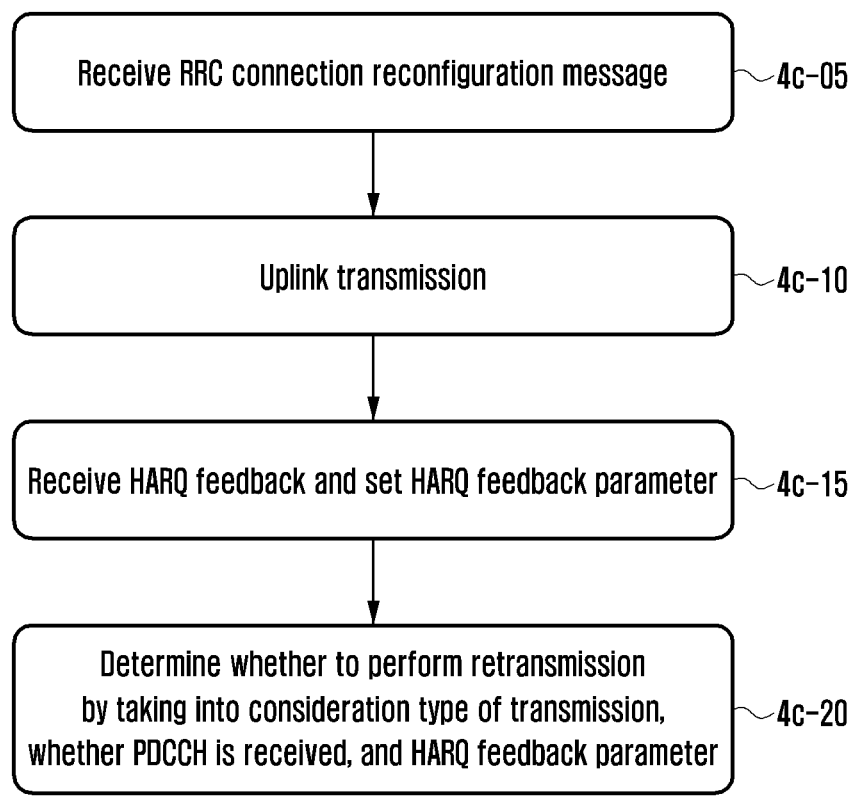
FIG. 4C is a diagram illustrating another operation by which a UE performs HARQ new transmission and retransmission in association with conditional transmission according to an embodiment of the present disclosure.

FIG. 4C is a diagram illustrating the operation of a UE according to an embodiment of the present disclosure.

Referring to FIG. 4C, in operation 4c-05, a UE receives an RRCConnectionReconfiguration control message from a base station. Whether first transmission is configured may be indicated via the control message. The configuration of the first transmission indicates configuration of conditional transmission, and whether the conditional transmission is configured may be indicated depending on whether preconfigured control information such as SkipUplinkTransmission is included.

In operation 4c-10, the UE performs uplink transmission.

In operation 4c-15, the UE waits for a preconfigured period of time after performing the uplink transmission, and sets a parameter related to HARQ feedback. In this instance, if the uplink transmission corresponds to second transmission, the UE receives HARQ feedback information indicated by the base station a preconfigured period of time after performing the uplink transmission and sets the HARQ feedback parameter to the received value. If the uplink transmission corresponds to the first transmission, the UE may not receive HARQ feedback information and may set the HARQ feedback parameter to HARQ ACK, or even though the UE receives the HARQ feedback information, the UE may set the HARQ feedback parameter to HARQ ACK without taking into consideration the received HARQ feedback.

The HARQ feedback parameter is a parameter for controlling HARQ retransmission. The fact that the HARQ feedback parameter is set to ACK may indicate that retransmission is performed only when retransmission is explicitly indicated via a PDCCH. The fact that the HARQ feedback parameter is set to NACK may indicate that non-adaptive HARQ retransmission is performed even when retransmission is not explicitly indicated via a PDCCH.

In operation 4c-20, the UE determines whether to perform retransmission by taking into consideration the type of transmission, a HARQ feedback parameter, and whether an explicit retransmission command is received, so as to perform retransmission.

In the case of the second transmission, the UE may perform first retransmission or second retransmission, or may not perform retransmission on the basis of whether a PDCCH is received and a HARQ feedback parameter. If a PDCCH indicating retransmission is not received and a HARQ feedback is NACK, the second retransmission is performed. If a PDCCH indicating retransmission is received, the first retransmission is performed. If a PDCCH indicating retransmission is not received and HARQ feedback is ACK, retransmission is not performed.

In the case of the first transmission, the UE may perform the first retransmission or may not perform retransmission on the basis of whether a PDCCH is received. If a PDCCH indicating retransmission is received, the first retransmission is performed. If a PDCCH indicating retransmission is not received, retransmission is not performed.

The first retransmission indicates retransmission performed using a transmission resource and a transmission format explicitly indicated by a PDCCH, instead of using a transmission resource and a transmission format used in the previous transmission. The transmission format indicates, for example, the size of a transport block, a modulation scheme, a coding rate, and the like.

The second retransmission indicates retransmission performed using a transmission resource and a transmission format which were used in the previous transmission.

In the embodiment of the present disclosure, the second transmission indicates unconditional transmission performed when a transmission resource is available although data to be transmitted does not exist. Also, in the embodiment of the present disclosure, the first transmission indicates conditional transmission performed only when data that is to be transmitted and satisfies a preconfigured condition exists although a transmission resource is available.

Figure 4D:
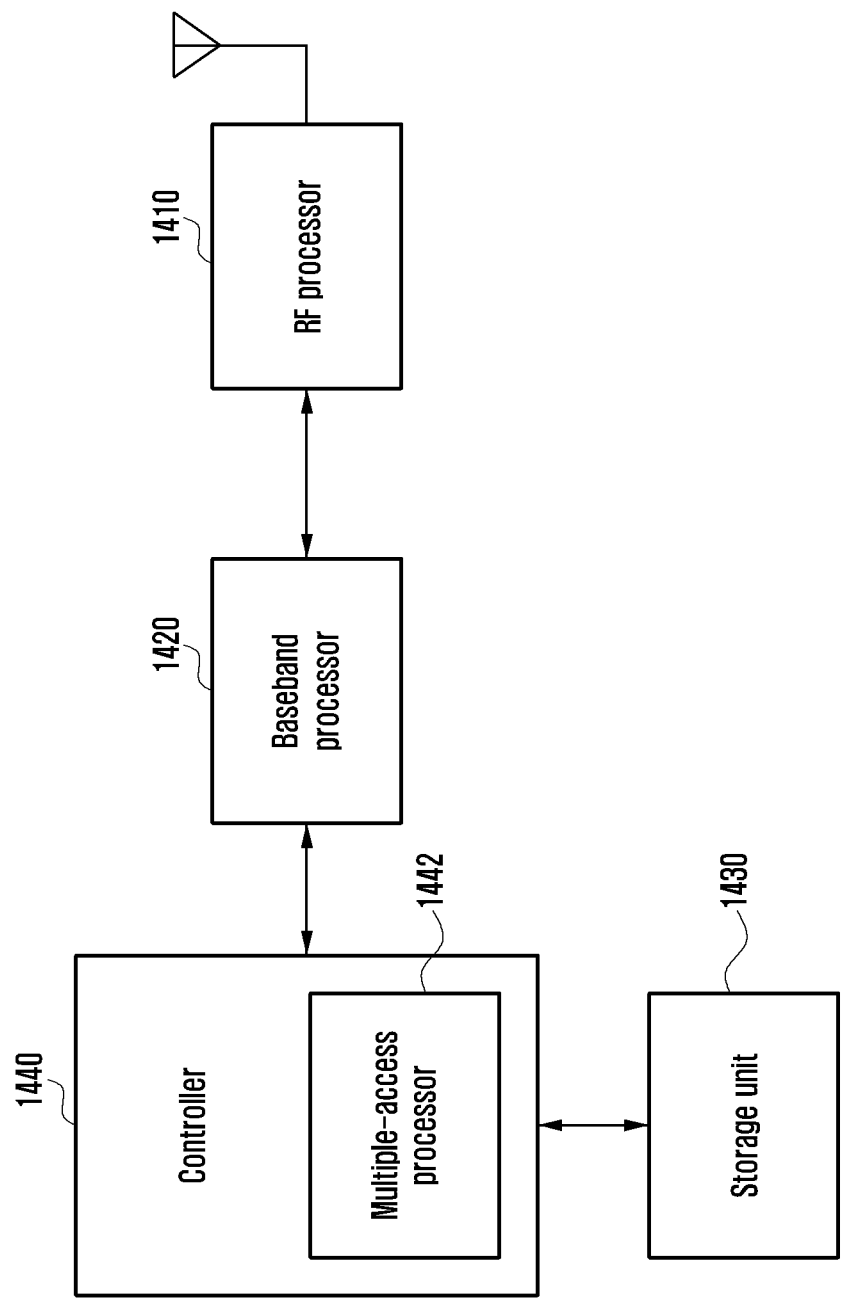
FIG. 4D is a block diagram of a UE according to an embodiment of the present disclosure.

FIG. 4D is a diagram of the structure of a UE according to an embodiment of the present disclosure.

Referring to FIG. 4D, the UE may include a radio-frequency (RF) processor 4d-10, a baseband processor 4d-20, a storage unit 4d-30, and a controller 4d-40.

The RF processor 4d-10 performs a function of transmitting and receiving a signal via a radio channel, such as band conversion and amplification of a signal. That is, the RF processor 4d-10 up-converts a baseband signal provided from the baseband processor 4d-20 into an RF band signal, transmits the RF band signal via an antenna, and down-converts the RF band signal received via the antenna into a baseband signal. For example, the RF processor 4d-10 may include a transmission filter, a reception filter, an amplifier, a mixer, an oscillator, a digital-to-analog convertor (DAC), an analog-to-digital convertor (ADC), and the like. Although only one antenna is illustrated in FIG. 4, the UE may include a plurality of antennas. In addition, the RF processor 4d-10 may include a plurality of RF chains. Moreover, the RF processor 4d-10 may perform beamforming. For the beamforming, the RF processor 4d-10 may control the phase and the size of each signal transmitted/received via a plurality of antennas or antenna elements. Also, the RF processor may perform MIMO operation, and may receive a plurality of layers while performing MIMO operation.

The baseband processor 4d-20 performs a function for conversion between a baseband signal and a bitstream according to the physical layer standard of the system. For example, in the case of data transmission, the baseband processor 4d-20 generates complex symbols by encoding and modulating a transmission bitstream. Further, in the case of data reception, the baseband processor 4d-20 reconstructs a reception bitstream by demodulating and decoding a baseband signal provided from the RF processor 4d-10. For example, according to an orthogonal-frequency-division-multiplexing (OFDM) scheme, in the case of data transmission, the baseband processor 4d-20 generates complex symbols by encoding and modulating a transmission bitstream, maps the complex symbols to subcarriers, and then configures OFDM symbols via an IFFT (inverse fast Fourier transform) operation and a cyclic prefix (CP) insertion. Further, in the case of data reception, the baseband processor 4d-20 divides the baseband signal provided from the RF processor 4d-10 into OFDM symbol units, reconstructs the signals mapped to the subcarriers via a fast Fourier transform (FFT) operation, and then reconstructs a reception bitstream via demodulation and decoding.

The baseband processor 4d-20 and the RF processor 4d-10 transmit and receive a signal, as described above. Accordingly, each of the baseband processor 4d-20 and the RF processor 4d-10 may be referred to as a transmitter, a receiver, a transceiver, or a communication unit. In addition, at least one of the baseband processor 4d-20 or the RF processor 4d-10 may include a plurality of communication modules so as to support many different radio access technologies. In addition, at least one of the baseband processor 4d-20 or the RF processor 4d-10 may include different communication modules to process signals of different frequency bands. For example, the different communication standards may include a wireless LAN (e.g., IEEE 802.11) and a cellular network (e.g., LTE). Further, the different frequency bands may include a super-high frequency (SHF) (e.g., 2.5 GHz and 5 GHz) band and a millimeter (mm) wave (e.g., 60 GHz) band.

The storage unit 4d-30 stores data such as a basic program, an application program, and configuration information for the operation of the UE. The storage unit 4d-30 may provide stored data in response to a request from the controller 4d-40.

The controller 4d-40 may control the overall operation of the UE. For example, the controller 4d-40 transmits and receives a signal via the baseband processor 4d-20 and the RF processor 4d-10. Also, the controller 4d-40 writes and reads data to/from the storage unit 4d-40. To this end, the controller 4d-40 may include at least one processor. For example, the controller 4d-40 may include a communication processor (CP), which performs control for communication, and an application processor (AP), which controls a higher layer such as an application program. The controller 2g-40 may include a multiple-access processor 2g-42. According to an embodiment of the present disclosure, the controller 4d-40 may perform control such that the UE performs the operations and procedures described in FIGS. 4A, 4B, and 4C.

Figure 4E:
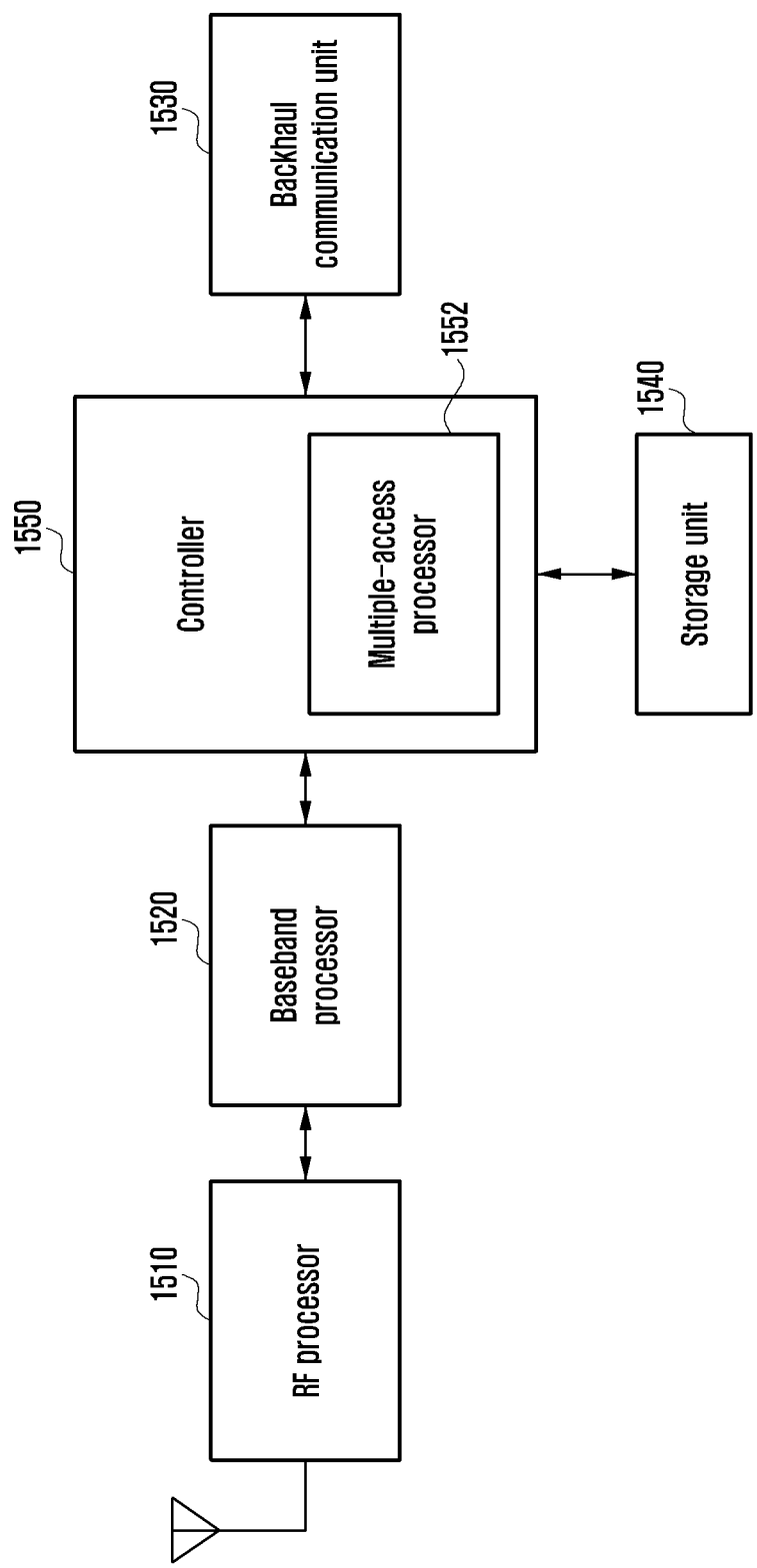
FIG. 4E is a block diagram of a base station in a wireless communication system according to an embodiment of the present disclosure.

FIG. 4E is a block diagram of a main base station in a wireless communication system according to an embodiment of the present disclosure.

Referring to FIG. 4E, the base station may include an RF processor 4e-10, a baseband processor 4e-20, a backhaul communication unit 4e-30, a storage unit 4e-40, and a controller 4e-50.

The RF processor 4e-10 performs a function of transmitting and receiving a signal via a radio channel, such as band conversion and amplification of a signal. That is, the RF processor 4e-10 up-converts a baseband signal provided from the baseband processor 4e-20 into an RF band signal and then transmits the converted signal via an antenna, and down-converts an RF band signal received via the antenna into a baseband signal. For example, the RF processor 4e-10 may include a transmission filter, a reception filter, an amplifier, a mixer, an oscillator, a DAC, and an ADC. Although only a single antenna is illustrated in FIG. 15, a first access node may include a plurality of antennas. In addition, the RF processor 4e-10 may include a plurality of RF chains. Moreover, the RF processor 4e-10 may perform beamforming. For the beamforming, the RF processor 4e-10 may control the phase and the size of each of the signals transmitted and received via a plurality of antennas or antenna elements. The RF processor may perform downlink MIMO operation by transmitting one or more layers.

The baseband processor 4e-20 performs a function of converting between a baseband signal and a bitstream according to the physical layer standard of a first radio access technology. For example, in the case of data transmission, the baseband processor 4e-20 generates complex symbols by encoding and modulating a transmission bitstream. Further, in the case of data reception, the baseband processor 4e-20 reconstructs a reception bitstream by demodulating and decoding a baseband signal provided from the RF processor 4e-10. For example, according to an OFDM scheme, in the case of data transmission, the baseband processor 4e-20 generates complex symbols by encoding and modulating the transmission bitstream, maps the complex symbols to subcarriers, and then configures OFDM symbols via an IFFT operation and CP insertion. Also, in the case of data reception, the baseband processor 4e-20 divides a baseband signal provided from the RF processor 4e-10 into OFDM symbol units, restores signals mapped onto the subcarriers via the FFT operation, and restores a reception bitstream via demodulation and decoding. The baseband processor 4e-20 and the RF processor 4e-10 transmit and receive a signal as described above. Accordingly, each of the baseband processor 4e-20 and the RF processor 4e-10 may be referred to as a transmitter, a receiver, a transceiver, a communication unit, or a wireless communication unit.

The backhaul communication unit 4e-30 provides an interface for performing communication with other nodes in a network. That is, the backhaul communication unit 4e-30 may convert, into a physical signal, a bitstream transmitted from the main base station to another node, for example, a secondary base station, a core network, and the like, and may convert a physical signal received from another node into a bitstream.

The storage unit 4e-40 may store data, such as a basic program, an application program, configuration information, or the like, used for operating the main base station. Particularly, the storage unit 4e-40 may store information associated with a bearer allocated to a connected UE, a measurement result reported from a connected UE, and the like. Also, the storage unit 4e-40 may store information which is a criterion to determine whether to provide or interrupt multiple access to a UE. The storage unit 4e-40 may provide stored data in response to a request from the controller 4e-50.

The controller 4e-50 may control the overall operation of the main base station. For example, the controller 4e-50 may transmit and receive a signal via the baseband processor 4e-20 and the RF processor 4e-10 or the backhaul communication unit 4e-30. Also, the controller 4e-50 writes and reads data to/from the storage unit 4e-40. To this end, the controller 4e-50 may include at least one processor. According to an embodiment of the present disclosure, the controller 4e-50 may include a multiple-access controller 4e-52 that performs control so as to provide multiple access to the UE. For example, the controller 4e-50 may perform control such that the main base station performs operations and procedures of the node B illustrated in FIG. 4A. Also, the controller 4e-50 may perform control such that the main node B performs operations and procedures of a node B corresponding to the operations of the UE described in FIGS. 4B and 4C.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Meanwhile, while the disclosure has been shown and described with reference to specific embodiments thereof in the detailed description of the present disclosure, it goes without saying that various changes in form and details may be made therein without departing from the spirit and scope of the disclosure. Therefore, the scope of the present disclosure should not be defined as being limited to the embodiments, but should be defined by the appended claims and equivalents thereof.

What is claims is:

1. A method performed by a terminal in a wireless communication system, the method comprising:
   receiving, from a base station, system information including first beam configuration information;
   measuring a quality of a serving cell based on a first signal indicated by the first beam configuration information;
   receiving, from the base station, a paging message based on the first beam configuration information;
   performing a random access procedure based on the first beam configuration information;
   receiving, from the base station, second beam configuration information; and
   performing a radio link monitoring based on a second signal indicated by the second beam configuration information,
   wherein the first beam configuration information is applied to the terminal in case that the terminal is in an idle state, and
   wherein the second beam configuration information is applied to the terminal in case that the terminal is in a connected state.

2. The method of claim 1, further comprising
   measuring a channel state of a serving cell based on the second signal configured by the second beam configuration information,
   wherein the second signal corresponds to a channel state information-reference signal.

3. The method of claim 1,
   wherein the first beam configuration information is associated with a number of beams during a time period, and
   wherein a primary synchronization signal (PSS) and a secondary synchronization signal (SSS) are transmitted during the time period.

4. The method of claim 1,
   wherein the first signal is associated with a physical broadcast channel (PBCH), and
   wherein the second beam configuration information is configured based on a dedicated message.

5. A method performed by a base station in a wireless communication system, the method comprising:
   transmitting system information including first beam configuration information, a quality of a serving cell is measured based on a first signal indicated by the first beam configuration information;
   transmitting, to a terminal, a paging message based on the first beam configuration information;
   performing a random access procedure based on the first beam configuration information; and
   transmitting, to the terminal, second beam configuration information, a radio link monitoring is performed based on a second signal indicated by the second beam configuration information,
   wherein the first beam configuration information is applied to the terminal in case that the terminal is in an idle state, and
   wherein the second beam configuration information is applied to the terminal in case that the terminal is in a connected state.

6. The method of claim 5,
   wherein a channel state of a serving cell is measured based on the second signal configured by the second beam configuration information, and
   wherein the second signal corresponds to a channel state information-reference signal.

7. The method of claim 5,
   wherein the first beam configuration information is associated with a number of beams during a time period, and
   wherein a primary synchronization signal (PSS) and a secondary synchronization signal (SSS) are transmitted during the time period.

8. The method of claim 5,
   wherein the first signal is associated with a physical broadcast channel (PBCH), and
   wherein the second beam configuration information is configured based on a dedicated message.

9. A terminal in a wireless communication system, the terminal comprising:
   a transceiver; and
   a controller configured to:
      receive, from a base station via the transceiver, system information including first beam configuration information, measure a quality of a serving cell based on a first signal indicated by the first beam configuration information, receive, from the base station via the transceiver, a paging message based on the first beam configuration information, perform a random access procedure based on the first beam configuration information, receive, from the base station via the transceiver, second beam configuration information, and perform a radio link monitoring based on a second signal indicated by the second beam configuration information, wherein the first beam configuration information is applied to the terminal in case that the terminal is in an idle state, and wherein the second beam configuration information is applied to the terminal in case that the terminal is in a connected state.

10. The terminal of claim 9, wherein the controller is configured to measure a channel state of a serving cell based on the second signal configured by the second beam configuration information, and wherein the second signal corresponds to a channel state information-reference signal.

11. The terminal of claim 9, wherein the first beam configuration information is associated with a number of beams during a time period, and wherein a primary synchronization signal (PSS) and a secondary synchronization signal (SSS) are transmitted during the time period.

12. The terminal of claim 9, wherein the first signal is associated with a physical broadcast channel (PBCH), and wherein the second beam configuration information is configured based on a dedicated message.

13. A base station in a wireless communication system, the base station comprising:

a transceiver; and a controller configured to:

transmit, via the transceiver, system information including first beam configuration information, a quality of a serving cell is measured based on a first signal indicated by the first beam configuration information, transmit, to a terminal via the transceiver, a paging message based on the first beam configuration information, perform a random access procedure based on the first beam configuration information, and transmit, to the terminal via the transceiver, second beam configuration information, a radio link monitoring is performed based on a second signal indicated by the second beam configuration information, wherein the first beam configuration information is applied to the terminal in case that the terminal is in an idle state, and wherein the second beam configuration information is applied to the terminal in case that the terminal is in a connected state.

14. The base station of claim 13, wherein a channel state of a serving cell is measured based on the second signal configured by the second beam configuration information, and wherein the second signal corresponds to a channel state information-reference signal.

15. The base station of claim 13, wherein the first beam configuration information is associated with a number of beams during a time period, and wherein a primary synchronization signal (PSS) and a secondary synchronization signal (SSS) are transmitted during the time period.

16. The base station of claim 13, wherein the first signal is associated with a physical broadcast channel (PBCH), and wherein the second beam configuration information is configured based on a dedicated message.

* * * * *